United States Patent [19]

Weber et al.

[11] 3,916,095

[45] Oct. 28, 1975

[54] DUAL-LINE DATA COMPRESSION METHOD AND SYSTEM FOR COMPRESSING, TRANSMITTING AND REPRODUCING FACSIMILE DATA

[75] Inventors: Donald R. Weber, Cupertino; Joseph Lou, Sunnyvale; Edward A. Poe, Palo Alto; Ralph W. Austad, San Jose, all of Calif.

[73] Assignee: Dacom, Inc., Santa Clara, Calif.

[22] Filed: Aug. 12, 1974

[21] Appl. No.: 496,722

Related U.S. Application Data

[63] Continuation of Ser. No. 227,149, Feb. 17, 1972, abandoned.

[52] U.S. Cl. .................... 178/6; 178/DIG. 3

[51] Int. Cl.² .................... H04N 7/12

[58] Field of Search .................... 178/6, 6.8, DIG. 3

[56] References Cited

UNITED STATES PATENTS

| | | | |
|---|---|---|---|
| 3,213,268 | 10/1965 | Ellersick | 178/6 |
| 3,451,363 | 7/1969 | Frohbach | 178/6 |
| 3,471,848 | 10/1969 | Manber | 340/324 |
| 3,535,439 | 10/1970 | Matthews | 178/6 |
| 3,585,586 | 6/1971 | Harmon | 178/DIG. 3 |
| 3,604,838 | 9/1971 | Sharp | 178/DIG. 3 |

*Primary Examiner*—Howard W. Britton

*Attorney, Agent, or Firm*—Fulwider, Patton, Rieber, Lee & Utecht

[57] ABSTRACT

A method and system for compressing, transmitting and reproducing facsimile data using a dual-line encoding algorithm to reduce the bandwidth required to transmit the facsimile data. The system is comprised of a compressor-transmitter and at least one remote receiver-reconstructor. The compressor-transmitter includes a document scanner, an encoder, a buffer, and associated control, transmission and error checking apparatus, while the receiver-reconstructor includes a facsimile printer, a decoder, a buffer, and associated control, reception and error checking apparatus. The dual-line algorithm represents a method wherein two bits of scanned data, one bit taken from each of two adjacent scan lines, are simultaneously examined to determine which of four possible data states is to be assigned to each pair of data bits, and the assigned data state information is used in accordance with a specific set of encoding rules to develop encoded data suitable for transmission through a medium having a limited bandwidth.

58 Claims, 24 Drawing Figures

| SYNC CODE | AECU STATUS | HEADER DATA | | | | | ENCODED DATA | POLY-CHECK CODE |
|---|---|---|---|---|---|---|---|---|
| | | NO. OF DATA BITS | ELEMENT POSITION | BLACK CODE SIZE | WHITE CODE SIZE | STARTING MODE DATA | | |
| 24 BITS | 7 BITS | 10 BITS | 12 BITS | 3 BITS | 3 BITS | 2 BITS | 512 BITS | 12 BITS |
| TRANSMISSION FRAME FORMAT-585 BITS | | | | | | | | |

ENCODING RULES DIAGRAM

| SYNC CODE | AECU STATUS | HEADER DATA | | | | | ENCODED DATA | POLY-CHECK CODE |
|---|---|---|---|---|---|---|---|---|
| | | NO. OF DATA BITS | ELEMENT POSITION | BLACK CODE SIZE | WHITE CODE SIZE | STARTING MODE DATA | | |
| 24 BITS | 7 BITS | 10 BITS | 12 BITS | 3 BITS | 3 BITS | 2 BITS | 512 BITS | 12 BITS |
| TRANSMISSION FRAME FORMAT-585 BITS | | | | | | | | |

DUAL-LINE DATA COMPRESSION METHOD AND SYSTEM FOR COMPRESSING, TRANSMITTING AND REPRODUCING FACSIMILE DATA

This is a continuation, of application Ser. No. 227,149, filed Feb. 17, 1972 now abandoned.

RELATED APPLICATION

The present invention is related to the co-pending U.S. Pat. application of Donald R. Weber, entitled "Method and Apparatus for Comressing Facsimile Transmission Data," Ser. No. 838, 454, filed July 2, 1969 and assigned to the assignee of the present invention.

BACKGROUND OF THE INVENTION

1. Field of the Invention

The present invention relates generally to facsimile communication systems and more particularly to a method and system for compressing, transmitting and reproducing facsimile data using a dual-line encoding algorithm to reduce the bandwidth required to transmit the facsimile data.

2. Description of the Prior Art

The art of bandwidth compression for use in facsimile reproduction and transmission systems is well known. Systems of this type are basically comprised of some type of scanning apparatus which scans the surface of a document to be remotely reproduced (or recorded), and means for encoding (compressing) the data for purposes of limiting the bandwidth required for transmission of the data. The encoded data is then transmitted to a remote receiver which decodes the transmitted information and supplies the decoded data to a printing mechanism for reproducing a facsimile of the original document.

The U.S. Pat. to Fleckenstein et al, No. 2,909,601 discloses a facsimile communication system in which typewritten text or pictorial material to be transmitted by facsimile is encoded in terms of black and white run lengths found along the customary narrow parallel scanning-line paths extending across the document to be reproduced. The lengths of successive black and white run lengths along a scanning line are measured and encoded for binary digital transmission according to a predetermined rule dependent upon the statistics of the material being transmitted. The code form is based on the statistical distribution of the lengths of runs reserving short code sequences for the most commonly occurring lengths and longer code sequences for less commonly occurring lengths. Such encoding is said to be particularly efficient in specifying the length between transitions of two valued materials. This is due primarily to the fact that the total number of black and white lengths found in a particular picture is normally smaller than the total number of picture elements in the same picture and the lengths though ranging from one picture element to many hundreds have a peak probability distribution which can be statistically matched by variable length coding. Thus, on the average, the lengths require fewer binary digits for specification than there are individual picture elements composing them. Although this system does provide compression of long run lengths of data, it is limited to operation on a single line of scanned data and permits little savings in transmission time or bandwidth where the density of the copy on the document is substantial.

The U.S. Pat. to Wernikoff et al, No. 3,394,352 discloses a method which simultaneously evaluates the compression efficiency of several different encoders and then identifies the one that is able to represent the most recent portion of the scan with the smallest number of binary characters. The most efficient encoder is then selected and caused to transmit the compressed data. This technique is able to selectively define encoders in any combination such that the encoder used at any given time is the best choice for that portion of the scan. Although the Wernikoff solution provides improved compression efficiency for a certain class of data, its potential is limited because of the number of encoders which can be incorporated is finite and the high cost of including more than three or four different encoders in a single system to accommodate different data statistics makes this solution undesirable for most applications.

The U.S. Pat. to Kagen et al. No. 3,347,981 discloses a method wherein data is obtained by differentiating a graphics copy in both the X and Y directions. Since the spacing between indicia may typically be short or long, Kagen et al. have employed a coding technique for using a long and a short binary code in combination, and they distinguish or identify which code is being used by a prefix bit preceding the associated code. This technique is found to work well if the long code appears quite frequently, i.e., the separation between indicia frequently being large. However, the efficiency will fall off quite rapidly if many short codes are required, thus indicating small separation between indicia. This loss in efficiency is due to the fact that the required prefix bit occupies a greater percentage of bandwidth for the short code than for the long code. Furthermore, the device is committed to only two code lengths which, under certain conditions, produce unsatisfactory operation. For example, if a three bit short code plus the prefix bit is used, and if the indicia is spaced two scan elements apart, the system requires twice the bandwidth (or transmission time) which would otherwise be required without the data compression. To overcome this problem, a suggestion is made that more code combinations be used by adding further prefix bits to identify the expanded code selection. This, of course, would further reduce the transmission efficiency.

SUMMARY OF THE PRESENT INVENTION

Briefly, the present invention relates to a method and apparatus wherein the contents of a document are scanned to obtain "scan data," the scan data is encoded to provide encoded data, the encoded data is transmitted to a remote location where it is decoded, and the decoded data is used to produce a facsimile reproduction of the original document. The encoding method involves the use of a dual-line algorithm wherein two lines of scanned data are treated simultaneously for purposes of encoding and decoding.

The presently preferred system for implementing the invention includes a compressor-transmitter subsystem and at least one remotely located receiver-reconstructor subsystem. The compressor-transmitter subsystem includes, a scanner for scanning the original document to develop scan data, an encoder for encoding the scanned data in accordance with the dual-line algorithm to develop encoded data and associated header data, a buffer for temporarily storing the encoded data and header data, and various control means for assembling the encoded data and header data into transmission frames including other synchronizing, status and check data, and for controlling the rate and accuracy of the transmission.

The receiver-reconstructor subsystem includes, control apparatus for receiving the frames of transmitted data and cooperating with the transmitter to control the accuracy of the transmission and the rate at which the transmitted data is received, a buffer for temporarily storing the received frames of data, a decoder for decoding the encoded data contained within the frames of data to develop decoded data, and a printer for using the decoded data to develop a facsimile copy of the original document.

The numerous advantages of the present invention will no doubt become apparent to those of ordinary skill in the art after having read the following detailed description of the presently preferred embodiments which are illustrated in the several figures of the drawing.

IN THE DRAWING

FIG. 1(*a*) is a diagram illustrating the meaning of certain terms used in accordance with the present invention;

Figure 5:
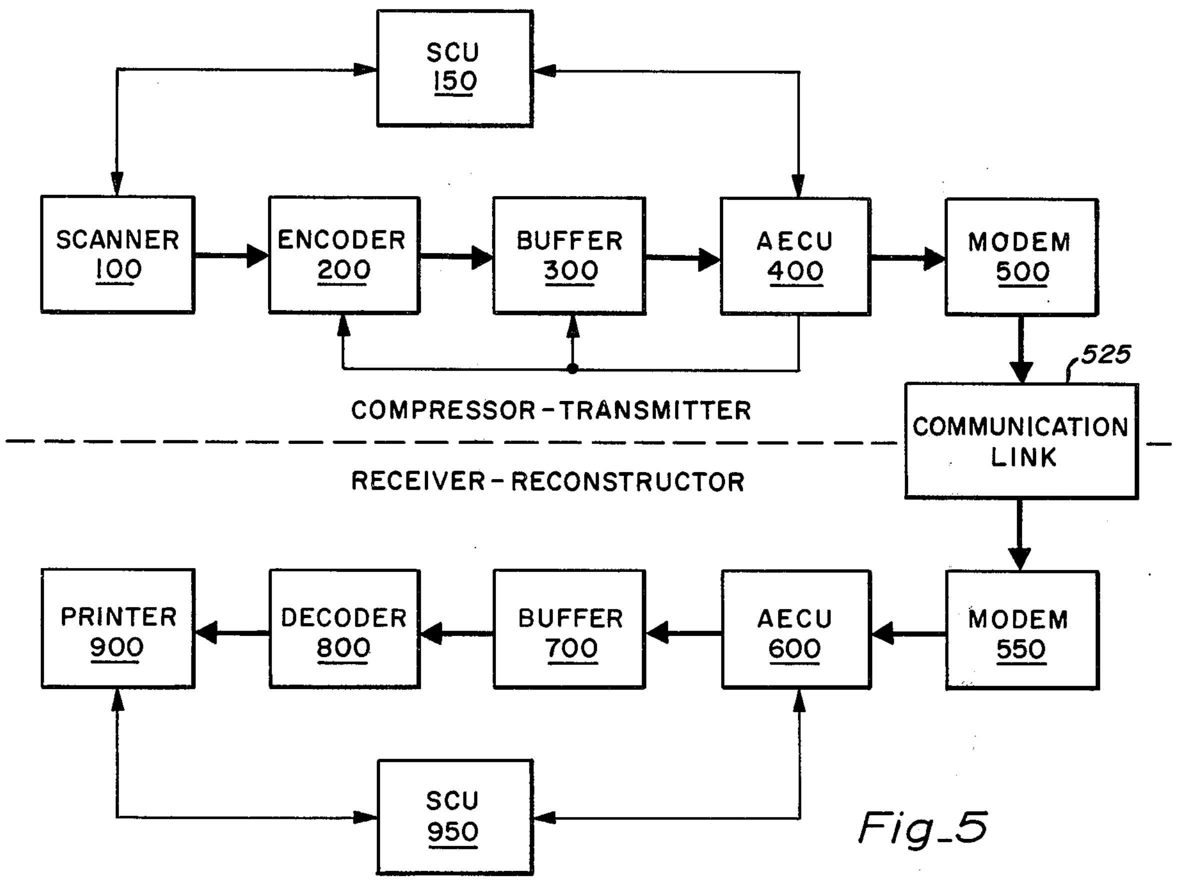
FIG. 5 is a block diagram generally illustrating a data compression, transmission and facsimile reproduction system in accordance with the present invention.
Figure 7:
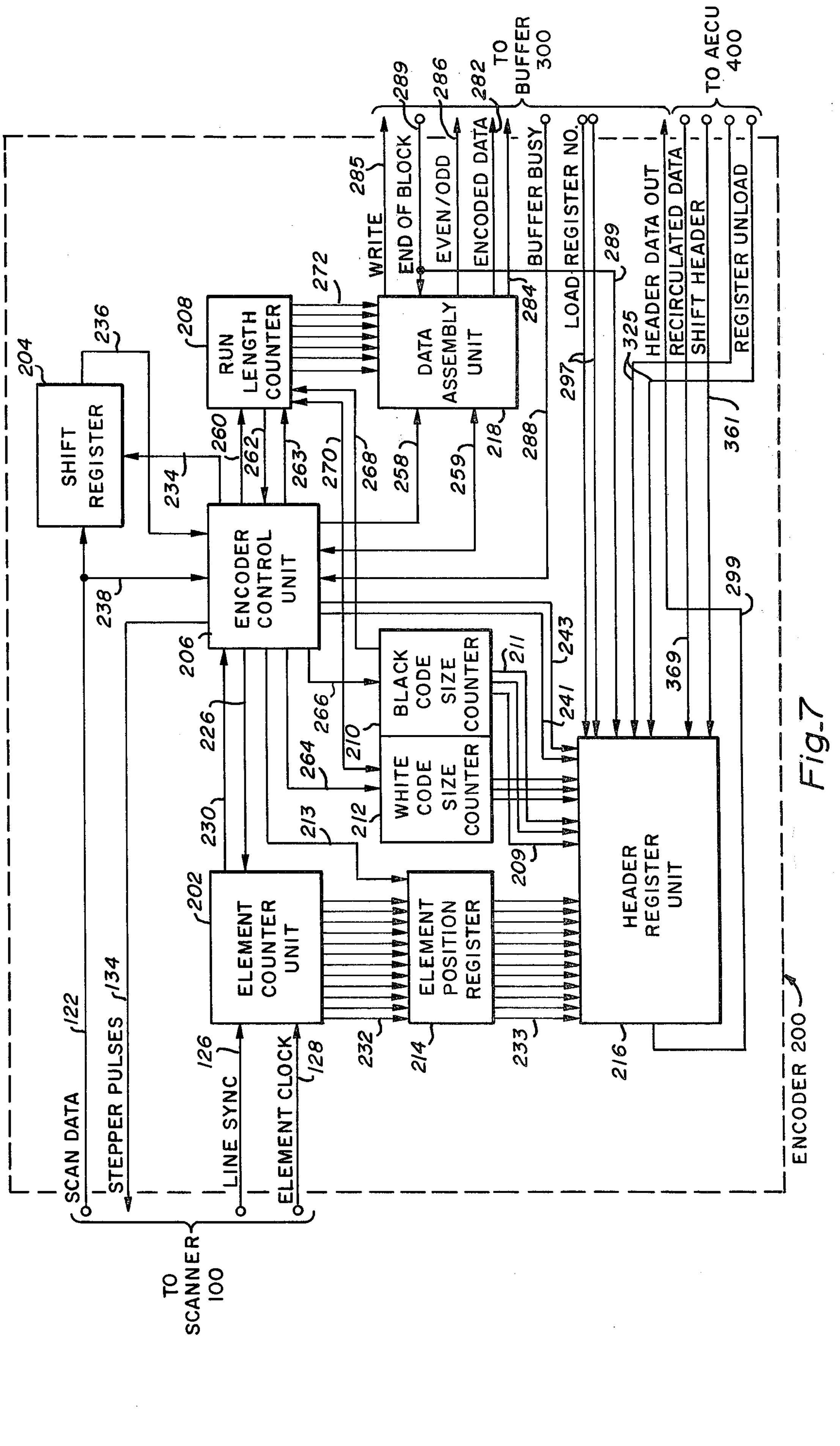
FIG. 7 is a block diagram schematically illustrating the encoder shown in the system depicted in FIG. 5.
Figure 11:
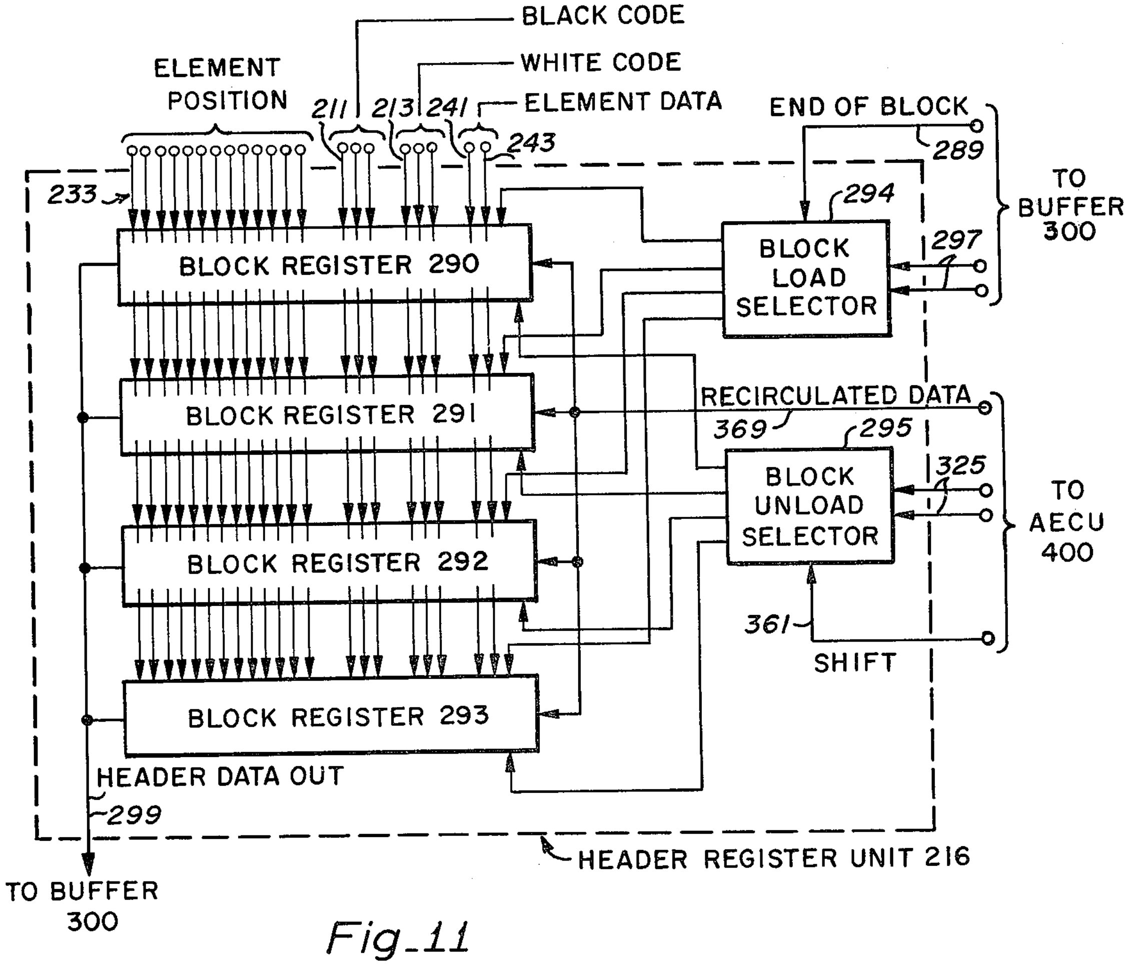
Figure 11A:
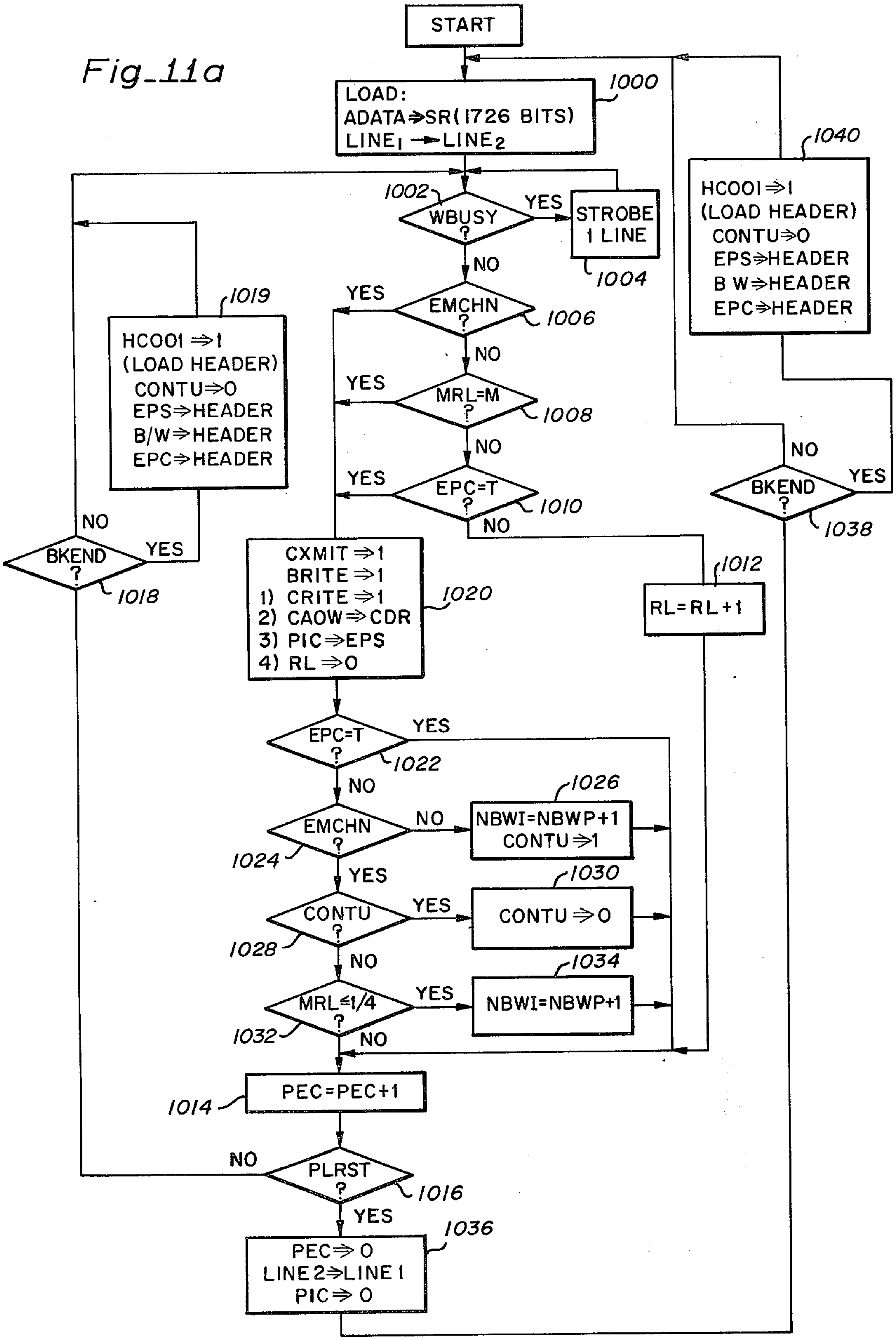
Figure 12:
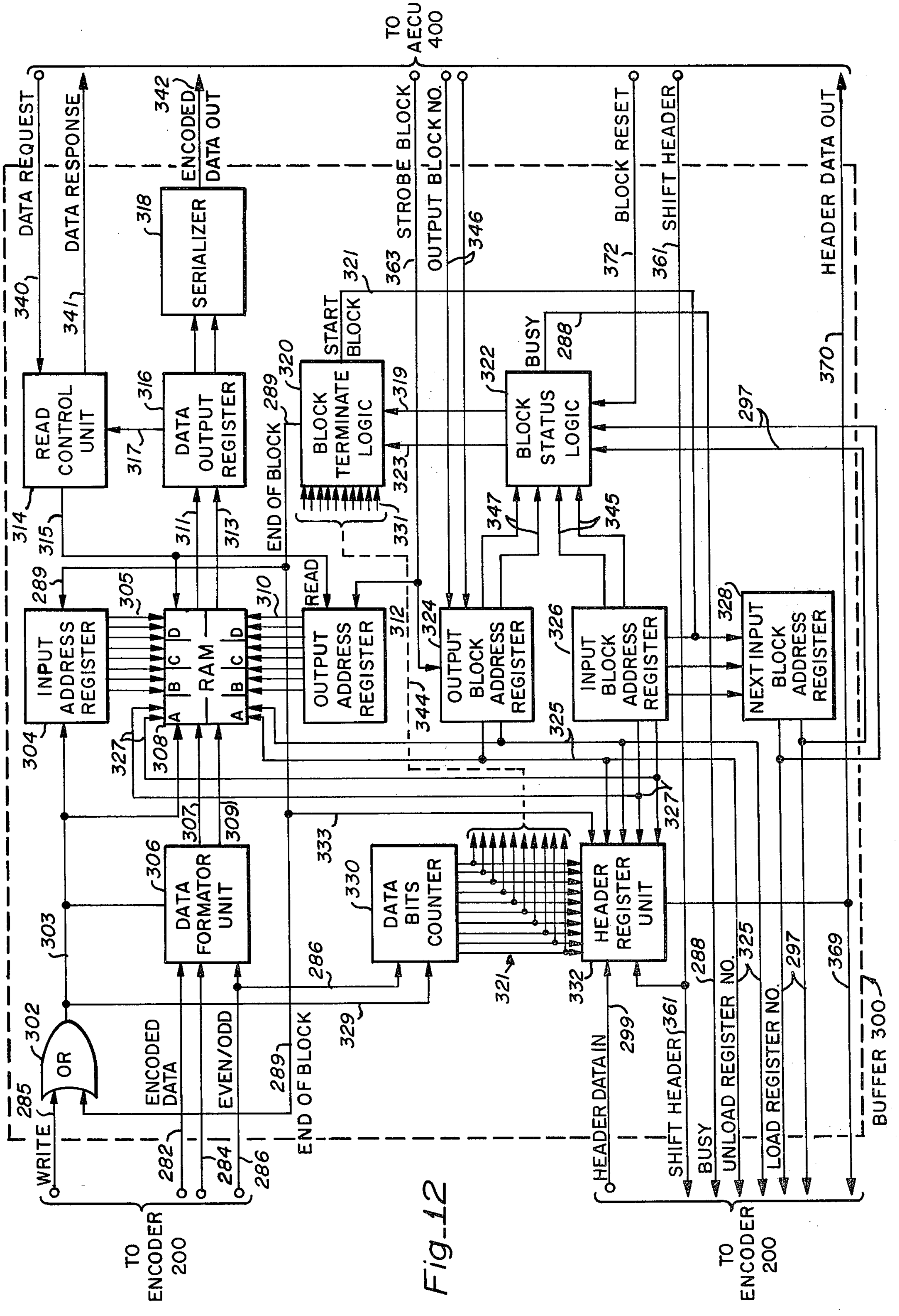
Figure 13:
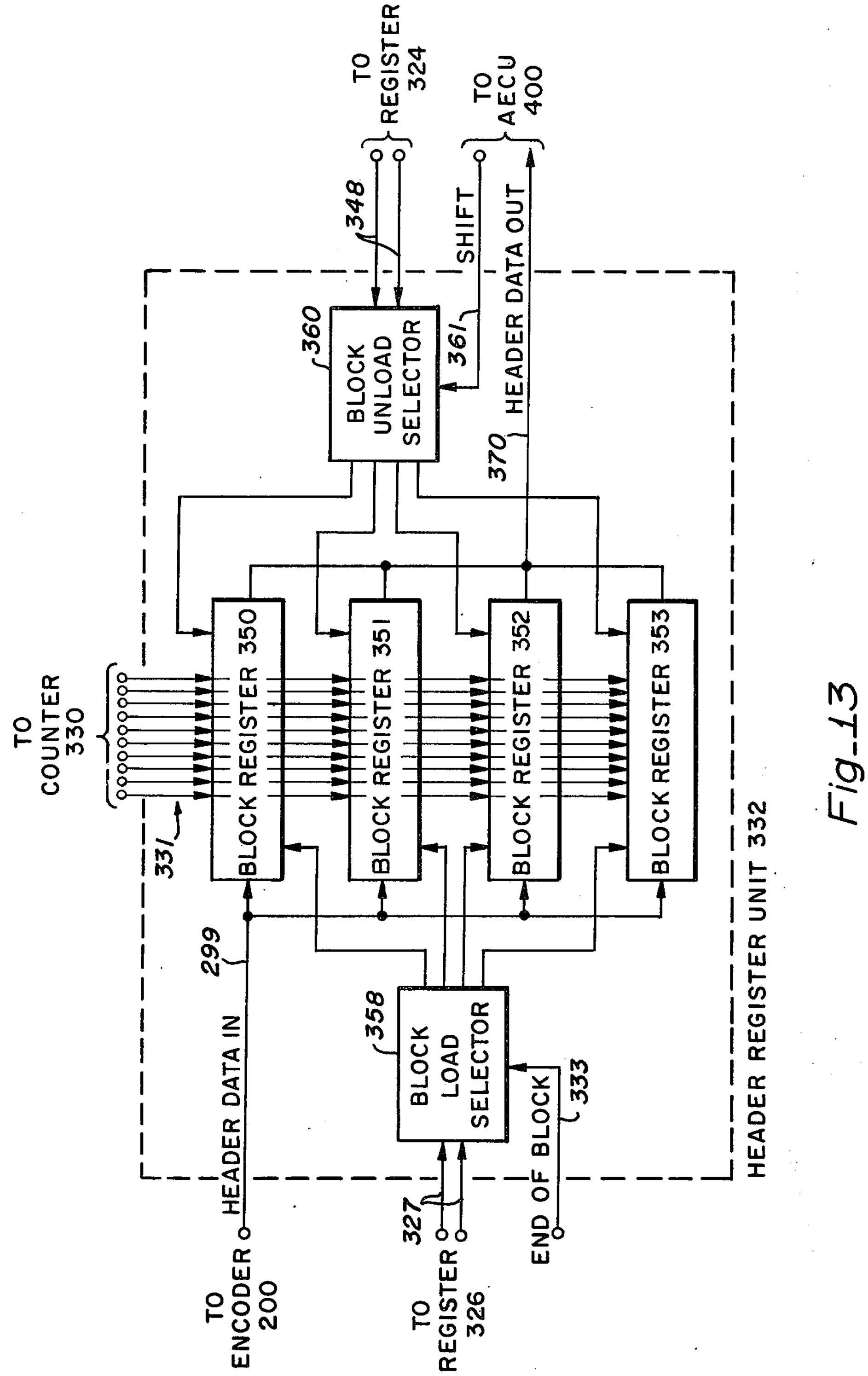
Figure 14:
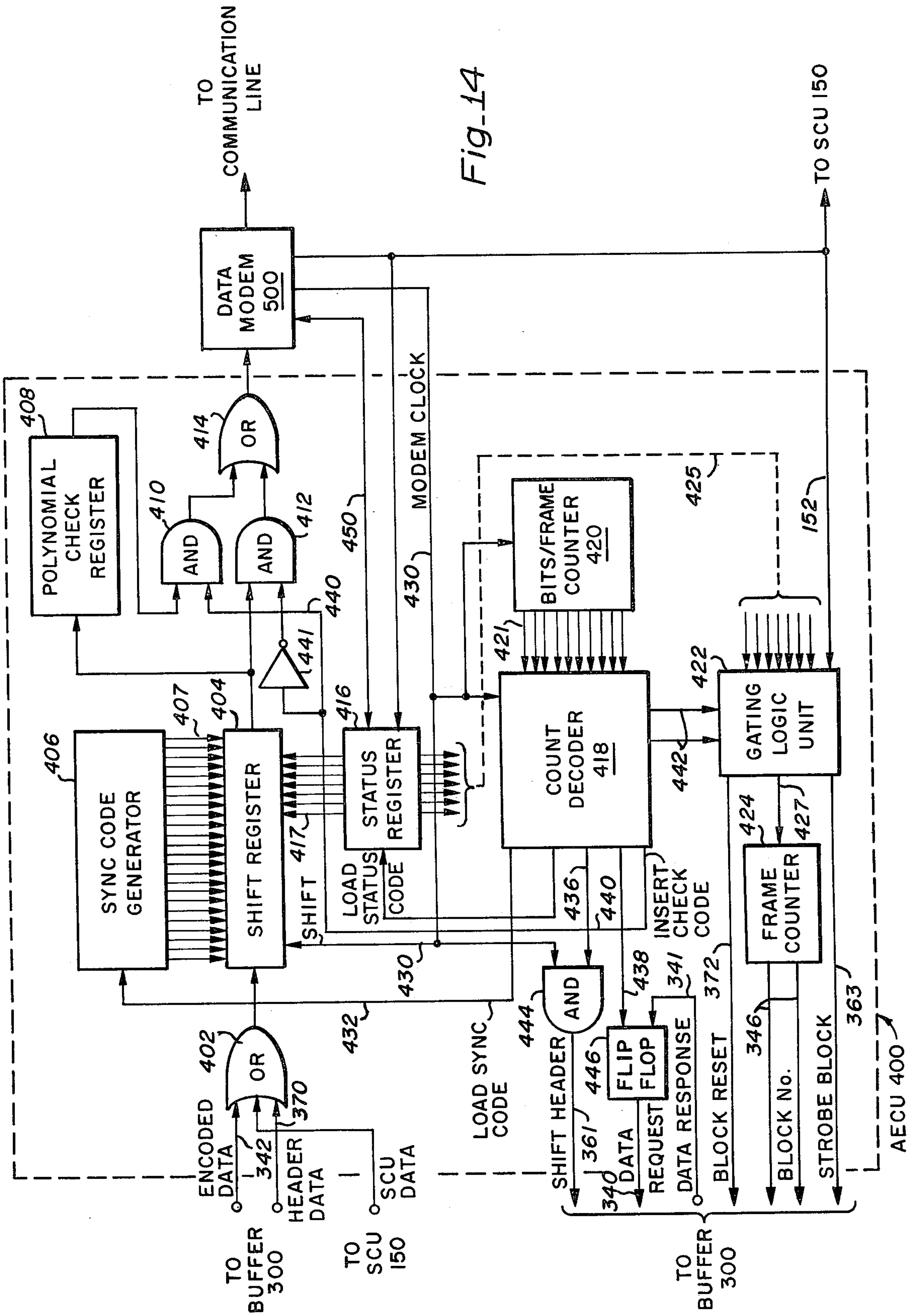
Figure 15:
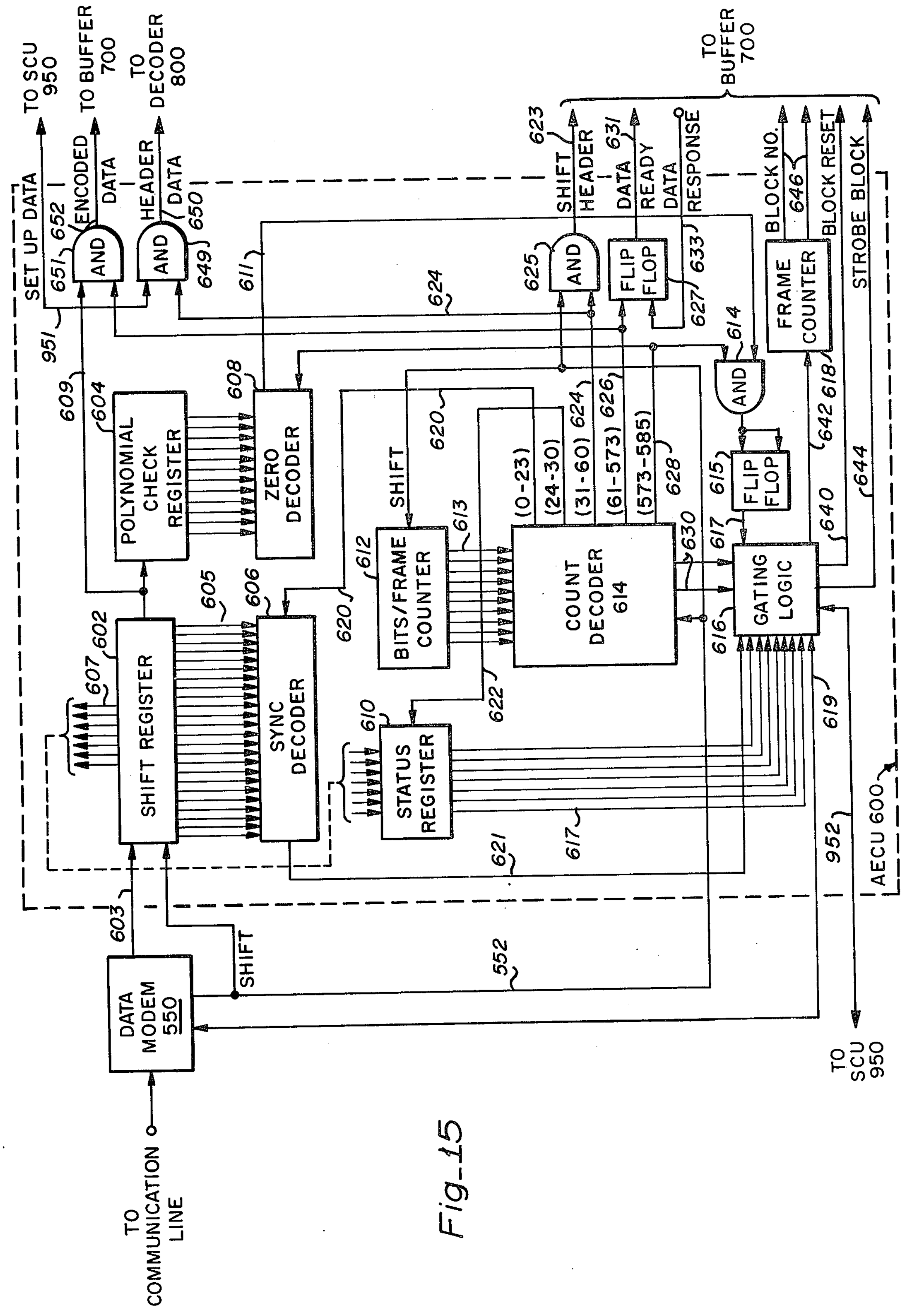
Figure 16:
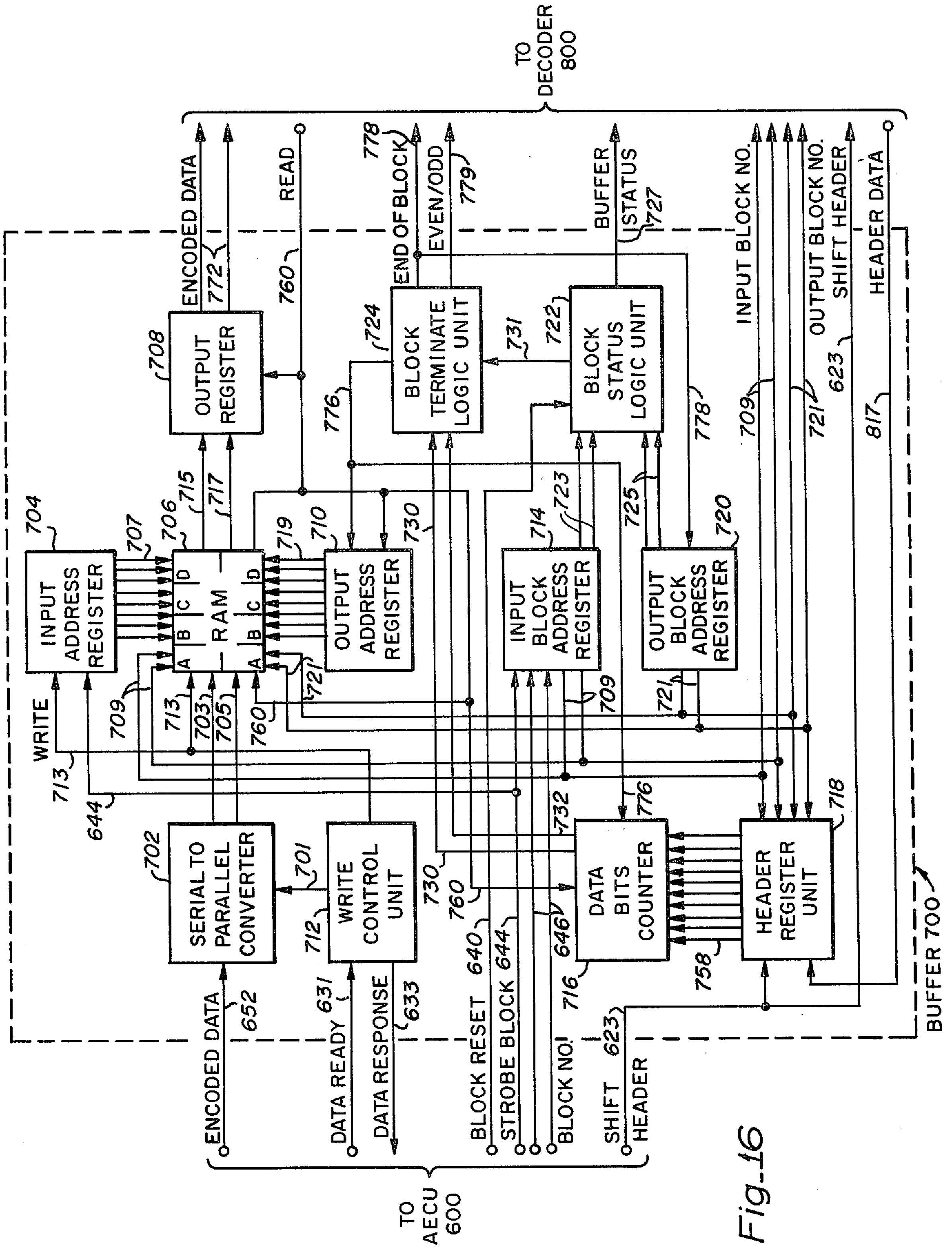
Figure 17:
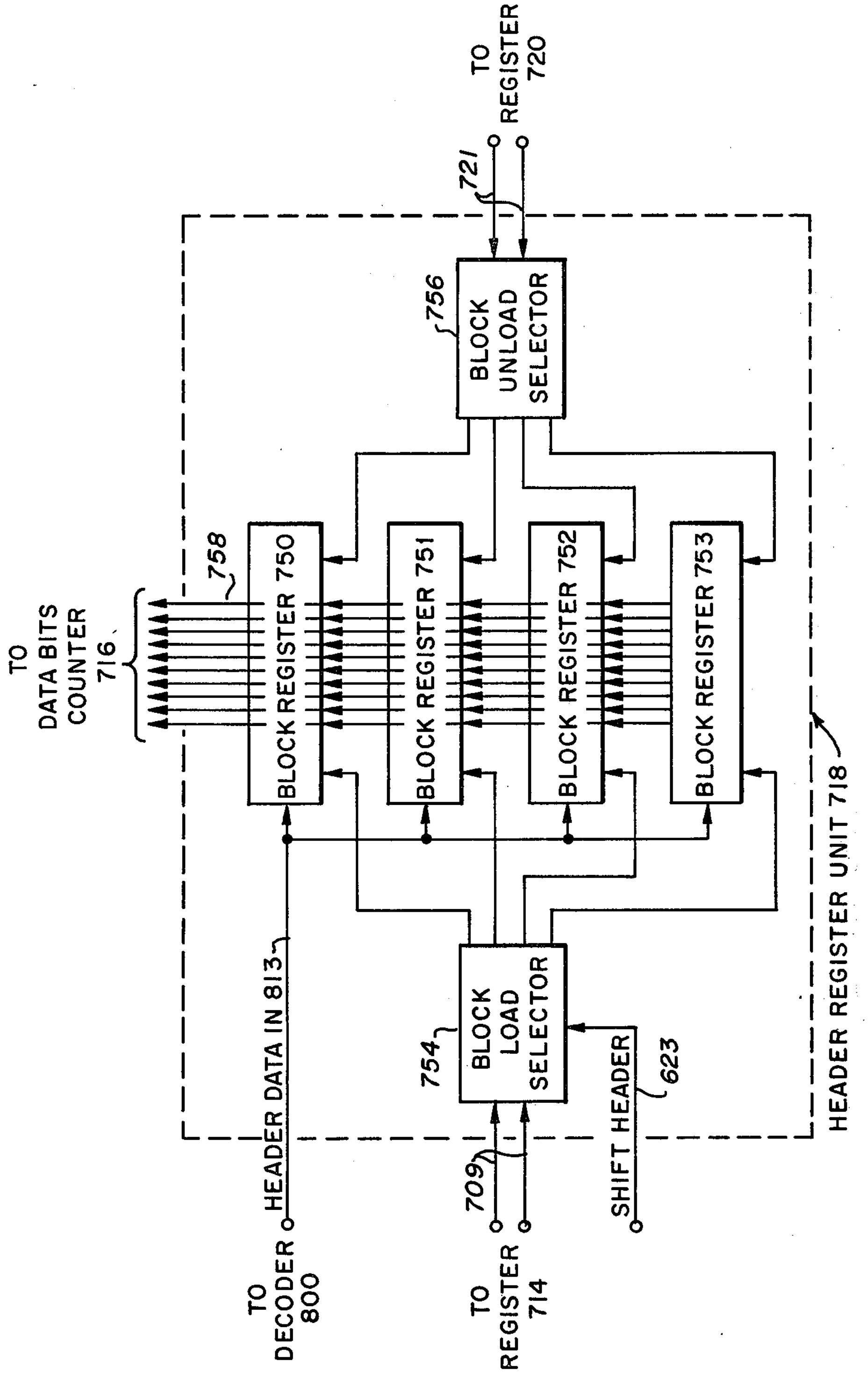
Figure 18:
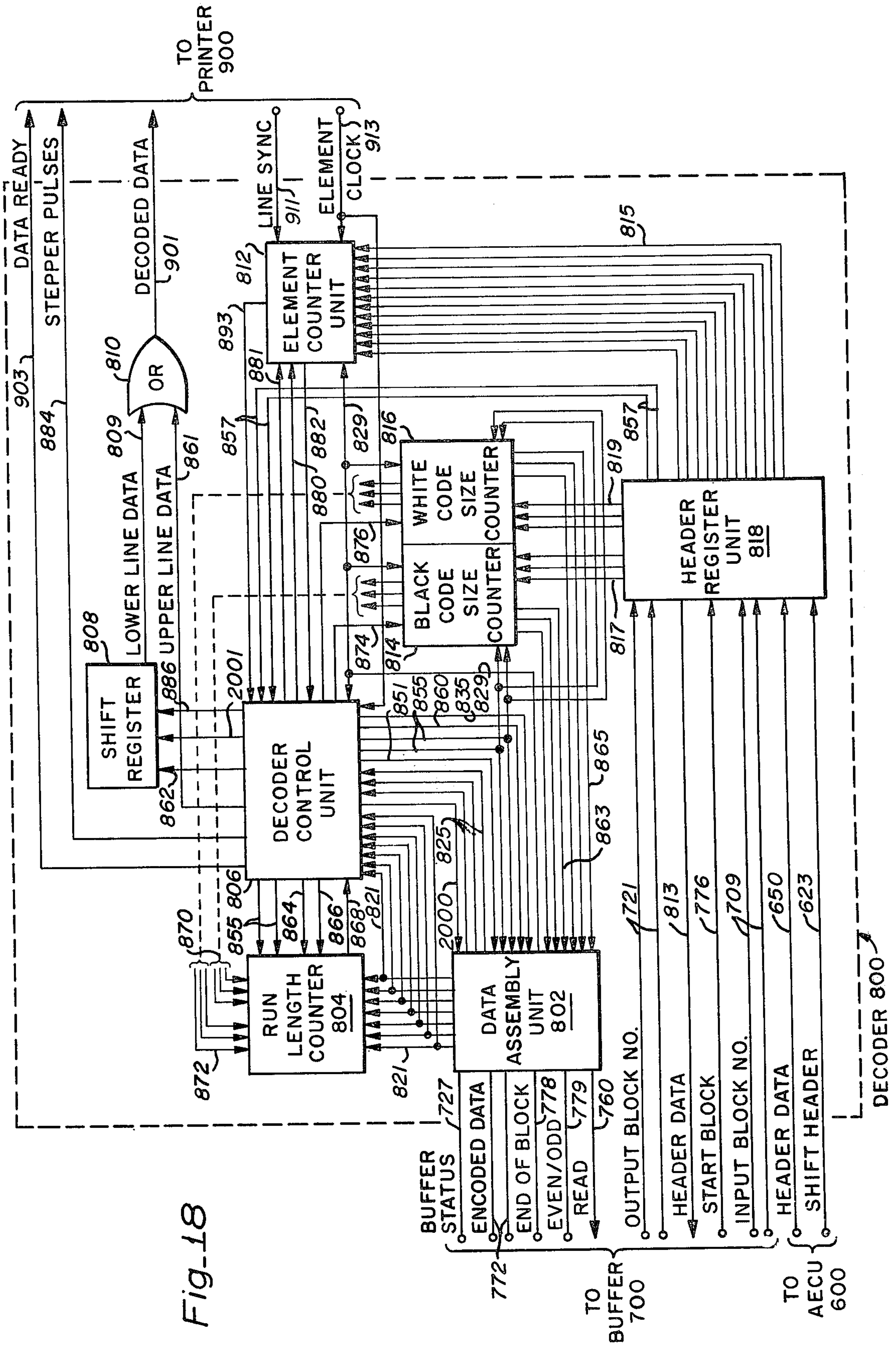
Figure 19:
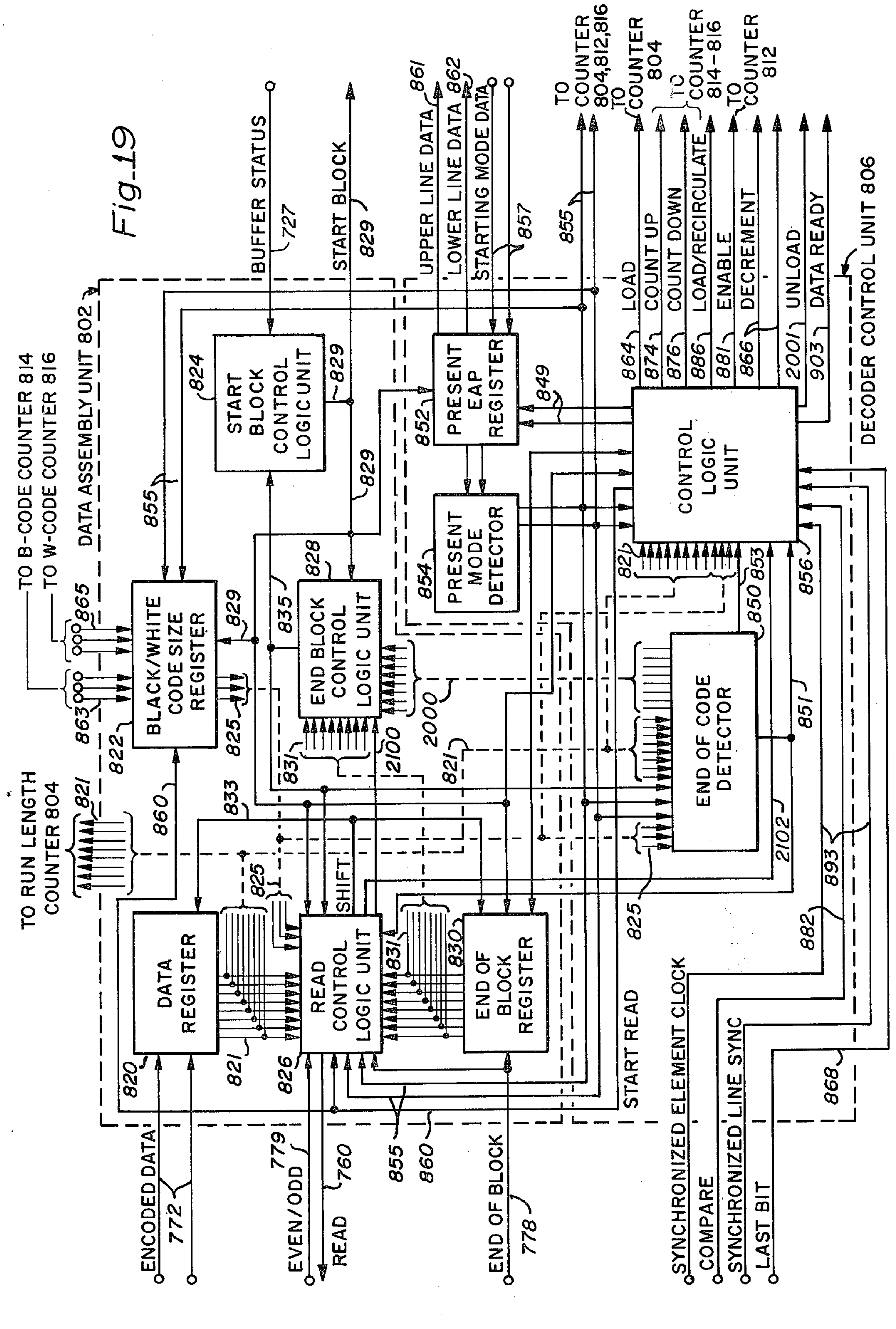
Figure 20:
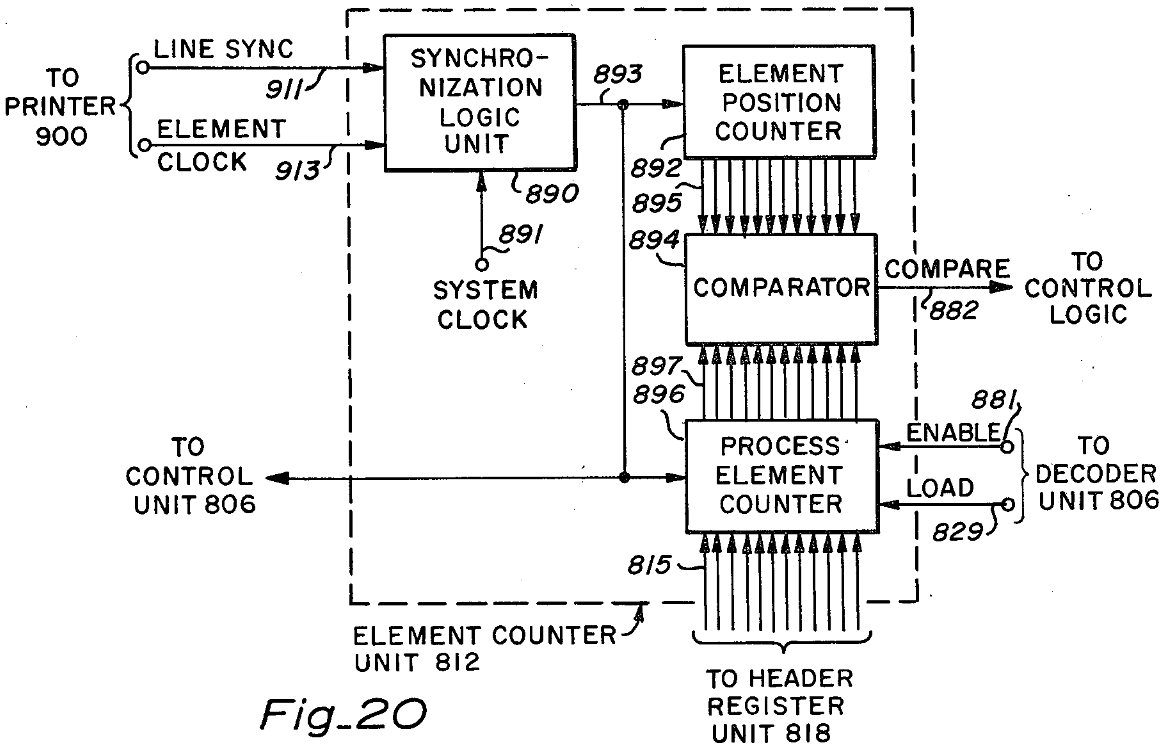
Figure 22:
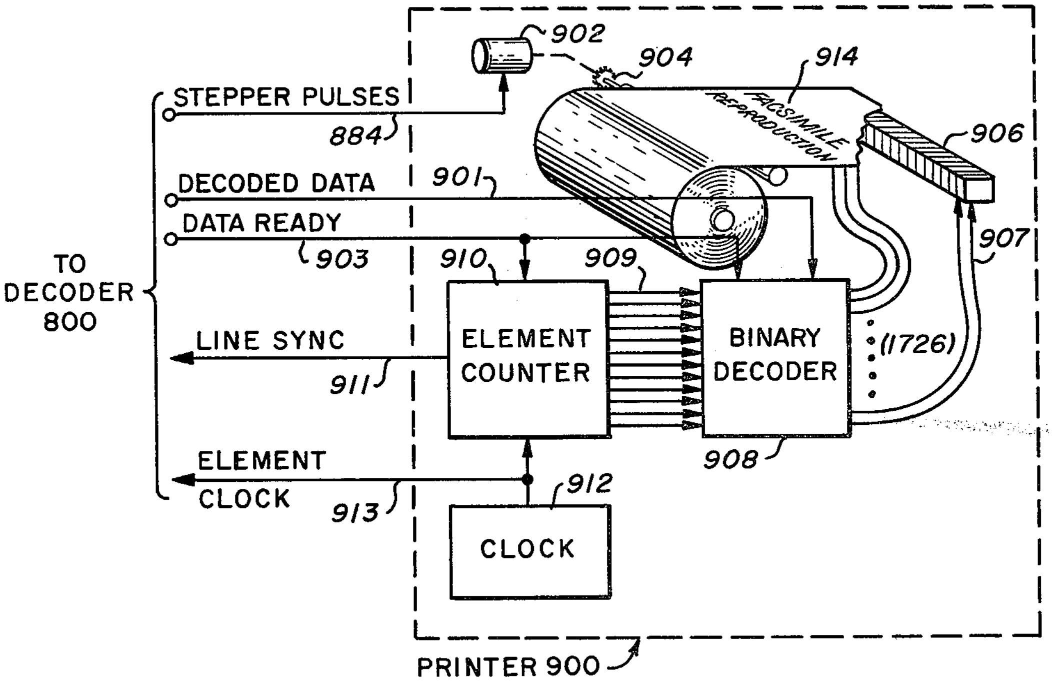
Figure 21:
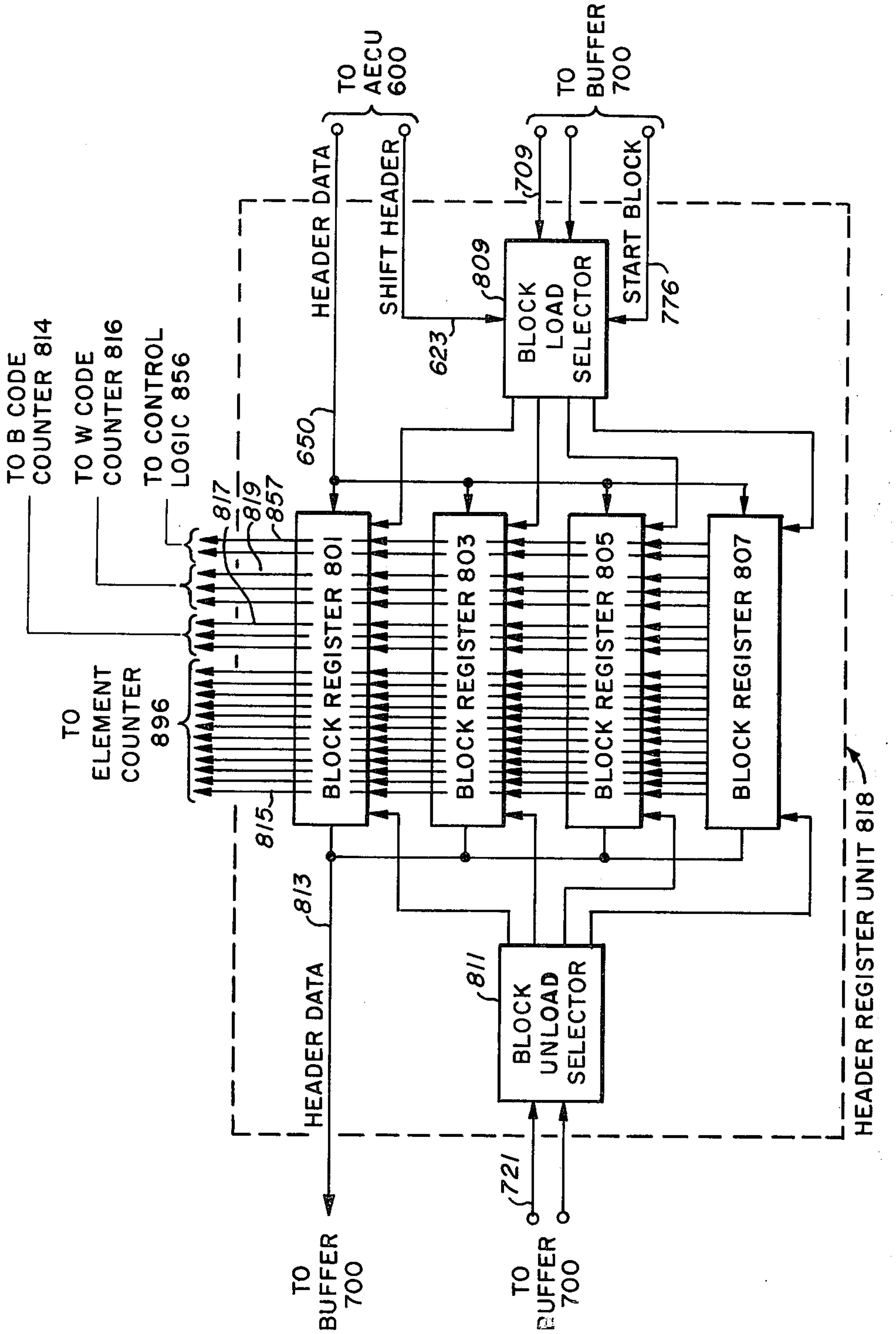

FIG. 11*a* is a flow diagram illustrating operation of the encoder shown in FIG. 7;

FIG. 12 is a block diagram schematically illustrating the transmitter buffer shown in the system depicted in FIG. 5;

FIG. 13 is a block diagram schematically illustrating the header register unit shown in the buffer depicted in FIG. 12;

FIG. 14 is a block diagram schematically illustrating the Assembly and Error Control Unit (AECU) and the data modem shown in the system depicted in FIG. 5;

FIG. 15 is a block diagram schematically illustrating the receiver data modem and AECU shown in the system depicted in FIG. 5;

FIG. 16 is a block diagram schematically illustrating the receiver buffer shown in the system depicted in FIG. 5;

FIG. 17 is a block diagram illustrating the header register unit shown in the buffer depicted in FIG. 16;

FIG. 18 is a block diagram illustrating the decoder shown in the system depicted in FIG. 5;

FIGS. 19–21 are block diagrams illustrating various components of the decoder depicted in FIG. 18; and FIG. 22 is a diagram schematically illustrating the printer shown in the system depicted in FIG. 5.

DETAILED DESCRIPTION OF THE PREFERRED EMBODIMENTS

Figure 1:
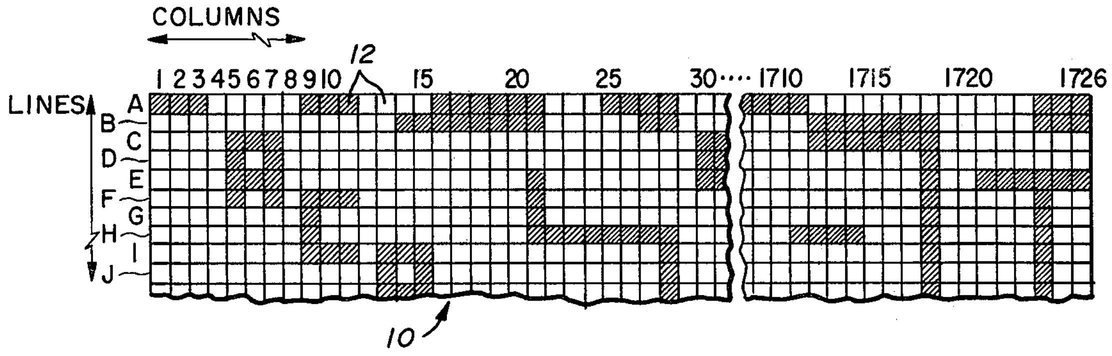
FIG. 1 is an illustration showing fragments of a document containing arbitrary indicia and depicting the subdivision of the document into elemental areas.
Figure 1A:
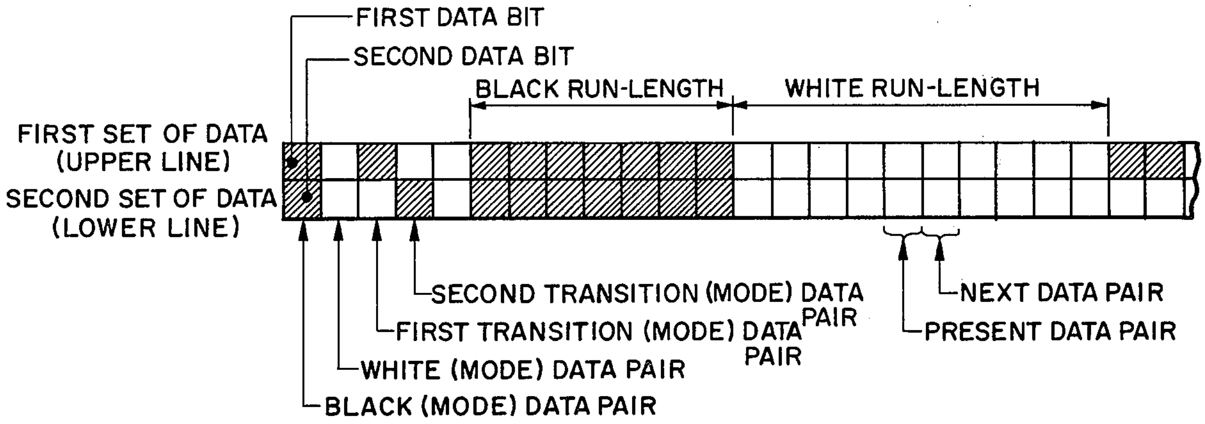

Referring now to FIG. 1 of the drawing, a document 10 containing printed subject matter (shown shaded) is partially illustrated. The face of document 10 is, for purposes of illustration, divided into alphabetically designatd rows and numerically designated columns. The intersections of the various rows and columns define a plurality of "elemental areas" 12 each of which is defined as being either "black" (the shaded areas) or "white" (the unshaded areas) as referenced to a selected standard. For example, lighter grays may be considered white where darker grays are considered black. In accordance with a preferred embodiment of the present invention, the maximum scan width is 8½ inches and a document of this width will be scanned such that each row is in effect divided into 1,726 elemental areas 12. The number of elemental areas in each column is determined by the vertical length of the document 10, i.e., from top to bottom. Electrical signals which are developed in response to a scan of the elemental areas are designated "scan data." As an example, the scan data developed to correspond to a black elemental area might have a potential of zero volts whereas the scan data corresponding to a white area might have a potential which is positive, or even negative with respect to zero.

THE DUAL-LINE ALGORITHM

Although each line of elemental areas 12 could be scanned and treated independently, as in accordance with the single line algorithm disclosed in the above mentioned Weber application, the present invention involves a dual-line compression/reconstruction algorithm wherein the data contained within an "upper" elemental area lying in one line and an adjacent "lower" elemental area lying there-beneath in the following line are treated as a unit for encoding purposes in order to effect a further transmission line compression of the scan data. In implementing the dual-line algorithm, document 10 may still be scanned one line at a time, but the scan data is processed two lines at a time. Alternatively, two adjacent lines could be scanned simultaneously, but it has been found that this generally involves a more complicated scanning operation than does the case where the first of the two lines is scanned and stored electronically and is then processed simultaneously with the scan data obtained during the scanning of the second line.

In the following explanation of the dual-line algorithm, any two (upper and lower) elemental areas 12 which are simultaneously processed will be referred to as an Elemental Area Pair, abbreviated "EAP." In the dual-line algorithm, and as illustrated in FIG. 1(*a*), a particular EAP may take any one of four possible data states and will be identified as a black (B) data pair where both elemental areas are black; a white (W) data pair where both elemental areas are white; a first transition ($T_1$) data pair where the upper elemental area is black and the lower elemental area is white; and a second transition ($T_2$) data pair where the upper elemental area is white and the lower elemental area is black. Although the scan data corresponding to the upper and lower elemental areas of a particular EAP are obtained during separate scans of the document face, the two bits of scan data are merged into a single entity (the data pair) immediately upon entering the encoder portion of the system and the data pair is thereafter treated as a unit until it reaches the document reproduction printer. Each transition data pair is treated separately but run lengths of black or white data pairs are treated jointly to effect the compression technique described below.

Figure 2:
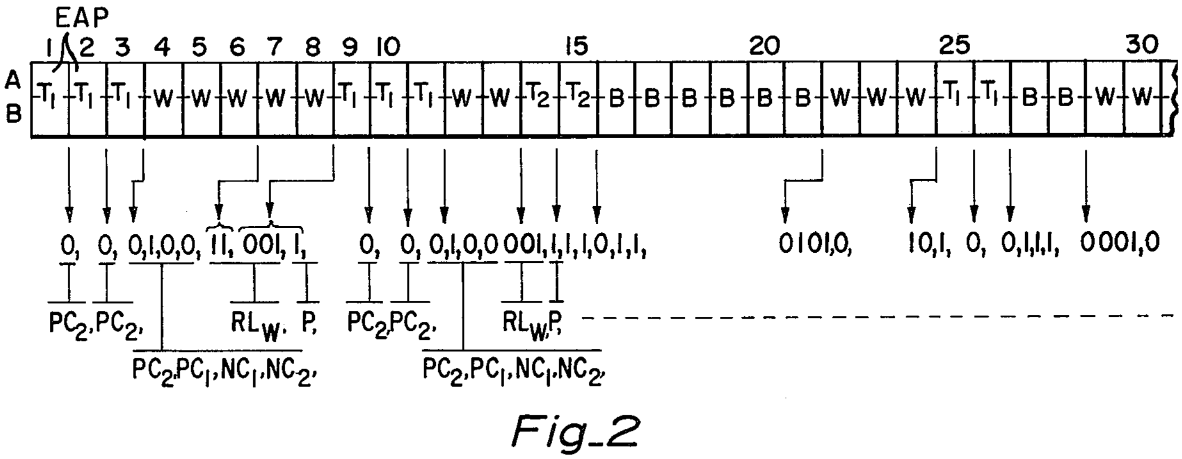
FIG. 2 is a diagram illustrating in part the manner in which the data contained in the document shown in FIG. 1 is encoded in accordance with the dual-line algorithm of the present invention.

An example of the way in which the scanned data is treated in terms of a series of EAP's is shown in FIG. 2 wherein the first 30 EAP's of the document illustrated in FIG. 1 are represented by their corresponding data states. For instance, the data corresponding to the first three EAP's is of the transition one ($T_1$) state, the data corresponding to the next five EAP's is of the white (W) state, etc. Beneath the illustration, the corresponding binary data bits developed in accordance with the dual-line algorithm are shown. These data bits make up the "encoded data" which forms a portion of the transmission frame format to be discussed presently.

Figures 3, 4:
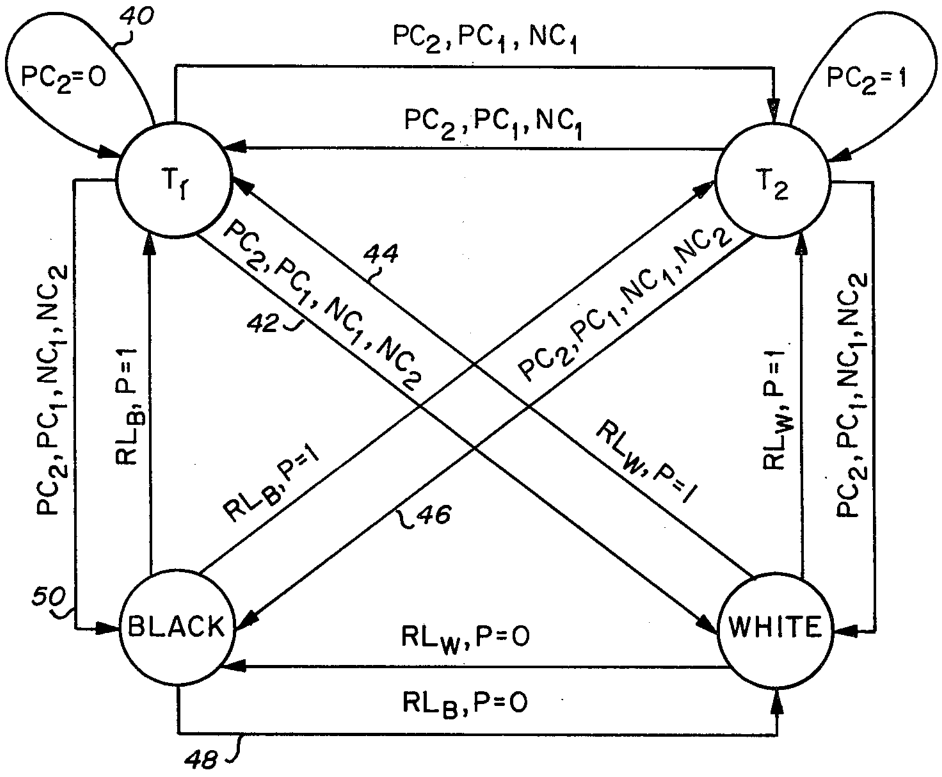
FIG. 3 is a diagram illustrating certain encoding rules utilized in implementing the present invention.
FIG. 4 is a diagram illustrating the contents and format of a transmission frame in accordance with the present invention.

FIG. 3 of the drawing is an Encoding Rules Diagram illustrating certain rules to be followed in converting the EAP data into binary code in accordance with the dual-line algorithm. In the selected binary code, black elemental areas are designated by a binary 1, and white elemental areas are designated by a binary 0. The dual-line algorithm requires that encoded data be developed only following a transition from one data state to another. There is an exception, however, that where succeeding EAP's are of the same transition state, encoded data is to be developed following each transitional EAP. Accordingly, the indicia over the arrows in the diagram indicate the form of the encoded data to be developed at each transition.

In the diagram, $PC_1$ (present column, upper line) means the binary character corresponding to the upper elemental area of the present EAP; $PC_2$ (present column, lower line) means the binary character corresponding to the lower elemental area of the present EAP; $NC_1$ (next column, upper line) means the binary character corresponding to the data contained within the upper elemental area of the immediately succeeding EAP: $NC_2$ (next column, lower line) means the binary character corresponding to the data contained within the lower elemental area of the next succeeding EAP; P is an additional prefix bit which may be either a binary 1 or a binary 0 depending upon the particular type of transition involved; and $RL_W$ and $RL_B$ are the "run lengths" of black EAP's and white EAP's respectively, expressed in terms of "adaptive code." A run length is defined as being the number of successive EAP's of the same black state or white state preceding a transition. The adaptive code is in the form of a binary "code term" including one or more binary "code words" which express a particular run length in terms of a number of binary characters.

The code words contained within a particular code term include several binary data bits the number of which are selected from the series $n$, $n+1$, $n+2$, ... $n+m$, where $n$ and $m$ are selected integers. As used herein the "size" of a particular code word refers to the number of binary data bits used to make up the code word, i.e., the "bit length" as it is sometimes referred to. For example, a code word of size $n+2$, where $n=2$, will include four data bits. Each code word is capable of indicating up to a certain number of EAP's. For example, a code word of n bits would be capable of representing up to X EAP's, whereas a code word of $n+1$ bits would be capable of representing up to Y EAP's, where Y is a number larger than X. In other words, the code term corresponding to a particular run length will contain a first binary code word capable of indicating up to a first number of EAP's and if the total number of EAP's in that run length exceeds the capacity of the first code word, then the code term will contain a second code word, typically one binary character longer than the first code word and capable of indicating up to a second particular number of additional EAP's in the run length, etc., up to the maximum code word size.

In the preferred embodiment, the minimum code word size is two data bits ($n=2$) and the maximum code word size is $n+5$ or seven data bits. As indicated in Table 1 below, 00 corresponds to 1 EAP and 11,000 corresponds to 4 EAP's; the three bit code word 000 corresponds to 1 EAP and 111,0000 corresponds to 8 EAP's; etc.

ADAPTIVE CODE WORDS

| 2 Bit (n=2) Binary | No. EAP's | 3 Bit (n+1) Binary | No. EAP's | 4 Bit (n+2) Binary | No. EAP's |
|---|---|---|---|---|---|
| 00 | 1 | 000 | 1 | 0000 | 1 |
| 01 | 2 | 001 | 2 | 0001 | 2 |
| 10 | 3 | . | . | . | . |
| 11,000 | 4 | . | . | . | . |
| | | . | . | . | . |
| | | . | . | . | . |
| | | 110 | 7 | 1110 | 15 |
| | | 111,0000 | 8 | 1111,00000 | 16 |

| 5 Bit (n+3) Binary | No. EAP's | 6 Bit (n+4) Binary | No. EAP's | 7 Bit (n+5) Binary | No. EAP's |
|---|---|---|---|---|---|
| 00000 | 1 | 000000 | 1 | 0000000 | 1 |
| 00001 | 2 | 000001 | 2 | 0000001 | 2 |
| . | . | . | | . | . |
| . | . | . | | . | . |
| 11110 | 31 | 111110 | 63 | 1111110 | 127 |
| 11111,000000 | 32 | 111111,0000000 | 64 | 1111111,0000000 | 128 |
| | | | | 1111111,0000001 | 129 |
| | | | | . | |
| | | | | . | |
| | | | | . | |

A code word comprised of all 1's indicates a "continue" condition and thus another code word must follows even if the "filled" code word corresponds exactly to the number of EAP's in the run length. The following code word must, however, normally be one binary bit larger than the filled code word. As previously indicated, the following code word is the binary number which corresponds to the number of EAP's in the run length in excess of those accounted for by the preceeding code word and if that code word is also filled to capacity, as evidenced by an "all 1" condition, still another code word must be developed, etc.

As an example, where the first code word in a code term is of two bits ($n$=2), a run length of 30 EAP's would be represented by the code term 11,111,1111,00100 which is comprised of a first code word of $n$ bits (11), a second word of $n$+1 bits (111), a third word of $n$+2 bits (1111), and a fourth word of $n$+3 bits (00100). Since only 14 data bits are required to represent thirty EAP's, the fact of data compression is readily appreciated. When the maximum code word size is reached, if the capacity of that code word is not sufficient to represent the remainder of the run length, then another code word of the same (maximum) size, and if that code word still cannot satisfy the requirement still another code word must be developed, followed by other code words of like size until the run length is accounted for.

The compression technique is adaptive in that the size of the first code word of each succeeding code term is determined by the size of the last code word of the preceding code term representing a run length of the same data state. The size of the first code word may either be incremented or decremented. For example, where a present black run length requires a code term including a two bit code word ($n$), a three bit code word ($n$+1) and a four bit code word ($n$+2), the first code word in the code term representing the immediately black run length would be a four bit code word. If then the run length is so short that the four bit code word is filled to less than some selected percentage of its capacity, say for instance 25 percent, then the first code word in the code term representing the next following black run length, which would otherwise have been a four bit code word ($n$+2), will be decremented to a three bit code word, i.e., ($n$+2)−1 = $n$+1.

The encoding rules schematically illustrated in the diagram may perhaps best be explained by way of a specific example. Thus, again referring to FIGS. 1 and 2, it will be remembered that FIG. 2 illustrates the data states of a first 30 EAP's obtained in scanning the first two lines of document 10. For purposes of this example, it will be assumed that a minimum code word size of $n$ = 2 have been chosen for the black run lengths.

The first EAP, AB1, is of a transition one ($T_1$) state and so is the next EAP, AB2, thus arrow 40 indicates the relationship between AB1 and AB2, and accordingly, a $PC_2$ bit should be generated. Likewise, AB3 is of a $T_1$ state, so a $PC_2$ bit should also be generated following AB2. However, following the third EAP, AB3, there is a transition to a white EAP, and according to arrow 42, four data bits corresponding to $PC_2$, $PC_1$, $NC_1$ and $NC_2$ must be developed. Noting the definitions of these abbreviations given above, each may be translated into binary characters remembering that binary 1's are used to represent the black elemental areas and binary 0's are used to represent the white elemental areas in FIG. 1. Accordingly, the first six bits are 0,0,0,1,0,0.

Now, observing that the next five EAP's are white and then EAP AB9 changes to a $T_1$ state, arrow 44 of the diagram indicates that an $RL_W$ must be generated followed by a P-code character. In developing a code term for $RL_W$, an attempt is made to represent this run length using a single two bit binary code word. However, as pointed out previously, a run length of five EAP's exceeds the capacity of a two bit code word. Therefore, the two bit continued code 11 will be generated followed by the three bit code word 001 which represents the additional 2 EAP's in the run length. A prefix code, or P-code, of 1 must now be generated to indicate that the following data changes back to a $T_1$ state.

Following the ninth and the tenth EAP's $PC_2$ data bits in the form of 0's will be generated as per the diagram (arrow 40). Following AB11, there is a transition back to a white run length and as per arrow 42, four data bits, 0100 must be developed which correspond to $PC_2$, $PC_1$, $NC_1$ and $NC_2$. The scanned data then transitions to a white run length of 2 EAP's. Noting that the encoding rules require that the first code word in a particular code term must take the code word size of the last code word in the preceeding code term of the same data state, it will be apparent that a three bit code word must be used. Accordingly, at the end of the run length, namely at the end of AB13, reference must be made to the diagram to determine the code format. The diagram indicates that a code term identifying the run length $RL_W$ must be generated followed by a P-bit of 1, thus, the bits 001,1 are generated. At this time the white code length is decremented back to two bits because $RL_W$ is less than ¼ of the code word capacity. AB14 is a $T_2$ transition and is accordingly represented by a 1. However, following AB15, there is a transition to a black run length, so reference must be again made to the diagram, and according to arrow 46, the proper code following AB15 is 1,0,1,1.

The following black run length is then counted and found to contain 6 EAP's followed by a transition to a white run length of 3 EAP's. Thus, arrow 48 of FIG. 3 indicates that following AB21, the run length code $RL_B$ is to be generated followed by a P-bit of 0. Since the black code length is initially a four bit code, this run length will be represented by the four bit code word 0101 and will be followed by a 0 P-bit. The white run length is followed by a $T_1$ transition and, as indicated by arrow 44, will be represented by a two bit code 10 followed by a P-bit of 1. The $25^{th}$ EAP is a $T_1$ transition followed by another $T_1$ transition and will therefore be represented by a 0. Since the $26^{th}$ EAP is a $T_1$ transition followed by a black run length, as per arrow 50 of FIG. 3, the four data bits 0,1,1,1 must be developed.

The following black run length is only 2 EAP's in length and since the last black code word in the previous black code term was four bits in length, a four bit code word will be required here. Thus, at the end of AB28, the two bit black run length will be indicated by the four bit code word 0001 followed by a P-bit of 0. Note that 2 EAP's is less than 25 percent of the capacity of the four bit code word, and therefore even though the present code word must have a code length of 4, the first code word for the next succeeding black run length will be decremented to a code word length of three data bits.

In accordance with the preferred embodiment, this process will normally be continued until a total of up to 512 data bits has been generated, at which time the now encoded data is arranged in a particular format providing a frame of data suitable for transmission. Once the transmitted encoded data is received, it may be decoded by a simple inverse application of the encoding rules shown in FIG. 3.

The Transmission Frame Format

Before describing a preferred embodiment of a system for encoding (compressing), transmitting and decoding (reconstructing) scanned data in accordance with the algorithm previously described, a digression will be made to explain the transmission frame format used in the preferred embodiment. As illustrated in FIG. 4 of the drawing, the frame format includes 585 bits of binary data including a synchronization (sync) code, a status code, a quantity of header data, a quantity of encoded data, and a polynomial check (polycheck) code.

The synchronization code is comprised of 24 data bits forming a fixed code which is used to insure that the transmitter and receiver are at all times operationally synchronized.

The status code includes 7 data bits which are generated by the transmitting AECU and which are used to communicate its status to the receiving AECU.

The header data is included in a "block" of 30 data bits which represent certain characteristics of the encoded data that must be known to the receiver to permit proper decoding and subsequent reconstruction of the scanned data. The header data includes a 10 data bit quantity which identifies the number of useful data bits contained within the encoded data, since in many cases the number of encoded data bits will be less than the permissible quantity of bits. The next quantity of header data includes 12 data bits that are used to define the position on the face of the scanned document which corresponds to the first encoded data bit in that frame. The element position data is followed by a three-bit black code word and a three-bit white code word which are used to identify the respective sizes of the first black code word and the first white code word in the encoded data in that frame. The last quantity in the header data includes two data bits which identify the mode of the first EAP in the encoded data. The first bit indicates whether the upper elemental area in the first EAP is black or white and the second bit indicates whether the lower elemental area in that EAP is black or white.

Following the header data, 512 bits are allocated to form a "block" of encoded data. As will be readily appreciated, the actual scan length which can be represented by the 512 bits will be determined by the type of indicia which appears on the face of the document being scanned. For example, where the scanned data includes long runs of either black or white indicia, substantial compression will be achieved and a relatively large number of scanned lines can be encoded and accounted for by a single frame. However, where the second data frequently transitions from black to white, a lesser number of scanned lines can be accommodated by a single frame.

Following the encoded data portion of the transmission frame are 12 data bits which are used to transmit a polycheck code of insuring that the data received is at least substantially identical to the transmitted data. The polycheck code is a binary number representing the remainder of a division of the preceding 573 data bits by a predetermined polynomial. Thus, in addition to the encoded data, the transmission frame includes 73 bits, approximately half of which are related to the encoded data, with the other half being primarily associated with insuring that the system is functioning properly.

Alternatively, the dual-line algorithm may be defined in terms of a method of using three types of code terms; a first type of code term for data pairs having unlike data bits, a second type of code term for run lengths of like data pairs having like data bits, and a third type of code term for indicating the relationship between adjacent code terms of the first and second types. For example, as indicated by the encoding rules diagram of FIG. 3, it will be noted that for each transition data pair ($T_1$ configuration or $T_2$ configuration), a code term comprised of a single data bit corresponding to the present column lower line ($PC_2$) data is initially developed, and for each run length, be it black ($RL_B$) or white ($RL_W$), a second type of code term is developed.

It will further be noted that each time there is a transition between either of the first two types of code terms, a third type of code term (a transition code term) is developed which includes from one to three binary characters, depending upon which type of code term follows the previous code term. For example, when a black run length is followed by a white run length or a transition data bit, a single P-bit is developed to form the transition code word indicating the type of transition that is to be made.

Similarly, when there is a transition between one type of transition data pair and the opposite type of transition data pair, a two bit transition code term is developed. When the transition is from a transition data pair to a black or white run length, it will be noted that a three bit transition code term ($PC_1$, $NC_1$, $NC_2$), is used. In other words, the encoded data may be considered as being formed of a series of the three types of code terms wherein the third type of code term, i.e., the transition code term, is always disposed between successive first and/or second code terms.

Data Transmission System

Referring now to FIG. 5 of the drawing, a block diagram is shown of a preferred embodiment of a data transmission system for implementing the above described algorithm. The system includes a compressor-transmitter sybsystem typically disposed at one end of a communication link, such as a telephone line for example, and a receiver-reconstructor subsystem disposed at the other end of the communication link.

The compressor-transmitter subsystem includes a scanner 100 of any suitable type which is capable of scanning the face of a document on a line-by-line basis and developing electrical signals (scan data) which are commensurate with printed matter contained on the face of the document. The scan data is then input into an encoder 200 which encodes (compresses) the input signal in accordance with the above described algorithm to provide a block of encoded data, develops a block of header data and then outputs both blocks of data to buffer 300. Buffer 300 provides a temporary recepticle for the data and in response to signals developed by an Assembly and Error Control Unit (AECU) 400 outputs the two blocks of data along with additional control data (developed by AECU 400) into a data modem 500 and communication line 525.

The receiver-reconstructor subsystem includes a modem 550 and receiving AECU 600 which receives the transmitted data and after using portions of the control data to insure that it is correct, forwards the blocks of header data and encoded data to a buffer 700 and decoder 800. In response to signals developed by AECU 600, buffer 700 feeds the encoded data into decoder 800 which then decodes (reconstructs) the data to develop electrical signals suitable for driving a printer 900 to produce a facsimile of the original document.

In addition to the components mentioned above, the compressor-transmitter subsystem and receiver-reconstructor subsystem include System Control Units (SCU's) 150 and 950 respectively. These units contain power supplies, communication link addressing equipment, various mode selection controls and other interfacing controls necessary to the operation of the system.

The first step in initiating operation of the system is to input the necessary call-up and mode selection data into SCU 150 to establish communication with a particular remotely located receiver-reconstructor subsystem. Once this is done and the system is "on-line," the function of the SCU is merely supportive in nature. Therefor the SCU's will not be disclosed in detail.

For simplicity of disclosure, the system is illustrated in terms of a transmitting subsystem and a remote receiving subsystem operable to transmit data through a communication link in a single direction, however, it will be appreciated that in actuality the system is bidirectional and each subsystem has the capability of functioning as a compressor-transmitter or receiver-reconstructor to remotely reproduce a facsimile copy of an original document introduced at the other end of the system.

In order that a further understanding of the invention may be obtained, a presently preferred embodiment will now be described by referring to the following schematic block diagrams and flow diagrams.

COMPRESSOR-TRANSMITTER SUBSYSTEM

--Scanner 100--

Figure 6:
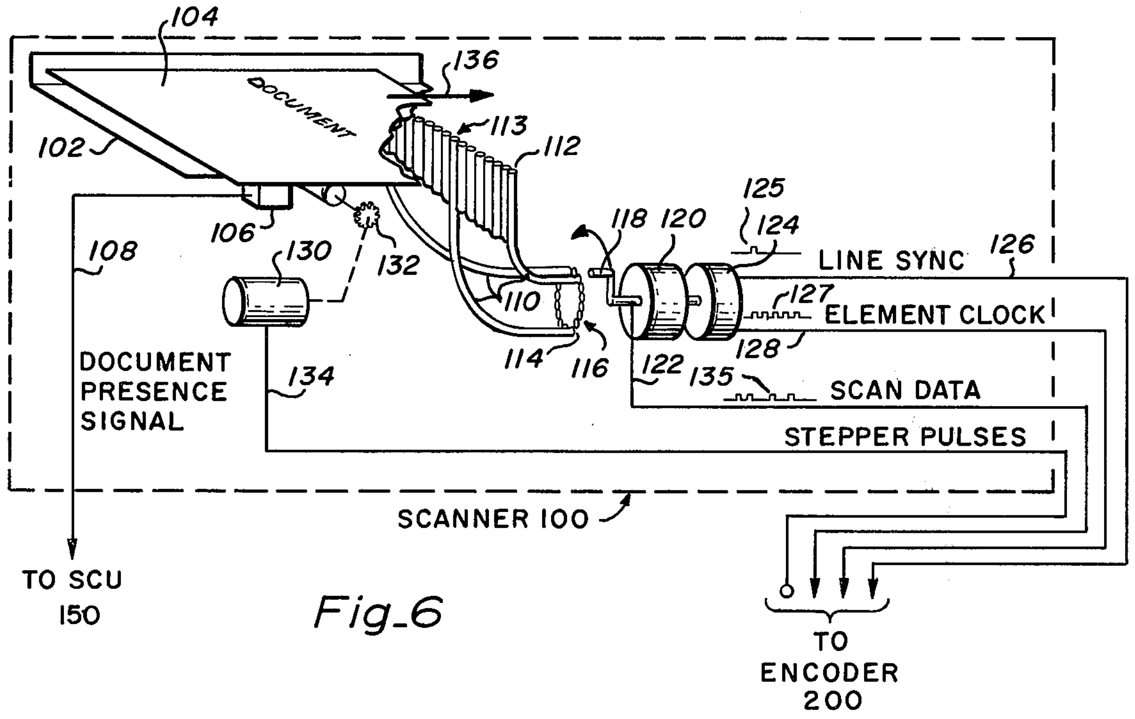
FIG. 6 is a diagram schematically illustrating one embodiment of the document scanner shown in the system depicted in FIG. 5.

Although the scanner 100 may include any suitable document scanning apparatus which is or can be made compatible with that system, the preferred embodiment schematically illustrated in FIG. 6 includes a platform 102 for receiving a document 104 containing printed matter, a facsimile of which is to be reproduced at a remote location. A microswitch 106 is positioned on platform 102 to sense the presence of the document 104 and develop a document presence signal on line 108 which is fed to SCU 150 to initiate the scanning operation. Scanner 100 further includes a large number of optical fibers 110 which are positioned with their light receiving ends 112 disposed to form a straight line 113 defining one "scan line." In the preferred embodiment the scan line is 8½ inches long and includes 1,726 fibers 110, i.e., one fiber for each of the elemental areas 12 in the lines illustrated in FIG. 1. The opposite ends 114 of fibers 110 are positioned in a circular array 116, and a photo-detector 118 having a sensitive face positioned proximate the ends 114, is driven around the array 116 by a motor 120 at a suitable scanning speed. In response to light reflected from the surface of document 104 and transmitted through fibers 110, photo-detector 118 develops electrical signals in the form of "scan data" which is output from scanner 100 on line 122.

A shaft encoder 124 is also keyed to and driven by motor 120, and develops "line sync" pulses 125 on the output line 126 and a plurality of element clock pulses 127 on the output line 128. One line sync pulse 125, and 1,726 element clock pulses 127 are developed for each revolution of photo-detector 118, i.e., one clock pulse 127 is developed for each fiber 110 (each corresponding to one elemental area 12). Scanner 100 also includes a stepper motor 130 and its associated drive mechanism 132 which, in response to a stepper pulse, input on line 134, advances document 104 by a predetermined distance (one scan line) in the direction indicated by arrow 136.

In operation, a document placed on platform 102 will actuate microswitch 106 which, in turn, develops a document presence signal that is fed to SCU 150. If SCU 150 has previously been properly addressed to put the system "on-line," a stepper pulse developed on line 134 by encoder 200 causes stepper motor 130 to rotate mechanism 132 until document 104 is advanced into a "line 1" position over the light receiving ends 112 of fibers 110. The amount of light which is reflected into each of the fibers 110 from the surface of document 104, is of course determined by the opacity of the printed surface, and those elemental areas having ink or other pigmenting materials deposited thereon in an amount greater than some reference amount, will transmit substantially less light into fibers 110 than those unprinted portions of the surface which are without the material, or at least have less than the reference amount of the material. The reference amount of material corresponds to a light threshold which may, of course, be determined by the sensitivity of photo-detector 118 or any subsequent electronics receiving the scan data.

As photo-detector 118 is revolved around the circular array 116 of fiber ends 114, it develops scan data on output line 122 in the form of electrical voltage pulses 135, the presence or absence of which is directly related to the presence or absence of printed matter appearing in line 1 of document 104. Shaft encoder 124 also responds to develop a line sync pulse 125 during the time that it takes photo-detector 118 to move from a position opposite the first optical fiber on the line, to a position opposite the last optical fiber on the line, these two fibers being positioned adjacent to each other in the circular array 116. In addition, shaft encoder 124 develops element clock pulses which correspond on a 1:1 basis with the number of optical fibers 110.

Following a scan of the first line of document 104 and the acceptance of the scan data by encoder 200, a stepper pulse is developed by encoder 200 and applied to stepper motor 130 to advance document 104 by a small increment in the direction of arrow 136 so that "line 2" is aligned with ends 112 of fibers 110, and the scanning sequence is repeated until the entire surface of document 104 is scanned line-by-line. Should encoder 200 for some reason require that the scan data be repeated, no stepper pulse will be sent to stepper motor 130 and photo-detector 118 will again output scan data from the present line.

--Encoder 200--

Referring now to FIG. 7 of the drawing, a generalized block diagram showing the principal components of encoder 200 is depicted and includes an element counter 202, a shift register 204, an encoder control unit 206, a run length counter 208, a black code counter 210, a white code counter 212, an element position register 214, a header register unit 216, and a data assembly unit 218. As in the other block diagrams of this disclosure, these various components are shown connected by a plurality of lead lines which are merely representative and understandably, do not necessarily correspond in number to the lead lines used to interconnect the actual components represented by the various blocks.

Figure 8:
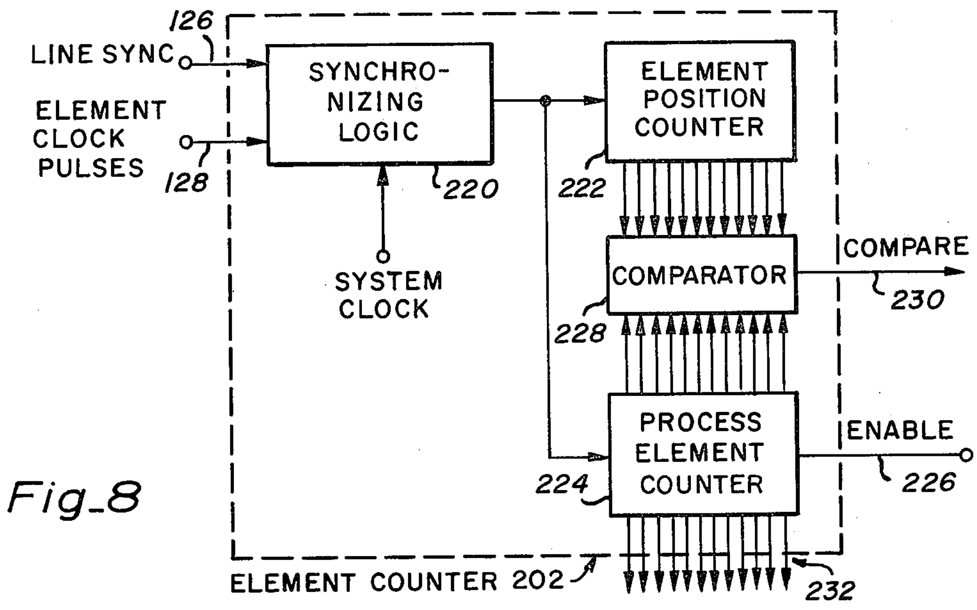
FIGS. 8–11 are block diagrams schematically illustrating various components of the encoder illustrated in FIG. 7.

Element counter unit 202 is shown in further detail in FIG. 8 to include certain synchronizing logic 220 which receives and synchronizes the line sync pulses and the element clock pulses developed by scanner 100 on lines 126 and 128 respectively, with the system clock (not shown). Once synchronized, the element clock pulses are used to increment an element position counter 222 and a process element counter 224. Element position counter 222 performs a continuous count of the 1,726 elemental areas as a line of document of 104 is scanned. However, process element counter 224 only counts during the time that it is enabled by an "enable" pulse input thereto from control unit 206 on line 226.

Correspondence between element position counter 222 and process element counter 224 is determined by a comparator 228 which develops a "compare" signal on output line 230 when coincidence is found to appear between the counts of counters 222 and 224. For example, should it be necessary to interrupt the scan data input to decoder 200, but before the scan of a particular line is completed, process element counter 224 will be disabled by a signal from control unit 206 and will retain the count of the last elemental area scanned before it was disabled. Element position counter 222 however, will continue to count as photo-detector 118 of scanner 100 continues to rotate. If then, at some later time, the scan data input is to be resumed, comparator 228 will develop a coincidence, or "compare" signal as counter 222 counts past the element position number retained in counter 224 and encoder control logic 206 will develop in response thereto, an enable signal on line 226 which causes counter 224 to resume counting.

The output of counter 224 is developed in binary form on lines 232 for input to element position register 214. It will be appreciated that where the number of elemental areas contained in one scan line is 1,726, as in the preferred embodiment, at least 11 output lines 232 will be required to develop a binary output of that magnitude. The twelve bits of element position data contained in the header includes one bit for future expansion. Element position register 214 is an ordinary parallel-load, parallel-unload storage register which stores the count developed by counter 224 until caused by a signal from control unit 206 (via line 213) to output the stored data to header register unit 216 through lines 233.

Shift register 204 is a 1,726 bit serial-load, serial-unload register which receives and stores an entire line at a time, e.g., data corresponding to the first line (and then subsequent odd numbered lines) of document 104. During the scan of line 2 (and other even numbered lines), control unit 206 develops shift pulses on line 234 which cause the stored line 1 data to be shifted into control unit 206 on line 236 in parallel with and in bit-by-bit correspondence with the line 2 data that is presently being input to control logic 206 on line 238. Register 204 also includes internal switching circuitry (not shown) for recirculating the line 1 data as it is being input to control unit 206 ao that if for any reason the line 2 data were to be interrupted, the line 1 data will be retained for a subsequent input to control unit 206. However, once the line 2 scan data is accepted by unit 206 and document 104 is advanced to a line 3 scan position, the line 1 scan data in register 204 is discarded.

Figure 9:
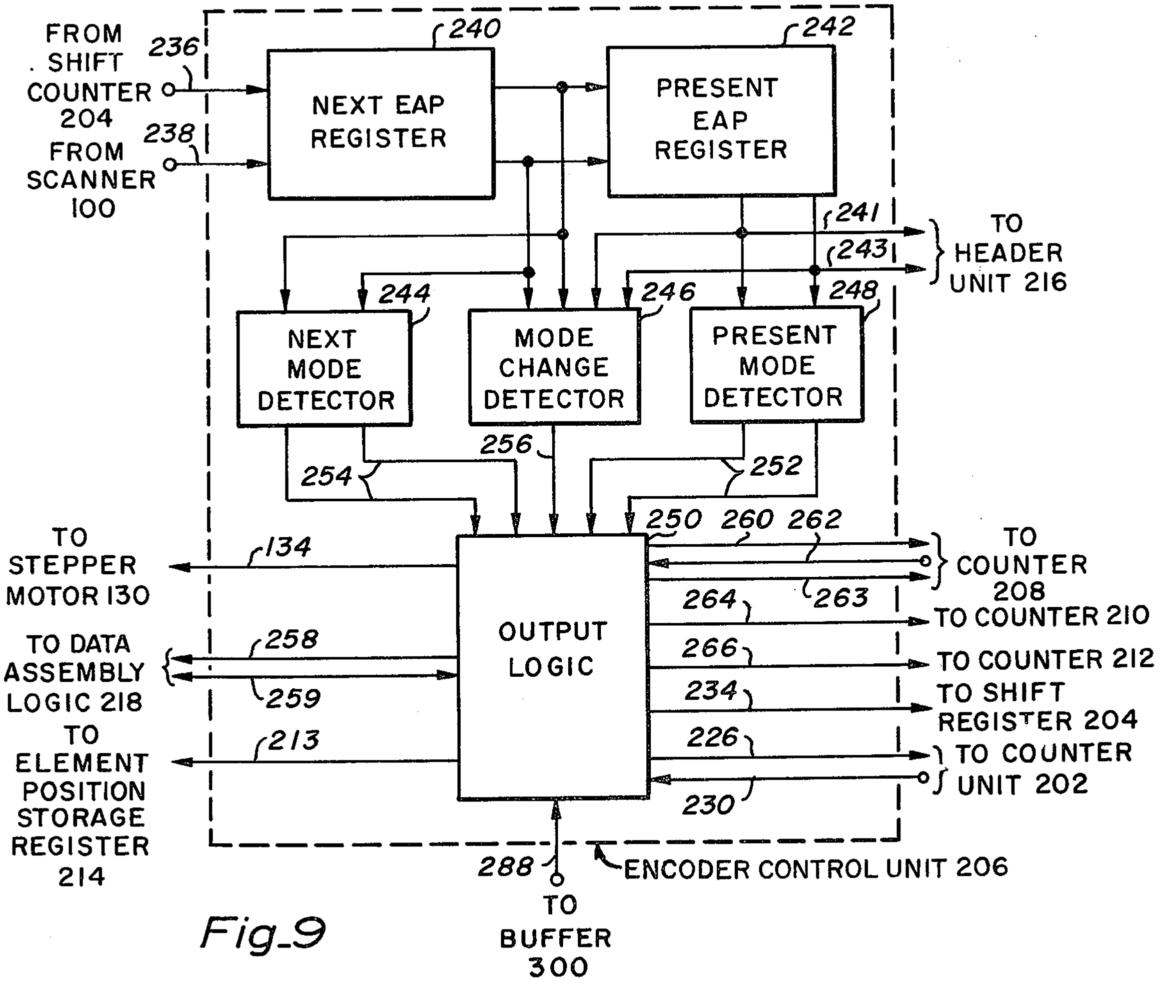

As illustrated in FIG. 9 of the drawing, control unit 206 includes a next EAP register 240, a present EAP register 242, a next mode detector 244, a mode change detector 246, a present mode detector 248, and output logic 250 designed to respond to the output signals developed by detectors 244–248 and to generate the various output signals explained below. Registers 240 and 242 are ordinary two-bit parallel-load, parallel-unload registers coupled together in series so that data shifted out of register 240 is shifted directly into register 242. Accordingly, when two bits of scan data corresponding to a particular EAP are in register 242, the two bits of scan data corresponding to the immediately following EAP are in register 240. For example, again referring back to FIG. 2 of the drawing, assuming data corresponding to EAP AB1 is in register 240, this data will be shifted out and into register 242 as data corresponding to EAP AB2 is input to register 240. Thus, the data shifted out of register 240 will always be that which corresponds to the "next" EAP following the "present" EAP data shifted out of register 242.

The "present" data shifted out of register 242 is coupled into present mode detector 248 which, in response thereto, develops an output signal on lines 252 indicating that the present EAP data is of one of three states; namely, that both elemental areas thereof are black, both elemental areas thereof are white, or one elemental area thereof is black and the other is white. The present EAP data is also input to mode change detector 246.

At the start of each encoded data block, two data bits corresponding to the data states of the first EAP in that block are coupled from the output of register 242 (FIG. 9) into header register unit 216 on the lines 241 and 243. The data on line 241 indicates the data state of the upper elemental area of the first EAP, and the data on line 243 indicates the data state of the lower elemental area in that EAP.

As the "next" EAP data in register 240 is shifted into register 242 it is also input to mode change detector 246 and next mode detector 244. Similar to detector 248, next mode detector determines whether the next EAP data is black, white, black/white, or white/black and generates a signal corresponding thereto on lines 254. The output of register 240 is also input to mode change detector 246.

Mode changes detector 246 responds to the data simultaneously output from registers 240 and 242, and compares the two sets of data to develop an output signal on line 256 which indicates whether the data states of the two adjacent EAP's being analyzed are alike or different.

Output logic 250 is designed to respond to the signals developed on lines 252, 254 and 256 and to develop, inter alia, output signals (transition data) on lines 258 and 260 which are in accordance with the encoding rules diagrammatically illustrated in FIG. 3. For example: each time the signals on lines 252 and 254 are alike, an "increment" pulse is developed on line 260 which causes run length counter 208 to count up one unit; each time there is a transition from white to black, black to white, or white or black to a transition state ($T_1$ or $T_2$), a P-bit will be developed on line 258 for input to data assembly logic 218; each time there is a transition from one transition state to a like transition state ($T_1$ to $T_1$, $T_2$ to $T_2$), a $PC_2$ bit will be developed on line 258; and each time there is a transition from a transition state to a white or black state, as indicated by the output of detector 246, $PC_2$, $PC_1$, $NC_1$ and $NC_2$ bits will be developed on line 258.

When run length counter 208 reaches a maximum count for a particular code word size, it develops a "counter full" signal on line 262 that is fed back to output logic 250. Logic 250, in turn, responds thereto and develops a "counter reset" signal on line 263, and a "count signal" on either line 264 or 266 for incrementing the code word size count contained in black code size counter 210 or white code size counter 212. In response to this signal, the appropriate code size counter will develop an output signal on one of the lines 268 and 270 which is fed back to run length counter 208 to establish the number of binary data bits currently being used by run length counter 208.

Output logic 250 also develops the previously described shift signals on line 234 for shifting data out of register 204 and into register 240. At the beginning of each frame, an unload signal is developed on line 213 which causes register 214 to unload its count into header unit 216. Black code size counter 210 and white code size counter 212 are conventional counters which develop three bit outputs on the lines 209 and 211 respectively, indicating the size of the current (or last) code word, and develop output signals on lines 268 and 270 for controlling the size of the code word counted by run length counter 208. The sizes of the first black and first white code words in each frame are input to header unit 216 on lines 209 and 211. Various control signals are communicated between logic 250 and data assembly unit 218 on line 259. A buffer "busy" signal is received from buffer 300 on line 288, and the previously described "compare" signal is received on line 230. In response to the buffer busy signal, logic 250 terminates activity of the various units it controls and waits until buffer 300 is ready to accept further data. When the busy signal terminates logic 250 reactivates the encoder. More specifically, when logic 250 receives a busy signal it disables process element counter 224 by removing the enable signal on line 226, as previously indicated, and stops shifting data into register 240. After the busy signal terminates, logic 250 responds to a coincidence signal received on line 230 and again enables counter 224 and resumes shifting data out of register 204. Logic 250 also develops a stepper pulse on line 134 following the scan of a document line, this pulse being operative to activate motor 130 to advance document 104 by one line.

In the preferred embodiment, run length counter 208 is a conventional counter having a seven bit maximum binary output of seven data bits to accommodate the selected maximum code word size of seven data bits. The output of counter 208 is coupled into data assembly logic 218 on the seven lines 272. Counter 208 includes circuitry which enables the counter capacity, in terms of the number of binary bits to be used (in accordance with a particular code word size), to be selected in response to the signals developed by code size counters 210 and 212 on lines 270 and 268 respectively. Should a run length count reach or exceed a selected code word capacity, or should the final count be less than a predetermined percentage of the capacity of the selected code word size, then counter 208 will develop an appropriate signal on line 262 which is fed back to control unit 206 for causing it to generate a black or white counter incrementing or decrementing signal on line 264 or line 266. Counter 208 is reset at the end of a run length by a signal developed by logic 250 on line 263.

Figure 10:
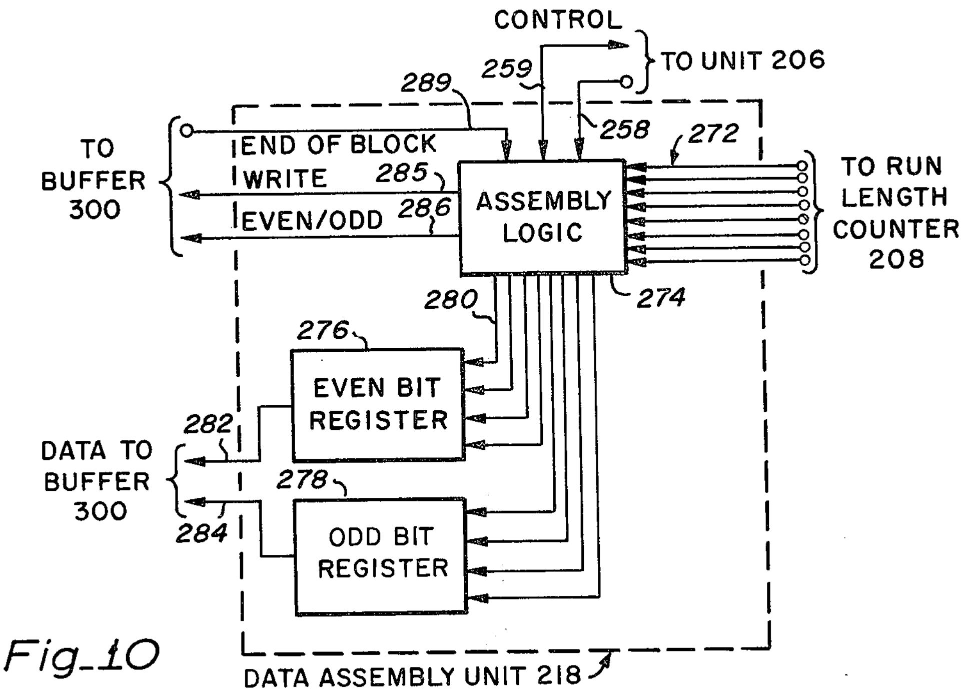

Referring now to FIG. 10 of the drawing, a simplified block diagram of the data assembly unit 218 is shown which includes certain data assembly logic 274, an "even" bit register 276, and an "odd" bit register 278. Assembly logic 274 receives the transition data developed on line 258 and sequences it with the run length data developed on lines 272 as per the encoding rules illustrated in the diagram of FIG. 3. It then assembles the data for output on the eight lines 280. Since the number of data bits output by run length counter varies from 2 to 7 in the preferred embodiment, and the number of transition bits varies from 1 to 4, it will be appreciated that the number of data bits assembled by logic 274 for output on lines 280 will also vary from 1 to 8 data bits. Furthermore, since it is desirable to handle the assembled "encoded data" two bits at a time, means must be provided for accommodating odd numbered quantities of data bits assembled by logic 274. Registers 276 and 278 and even/odd signals developed by logic 274 accomplish this task.

Four of the eight lines 280 are fed into even bit register 276 and the other four are fed into odd bit register 278. Registers 276 and 278 serialize the four bits of data input thereto for output to buffer 300 two bits at a time (one bit on each of the lines 282 and 284). The "write" signals indicate that data is available on lines 282 and 284, and are used in buffer 300 to initiate reception of the data. The even/odd signals indicate to the buffer whether data is present on only line 284 (odd), or is present on both of the lines (even).

For example, again referring to the illustration of FIGS. 1 and 2, following the first and second EAP's only one bit of data is input to assembly unit 218, hence, logic 274 will develop an "odd" signal on line 286. However, following the third EAP there is a transition to a white run length and according to FIG. 3, four data bits must be input to unit 218 for assembly, hence, two "write" pulses on line 285 and "even" signals will be developed correspondingly on line 286. When buffer 300 has received a full block of encoded data (512 bits), or is otherwise caused to terminate reception of data from encoder 200, it develops an "end of block" signal on line 289 which causes header data to be loaded into the header register specified on lines 297 by the buffer 300.

Referring now to FIG. 11 of the drawing, a block diagram illustrating the principle components of header register unit 216 is shown which includes four parallel-load, serial-unload block registers 290, 291, 292 and 293, a block load selector 294, and a block unload selector 295. Registers 290-293 are conventional 20-bit parallel-load, serial-unload registers, each having parallel-load terminals coupled to the lines 211, 213, 233, 241 and 243. When one of the four registers is selected by block load selector 294 in response to a "load select" signal developed on lines 297 (by buffer 300) 12 bits of "element position data" are loaded into the register via lines 233, three bits of "black code data" representing the word size of the first black code word in the current block of encoded data are input on lines 211, three bits of "white code data" representing the word size of the first white code word in the current encoded data are input on lines 213, and two bits of "mode data" identifying the data state of the first EAP in the encoded data are input on lines 241 and 243.

Once the block of encoded data has been input to buffer 300 and the corresponding block of header data has been input to one of the registers 290–293, buffer 300 will advance the block number on lines 297 and block load selector 294 will select the next register to receive header data. At some time following the loading of one of the registers 290–293, AECU 400 will be ready to receive the stored header data and will develop a block address signal on lines 325 which will select one of the registers 290–293 for output on line 299. Following selection of the register for output, AECU will develop shift pulses on line 403 which cause the header data to be shifted out to buffer 300 on line 299 and to be recirculated to the selected register by way of line 369. As will be further explained below, the header data is recirculated back into the selected register so that if for some reason an error in transmission should occur, the header data will still be available for reinsertion into buffer 300.

It will thus be appreciated that in operation, and in response to the scan data developed by scanner 100, encoder 200 will, for each transmission frame, develop 20 bits of header data and up to 512 bits of encoded data for insertion into buffer 300.

Alternatively, the position of encoder 200 may be explained in terms of the conventional logic flow diagram shown in FIG. 11*a*.

When AECU 400 enables the system, the first line of scan data will be loaded into shift register 204 (FIG. 7), and then as the second line is scanned, each data bit will be operated on simultaneously with the corresponding data bit in line 1, as indicated at 1000. As pointed out above, the corresponding bits of data in lines 1 and 2 are referred to as elemental area pairs (EAP's). Each elemental area pair will be evaluated by the system in sequence until all the data in lines 1 and 2 are accounted for, at which time the operation will be repeated for lines 3 and 4, followed by lines 5 and 6, etc. The operation performed on each EAP is as follows:

As indicated at 1002 the system is queried as to whether the buffer is busy. If the answer is "yes", no further input is made and the line 1 and line 2 data is "strobed" as indicated at 1004. However, if the answer is "no" the data will be accepted and the question will be asked, "Is there a mode change? (1006)." If the answer is "no", the question will be asked, "Has the maximum run length for a particular word size been reached? (1008)." If the answer is "no" the question will be asked, "Is the EAP a transition mode EAP i.e., as opposed to a black or white mode EAP? (1010)." If the answer is "no," then run length counter 208 will be incremented as indicated at 1012. Element position counter 222 will also be advanced as indicated at 1014.

The question will then be asked at 1016, "Is the EAP the last EAP in the line?" If the EAP is not at the end of the line of question will be asked at 1018, "Is the EAP at the end of a block?" If the answer is no, then the next EAP is input.

As the second EAP is input to the system, the question is again asked at 1002, "Is the buffer busy?" If the answer is "no," then the system determines whether the mode of the second EAP changes (1006). If the answer is "yes," then data is output as per FIG. 3 along with certain other control data as indicated by the box 1020. Note that one of the control signals causes the run length counter 208 to be reset. As per 1022, a determination is then made whether or not the EAP is of a transition mode. If the answer is "yes," then the element position counter is advanced, and since the second EAP is obviously not at the end of the line (1016) and not at the end of a block (1018), the third EAP is input to the system.

If, on input of the third EAP, the buffer is still not busy (1002) and there is no mode change (1006) a determination is made whether the maximum run length for a particular code word size has been reached (1008). If the answer is "yes," appropriate data is output as indicated at 1020 and the run length counter is again reset. As per decision box 1022, it is then determined whether the EAP was of a transition mode. If not, the system will again be queried whether or not there was a mode change (1024), and if not, the appropriate code size counter will be incremented as per box 1026.

Element position counter will then be advanced (1014), and since the third EAP is not at the end of the line (1016) and is not at the end of a block, the fourth EAP will be input to the encoder. If the buffer is not busy (1002), there is no mode change (1006), the maximum run length for the current code word size has not been exceeded (1008), and the EAP is not of a transition mode (1010), run length counter will be advanced by one count (1012) and the element position counter will be advanced by one count (1014). Since the fourth EAP is obviously not at the end of the line (1016) and is not at the end of a block (1018), the fifth EAP is input to the system.

If the buffer is not busy (1002), but there is a mode change (1006), then a transition condition has occured, and data must be output to the buffer, as indicated by box 1020. If the fifth EAP is not in a transition mode (1022) but there is a mode change (1024) the question will be asked, "Is this a continuation of the previous run length?" Had the answer been "yes," then the continue logic would be reset (1030).

However, since there is a mode change and there is no continuation of a previous run length, the question will be asked whether the previous run length of the same data state was less than ¼ of the capacity of the last code word, (1032). If the answer is "yes," the appropriate block size counter will be decremented by one (1034). However, if the answer is "no," then element position counter will be advanced (1014), and if the EAP is not at the end of the line (1016) and it is not at the end of the block (1018), then the sixth and subsequent EAP's will be input and processed accordingly, until the last EAP on the line is input and processed down through box 1016.

When the last EAP in the line reaches decision box 1016, the answer to the question raised at this point is obviously "yes", and as per box 1036, the element position counter is reset. As indicated by box 1038, the question is then asked, "Is this the end of the block?" If the answer is "yes" the appropriate header data (box 1040) is loaded into the buffer. If the answer is "no," then the sequence for processing of the next two lines commences and each subsequent EAP is processed until at some point an "end of block" condition is detected at either 1018 or 1038, and the header data is loaded into the buffer as per box 1019 or box 1040.

The encoding operation will continue outputing block after block of encoded data and header data until the contents of the entire document has been scanned and encoded, or until AECU 400 causes the operation to be terminated.

BUFFER 300

FIG. 12 of the drawing is a block diagram illustrating the principle operative components of buffer 300. As illustrated, buffer 300 includes an OR gate 302, an input address register 304, a data formator unit 306, a Random Access Memory unit (RAM) 308, an output address register 312, a read control unit 314, a data output register 316, and a data serializer 318. Also included, are a block terminate logic unit 320, a block status logic unit 322, a block output address register 324, an input block address register 326, a next input block address register 328, a data bits counter 330 and a header register unit 332.

Each time encoder 200 develops a "write" signal on line 285, the signal is gated through OR gate 302 and line 303 for input to address register 304, formator unit 306, RAM 308 and counter 330. The function of the write signal is to cause formator unit 306 to output two bits of encoded data (one bit on each of lines 307 and 309); to increment input address register 304 causing it to develop address signals on lines 305 which select particular cells in RAM 308 for receiving the two bits of encoded data presently being input on lines 307 and 309; and to increment the count of data bits counter 330 so that it keeps track of the number of encoded data bits stored in RAM 308.

Since the encoded data transferred to buffer 300 will not always be an even number of data bits, and since full utilization of RAM 308 can only be achieved when it receives two bits of data at a time, as will be explained below, means must be provided for, in effect, buffering the data input to RAM 308. This is accomplished by the data formator unit 306 which includes a storage register for receiving encoded data bits developed on lines 282 and 284, and means responsive to the even/odd signal developed on line 286 for simultaneously outputing one bit of data on each of the lines 307 and 309. If only one bit of data is input on one of the lines 282 and 284, this bit will be retained by unit 306 and paired with one of the next two bits of input data so that two bits are always output on lines 307 and 309. In other words, data formator unit 306 receives the encoded data that is shifted thereinto on lines 282 and 284 and responds to the even/odd signal input on line 286 to manipulate the encoded data, so that two data bits are always simultaneously transferred into a selected block of RAM 308.

When encoded data is input to buffer 300 on both of the lines 282 and 284, an "even" signal on line 286 accompanies the data, and in response thereto formator unit 306 couples the two bits of data into the RAM block via lines 307 and 309. However, should the encoded data appear on only one of the lines 282 and 284, and "odd" signal will be developed on line 286 and the single bit of data will be held in unit 306 for addition to one bit of data taken from the following one or two data bits which are transferred from encoder 200. In other words, the encoded data output from formator unit 306 is always in the form of two data bits, except where one odd bit remains at the conclusion of a block. Where this occurs, an "end of block" signal developed by block terminate logic 320 is gated through OR gate 302 and into unit 306, register 304 and RAM 308 and this allows the remaining single bit to be input to RAM 308.

RAM 308 is comprised of two 1024 bit memory units which are each divided into four sections A, B, C and D, each including 256 memory cells. As used in the preferred embodiment, the corresponding sections of each of the two memory units, i.e., A—A, B—B, etc., are combined to form four memory blocks of 512 storage cells, with each memory block corresponding to one of the block registers of header register unit 332. The encoded data input to RAM 308 on line 307 is loaded into the section of the selected block and is subsequently unloaded through the output line 311. Likewise, the encoded data input to RAM 308 on line 309 is loaded into the corresponding section of the selected block and is subsequently unloaded through the output line 313. Selection of a particular RAM block to be loaded is made in response to signals developed on lines 327 by input block address register 326, and selection of a particular RAM block to be unloaded is made in response to signals developed on lines 325 by output block register 324.

The address lines 305 as well as the address lines 310 are switchable between the various blocks so that a single input address register 304 and a single output address register 312 can be used to selectively address the various blocks of RAM 308. In response to write signals developed on line 303, register 304 develops signals on lines 305 which sequentially address the storage cells of the corresponding sections of RAM 308 so that the encoded data input on line 307 is sequentially stored in one section of RAM 308 and the encoded data input on line 309 is sequentially stored in the corresponding section of RAM 308. Similarly, in response to "read" signals developed on line 315, output address register 312 develops signals on lines 310 for sequentially addressing the storage cells of a selected block of RAM 308 so that the encoded data contained therein is read out on lines 311 and 313. Register 304 is reset by the end of block signal developed on line 289. Register 312 is reset by the strobe block signal developed on line 363.

Data bits counter 330 is a conventional counter unit which responds to the write signals input thereto on line 329 and the even/odd signals input thereto via line 286 to develop a binary output on lines 331 corresponding to the total number of data bits which have been input to the RAM block presently receiving encoded data. When a write signal on line 329 is coupled with an even signal on the line 286, counter 330 is incremented two counts whereas when a write signal on line 329 is combined with an odd signal on line 286, counter 330 is incremented a single count. At the end of each transfer of encoded data into buffer 300, the binary count developed on lines 331 thus indicates the number of encoded data bits input to the particular RAM block loaded. This count is input to header register unit 332 via lines 331 and is simultaneously input to block terminate logic 320 as indicated by the dashed line 344.

Block terminate logic 320 normally responds to the count input thereto and develops an "end of block" signal on line 289 when it determines that the next quantity of input data ready for input to buffer 300 cannot be received without exceeding the storage capacity (512 bits) of the RAM block currently being loaded. For example, when some predetermined number of data bits, such as 500 for example, have been loaded into RAM 308, block terminate logic 320 interrogates encoder 200, by means not shown, and determines how many of the next twelve data bits can be transferred without breaking up a code word. After making this decision it waits until the count on lines 331 reaches the selected number and then develops an "end of block" signal on line 289. In addition, logic 320 develops a "start block" signal on line 321, provided the next block is empty as indicated by signal 323, for causing encoder to load the header registers and input block address registers 326 and 328 to select the next RAM block and associated header registers.

Logic 320 may also respond to a signal generated by block status logic 322 on line 319 and develop an end of block signal at some time other than that dictated by the capacity of a RAM block. An example of such an instance would be where AECU 400 decides to read out a particular block of data before the RAM block has been filled. The end of block signal is also fed into header register unit 332 via line 333 to cause the "number of encoded data bits" portion of the header data to be inserted into a selected register of header unit 332.

As shown in FIG. 13 of the drawing, header register unit 332 is similar to the previously described header register unit 216 of encoder 200 in that it includes four block registers 350, 351, 352 and 353, a block parallel load selector 358, and a block serial unload selector 360. The registers 350–353 are serial/parallel-load, serial-unload devices having a serial input applied via line 299 and a parallel input applied via lines 331. Note that in this case, lines 331 are only 10 in number as opposed to the 20 lines input to register unit 216. Registers 350–353 are serially unloaded through line 370.

A block selection signal is developed on lines 327 by input block address register 326 to enable selector 358 to select one of the registers 350–353 for receiving the first 10 bits of header data (the "number of data bits" portion of the header data) through lines 331. The end of block signal developed by block terminate logic 320 on line 333 is input to selector 358 to cause the count contained in counter 330 to be loaded into the selected register through lines 331. Following the end of block signal, the start block signal causes block address registers 326 and 328 to develop new block selection signals on lines 327 and 297 respectively, for selecting the next header block to be filled with header data and the next RAM block to be filled with encoded data. When the selected register of header unit 332 is loaded, all of the encoded data and header data for a particular transmission frame is now stored in RAM 308 and header units 216 and 332.

Output block register 324 is essentially a 0–3 counter which responds to a "strobe block" signal and address signals generated by AECU 400 on lines 363 and 346 respectively, to develop output block selection signals on lines 325 for selecting one of the block registers of header register unit 332 and one of the blocks of RAM 308 for output to encoder 400. The selection is made in sequence. Following output of a selected block of encoded data and the corresponding block of header data, the signal on lines 346 is changed and another strobe block signal is developed by AECU 400 on line 363 to cause address register 324 to select the next header register and RAM block for output.

Block status logic unit 322 contains various logic for responding to signals generated by address register 324 on lines 347, signals generated by address register 326 on lines 345, and signals generated by 328 on lines 297 to keep track of the status of the various registers of unit 332 and RAM 308. If register 326, for example, should attempt to load header data into register of unit 332, or should attempt load encoded data into a block of RAM 308, neither of which has not been unloaded, logic 322 will develop a "busy" signal on line 288. This busy signal is fed back to encoder 200 to suspend operation thereof until buffer 300 is capable of receiving further data.

Read control unit 314 contains certain logic which, in response to a "data request" signal, developed by AECU 400 on line 340 generates a "read" signal on line 315 for input to output address register 312 and RAM 308. When a signal is received on line 317 indicating that the data has been read out, unit 314 develops a "data response" signal on line 341 for return to AECU 400.

Data output register 316 is a two bit parallel-load, parallel-unload shift register which receives the data read out of RAM 308 on lines 311 and 313, and develops a signal on line 317 indicating that the data has been received. The two bits of encoded data contained within register 316 are then serialized by a serializer 318 before being transferred to AECU 400 through line 342.

In operation, and assuming that encoder 200 is always ready to transfer data, block terminate logic 320 generates a start block signal on line 321 which causes encoder 200 to load header register 332 and start transferring the encoded data into data formator unit 306 via lines 282 and 284. The data transfer continues until (1) the RAM block is filled or (2) until AECU 400 interrupts the transfer and requests output of that block of data for condition (1) block terminate logic 320 develops an end of block signal on line 289 and performs the functions described above. If another block is available to be filled as indicated by the output signal developed on line 323 by block status logic 322, a start block signal is developed on line 321 by block terminate logic 320 and the procedure is repeated.

For condition (2) AECU 400 sets up a block number on lines 346, then asserts a strobe block signal on line 363 which resets output address register 312 and causes data on lines 346 to be stored in output block address register 324. The output on lines 347 change accordingly and block status logic 322 checks to see that the input block address signal on lines 345 equals the output block address signal on lines 347. Logic 322 then generates a signal on line 319 which causes block terminate logic to terminate the end of block signal on line 289.

For either condition, the start block signal on line 321 is generated following the end of block signal on line 289 unless the next block is not available to be filled. Where the next block is full, block status logic 322 generates a busy signal on line 288 which stops encoder 200 from processing further data. When the next block becomes empty, i.e., after AECU 200 has caused that block to be read out, block terminate logic 320 asserts a start block signal on line 321 and encoder 200 is caused to perform as described above.

In general, AECU 400 takes data blocks from RAM 308 when it needs them in order to maintain a constant flow of output data. It doesn't wait for encoder 200 to have data ready. This means that under some rare conditions, empty data blocks (number of data bits equals 0) may be transmitted. By time interlacing functions, the output functions of AECU 400 occur concurrently with the input functions of encoder 200.

The operating sequence for AECU 400 is (1) the desired block number is set up on lines 346, (2) the strobe block signal is asserted on line 363, (3) shift header pulses are developed on line 361 to shift the header data to AECU 400 as described above, and (4) the data request sequence (via line 340) takes place to transfer 512 encoded data bits to AECU 400.

In the usual case, when the block of encoded data has been transferred, AECU 400 asserts the block reset signal causing a status flip-flop in block status logic 322 corresponding to the block to be reset, thereby indicating that the RAM block is empty. Thereafter, AECU 400 changes the output block number signals on lines 346 to start the sequence for the next block of data. The unusual case arises when AECU 400 has determined that a block should be retransmitted. In this case, the block reset signal (line 372) is not asserted, the block number on line 346 is not changed, and the second and subsequent readings of the same RAM block starts with AECU 400 asserting the strobe block signal on line 363.

More specifically, once encoder 200 is ready to transfer the first two bits of encoded data into buffer 300, and these two bits are made available on lines 282 and 294, a write signal generated on line 285 causes data formator unit 306 to receive the first two data bits and make them available for output on lines 307 and 309. Upon the next write signal the next two bits of encoded data are input to unit 306 and the first pair of data bits is loaded into the selected block of RAM 308 for storage in two cells thereof selected by register 304. Upon the next write signal, the following two bits of encoded data will be input to unit 306 and register 304 will select two additional storage cells in RAM 308 for receiving the previous two bits of data which are now input thereto on lines 307 and 309.

As mentioned previously, each time a pair of encoded data bits are input on lines 282 and 284, an "even" signal is developed on lines 286. However, if only a single data bit is transferred by encoder 200, an "odd" signal will be developed on line 286 and unit 306 will hold the odd bit of data until the next transfer of data into buffer 300. Following this transfer, unit 306 will output the odd bit along with a bit taken from the following one or two bits input thereto on lines 307 and 309. This type of operation will continue until an "end of block" signal is asserted by block terminate logic 320 on line 289. Unless AECU 400 has caused logic 320 to terminate the block prematurely, more than 500 data bits will be stored in RAM 308 before the end of block signal is asserted.

Once the block is terminated, the count contained within counter 330 is input to header unit 332 and a "start block" signal developed by logic 320 causes input block address register 326 to select the next header unit and the next RAM block for receiving the corresponding quantities of header data and encoded data for the second transmission frame. As the transfer from encoder to buffer continues, AECU 400 makes buffer 300 ready to output the stored first frame of data by developing an appropriate signal on lines 346 for input to output block address register 324.

When AECU 400 is ready to transmit the first frame of data stored in buffer 300, (the header data is also partially stored in encoder 200) it develops a "strobe block" signal on line 363 for input to output block address register 324. In response thereto, register 324 develops signals on lines 325 for selecting the RAM block (RAM 308) containing the desired block of encoded data, the buffer header register (header unit 332) containing the first ten bits of corresponding header data, and the encoder header register (header unit 216) containing the remaining 20 bits of corresponding header data. As indicated above, the actual selection of registers is accomplished in encoder 200 by selector 295 (FIG. 11) and in buffer 300 by selector 360 (FIG. 13). Following selection of the RAM block and header registers, AECU 400 develops shift pulses on line 361 which shift out bit-by-bit the ten bits of header data in the first register of header unit 332, and shift the twenty bits of header data in the first register of header unit 216 through the first register of header unit 332 following the first 10 bits of header data initially contained therein. These 30 bits of header data are shifted in serial form into AECU 400 over the line 370. As pointed out earlier, in addition to being shifted into AECU 400 the header data is also recirculated via line 369 back through the first register of header unit 216 to the first register of header unit 332 so that if for some reason the transmission is faulty, the header data will not be irrevocably lost.

After the entire block of header data has been shifted into AECU 400, a "data request" signal is developed by AECU 400 on line 340 for input to read control unit 314. If the first block of encoded data is ready to be read out from the selected section of RAM 308, read control unit 314 develops a "read" signal on line 315 for input to output address register 312 and RAM 308. The first "read" signal causes address register 312 to select the first two bits of encoded data in the block and to transfer these two bits into data output register 316. Once the two bits of encoded data are input to register 316, a "data present" signal is developed on line 317 and in response thereto read control unit 314 develops a "data response" signal for return to AECU 400 over line 341. The data stored in register 316 may now be read out through serializer 318 which places the two bits of data in series for output to AECU 400 on line 342. Subsequent data request signals cause the read sequence to be repeated until all 512 storage locations of the first RAM block have been unloaded.

AECU 400.

Since the AECU units play a primary role in the operative control of the present system, it is deemed appropriate to preface the detailed description of these units with certain generalized remarks. The AECU units 400 and 600 are each capable of operating in either the transmitting mode or the receiving mode. However, for simplicity of illustration, only those components of AECU 400 pertinent to operation in the transmitting mode are shown in FIG. 14, and similarly, only those components of AECU 600 pertinent to operation in the receiving mode are shown in FIG. 15.

The principle functions of AECU 400 are to control the flow of information between encoder 200 and the transmitting data modem 500, to develop various synchronizing, status and checking codes, and to assemble these codes with the blocks of header data and encoded data to form a frame of data for transmission to the receiving subsystem.

The receiving AECU 600 establishes primary channel synchronization, checks for channel errors during transmission, and advises AECU 400 via the return channel data link when predetermined block error rate threshold levels have been reached.

The sync code developed by AECU 400 constitutes the first 24 bits of the transmission frame (see FIG. 4) and is used to establish synchronization with AECU 600. The preferred sync code is the NASCOM code which consists of the following 24 bit pattern:

011000100111100111011000

The AECU status code which forms the next seven bits of the transmission frame, is comprised of six "fields" including a two-bit "block number" field, a one-bit "run flag" field, a one bit "cooperative feedback (COFB) error control flag" field, a one-bit "repeat flag" field, a one-bit "spare" field, and a one-bit "set-up flag" field. The two bits of the block number field identify the transmitter buffer RAM block from which the encoded data was obtained during transmission, and the buffer RAM block to which the data will be transferred when received if COFB control is used. Without COFB, AECU 600 loads the received blocks of encoded data into the receiving buffer's RAM blocks in sequence without regard to the block number.

The run flag is used to initialize the receiving system to prepare for printing. When this flag is received by AECU 600 it is used to enable the receiving subsystem so that it is ready to receive the first frame of data for reconstruction and print out.

The COFB flag indicates whether the transmission is to be with or without COFB.

The repeat flag is used to indicate to the receiving AECU 600 that previously transmitted data is being transmitted again. This flag is set when the pause line from SCU 150 is asserted or when AECU 600 loses sync. (With COFB control it is used to request a retransmission of a block which was received with an error.)

The next field is a spare left for an additional flag.

The set-up flag indicates when set-up data is being transmitted to AECU 600. It is set in AECU 400 when AECU 400 is in the set-up mode. In AECU 600 the set-up data is transferred to SCU 950 when the set-up flag is set and continues until a block of set-up data is transferred without a polynomial check error. Then, transfer of data to SCU 950 stops even though the set-up flag remains set.

The out-of-sync flag in the reverse channel remains set until the primary channel is in sync and a good setup block has been received.

The last 12 bits of data contained in each transmission frame form the polycheck code. This code is comprised of a polynomial remainder generated by a feedback shift register used to compute a Fire code. Check codes of this type are disclosed in W. W. Peterson, Error-Correcting Codes, J. Wiley & Son, New York, New York (1961); pp. 183–186.

The reply frame, which is developed by AECU 600 (by means which will not be disclosed herein in detail) is returned to AECU 400 through the reverse channel and is detected in AECU 400 by means which will likewise not be disclosed herein in detail, consists of eleven bits including a start bit and a long stop bit which are required since the transmission is asynchronous in the reverse channel. Between the start bit and the stop bits are a two-bit "block number" field, a one-bit "retransmit request" field, a one-bit "end flag" field, a one-bit "COFB flag" field, a one-bit "out-of-sync flag" field, a one-bit "spare" field, one toggle bit and one parity bit.

The two block number bits identify the transmission frame for which the status data applies. Since a delay of several transmission frame periods may be experienced after receiving a transmitted frame and before the receiving AECU 600 returns a reply frame, the block number is needed to identify the frame for which the status information applies. This block number field is used only in cooperative error feedback.

The retransmit flag is set when a detected bit error occurs in the frame. Corrective action taken by the receiving AECU 600 depends on whether or not COFB is used.

The end flag is used to signal the transmitting system to halt the transmission when there has been a paper jam in printer 900, or a disconnect button has been pushed ON at the receiving end. When this flag is detected by AECU 400 the transmission is terminated.

Should AECU 600 lose sync for three frames in succession, the out-of-sync flag will be set, causing AECU 400 to transmit the same block repeatedly until the receiving AECU 600 regains sync and resets the out-of-sync flag.

The parity bit is included to check the parity of the seven status bits in the frame. It is even parity.

The toggle bit alternates from frame to frame and aids in regaining sync should a disturbance on the line cause the reverse channel to lose sync. This flag is not included in the parity check.

Transmission of a message is begun by the operators use of dialing equipment in SCU 150 to dial the desired receiving station to establish communication. When communication is established with the receiving AECU 600 an answer-back tone is returned to the transmitting end of the line. After a predetermined period of time, such as 400 microseconds, SCU 150 asserts a request to send and the receiving unit responds by sending a reverse channel carrier. When the reverse channel carrier is detected by the transmitter and the status of the scanner 100 is proper, AECU 400 sends a series of set-up frames to establish sync with AECU 600. It does this by requesting that set-up data be transferred from SCU 150 to AECU 400. The repeat flag is set during the transmission of these frames until the sync flag in the reverse channel frame signals that AECU 600 is in sync and a set-up frame has been received without a polynomial check error. Then the run flag is set in the block header when AECU 600 resets the out-of-sync flag in the reply frame. The run flag signals AECU 600 to enable the receiving subsystem to prepare for printing. It remains set for the duration of the transmitting operations.

When sync is established, AECU 400 enables the transmitting subsystem and if scanner 100 asserts a "document present" signal, transmission begins. During transmission, AECU 400 supplies the first 31 bits of data, which include the sync code, the frame number and the 5 flag bits. These 31 bits of data are added to the 30 bits of header data and 512 bits of encoded data. The polynomial check code is computed over all of the preceding bits of the frame including those added by AECU 400. At the end of the frame, the 12 bits of check code are added to the frame. During the time that the check code is being transmitted, AECU 400 changes the frame number and establishes the state of the status flags for the next frame. Following the setting of the run flag, the buffer registers are selected in sequence throughout the remainder of the transmission.

Bit errors may occur in frames of data received at the receiving end of the system. As long as these errors occur infrequently, the condition of the line for reliable transmission is adequate. However, when errors occur with a frequency greater than a predetermined threshold, SCU 150 takes corrective action. Furthermore, AECU 600 may sometimes lose sync in the primary channel. The occurence of this event is communicated to AECU 400 by the out-of-sync flag in the reply frame. In response thereto, AECU 400 will repeat the present frame until sync is restored.

At the end of the document being scanned, the transmit signal from SCU 150 goes false indicating that the transmission can be ended. AECU 400 then switches the enable OFF and the encoding operation is terminated.

Referring now specifically to FIG. 14, a block diagram representative of the principal operative components of the transmit AECJ 400 are depicted, and include an OR gate 402, a 24-bit parallel/serial-load, serial-unload shift register 404, a sync code generator 406, a polynomial check register 408, a pair of AND gates 410 and 412 and an OR gate 414. In addition, AECU 400 includes a status register 416, a count decoder 418, a bits per frame counter 420, a gating logic unit 422 and a frame counter 424.

The function of OR gate 402 is to couple either the header data input on line 370 or the encoded data input on line 342 into shift register 404. Sync code generator 406 is a pre-wired parallel unload register which develops the 24-bit NASCOM code, which is used to synchronize the receiving subsystem with the transmitting subsystem.

Register 408 includes a feedback shift register and a collection of modulo two adders, (a modulo two adder is equivalent to the logical operation EXCLUSIVE OR). The number of shift register positions is equal to the degree of the divisor, and the dividend is shifted through with the highest order first. An example of a polynomial check register of the type used in the preferred embodiment is given in the previously mentioned Peterson article. In passing through the register the binary number corresponding to the preceding frame data is, in effect, divided by a fixed polynomial leaving a twelve bit remainder which constitutes the polycheck code making up the last field of the transmission frame.

Status register 416 includes a 7-bit register which determines the seven bits of status data described above from the conditions of AECU 400 and loads it into register 404 via lines 417 in response to a "load" signal asserted on line 434 by decoder 418.

Counter 420 includes a 10 bit binary counting device which responds to clock pulses developed on line 430 by modem 500 and develops a running count of the 585 bits of data comprising each frame of transmitted data. This count is input to decoder 418 on lines 421. Gating logic 422 responds to signals on lines 442 and the status code input thereto on lines 425 to develop a block reset pulse on line 372, a counter step pulse on line 427 and a "strobe block" signal on line 363. Logic 422 also corresponds with SCU 150 via line 152.

Decoder 418 contains logic which responds to the count developed on lines 421, and at predetermined times during the transmission of each frame generates signals on the lines 432–442 which control the transfer of the various quantities of data from buffer 300 to AECU 400, and from AECU 400 to the data modem 500. More specifically, each frame is started by the generation of signals on lines 442 which cause gating logic 422 to increment block counter 424 causing it to develop a "frame number" signal on lines 346 for selecting a particular pair of blocks of header data and encoded data stored in buffer 300. A "load sync code" command is then asserted on line 432 which causes sync code generator 406 to load the 24 bit sync code into shift register 404 through lines 407. After seven bits of the sync code have been shifted out of register 404 for transmission, a "load status code" signal is developed on line 434 which causes status register 416 to load the 7-bit status code into register 404 behind the sync code.

Immediately following the input of the status code into register 404 and for the remaining 30 clock pulses, decoder 418 develops signals on line 436 which cause "shift header" pulses to be developed on line 361. These pulses cause the header data to be shifted from buffer 300 into shift register 404 through lines 370 and OR gate 402. Decoder 418 then develops signals on line 438 which cause the encoded data in buffer 300 to be gated into register 404 through line 342 and OR gate 402. Note that the data shifted out of register 404 is gated through AND gate 412 and OR gate 414 to modem 500, and is also shifted into polynomial check register 408. As the frame data is shifted into register 408, the polycheck code is developed. After all of the encoded data has been shifted through register 404, signals are developed by decoder 418 on line 440 for causing the polycheck code contained in register 408 to be transferred to modem 500 through AND gate 410 and OR gate 414. Transmission of the next frame of data is then started by new signals developed on lines 442, etc.

The signal asserted on line 440 during the transfer of the first 573 bits of each frame disables AND gate 410 but is inverted by inverter 441 and used to enable AND gate 412. Thus, however, when the state of the signal developed on line 440 is changed following the 573 bit, AND gate 410 is enabled to allow the polycheck code to be coupled into modem 500, and the inverted signal developed by inverter 441 disables AND gate 412 to block the flow of data from shift register 404. When the twelfth bit of polycheck code data has been shifted from register 408, the signal on line 440 is changed back to the original state to again disable AND gate 410 and enable AND gate 412.

Flip-flop 446 responds to the signal developed on line 438 to output a "data request" signal on line 340 and is reset by the "data response" signal returned from buffer 300 on line 341. Block counter 424 responds to pulses generated by logic 422 on line 427 and is operative to increment the block number selection signals developed on lines 346.

In operation, once AECU 400 has established communication with the receiver subsystem, modem 500 develops a train of clock pulses on line 430 and asserts a "system ready" signal on line 450. Count decoder 418 then develops an output on lines 442 which causes gating logic 422 to step block counter 424 so that it develops a "block number" signal on lines 346 corresponding to the first frame of data. The "strobe block" signal is then asserted causing output block register 324 (FIG. 12) to select the registers in header units 216 and 332, and the memory block of RAM 308 which contain respectively, the header data and encoded data for the first transmission frame.

Count decoder 418 then asserts a signal on line 432 causing sync code generator 406 to load the sync code into shift register 404. In response to shift pulses developed on line 430, the sync code is shifted out of register 404 through AND gate 412 and OR gate 414 into data modem 500 and communication line 525. As soon as the first seven bits of sync code have been shifted out of register 404, decoder 418 causes status register 416 to load the 7-bit status code into register 404 immediately following the sync code. As soon as the status code is loaded, decoder 418 causes the header data contained in header units 216 and 332 to be shifted through OR gate 402 and into shift register 404 following the status code.

When the last bit of header data has been input to register 404, decoder 418 asserts the data request line and causes the encoded data to be shifted through OR gate 402 and into shift register 404. As the last bit of encoded data is shifted out of register 404, decoder 418 changes the state of the signal on line 440 causing AND gate 410 to be enabled and AND gate 412 to be disabled so that the polycheck code presently resident in register 408 is shifted through OR gate 414 and into data modem 500. The various components are then reset and the sequence is repeated, causing the frame 2 data to be transmitted followed by the frame 3 data, etc.

--Modem 500--

--Communication Link 525--

--Modem 550--

As was previously indicated, the illustrated system has been simplified to illustrate communication in only one direction. However, it will be appreciated that the data modems used in the preferred embodiment are of a conventional type which enable reverse channel operation during the transmission of a message, thereby permitting modem 550 to communicate status information back to modem 500 during transmission of data in the forward direction. Since there is two-way communication carried on during transmission of a message, two modem interfaces are required in each of modems 500 and 550 (FIGS. 14 and 15); a primary channel interface and a reverse channel interface.

When AECU 400 starts a transmission it asserts the request-to-send line to SCU 150 and SCU 150 conducts a conventional handshaking procedure. If modem 500 is ready to send, the reverse channel carrier detect line is asserted by modem 500. A transmit clock is also routed to AECU 400 from modem 500 through line 430. Data is transmitted serially from SCU 150 over the transmit data line and data is changed on the positive going edge of the transmit clock.

Reception of a message begins when modem 550 detects a carrier on the line and asserts the modem normal indicator signal. The modem clock is present at all times and the positive-going edge coincides with the positive-going edge of the data.

--RECEIVER RECONSTRUCTOR--

--AECU 600--

In FIG. 15 the principle functional components of AECU 600 are illustrated. These include shift register 602, a polynomial check register 604, a sync decoder 606, a zero decoder 608, and a status register 610. In addition, the unit includes a bits-per-frame counter 612, a count decoder 614, gating logic 616, and a frame counter 618.

Shift register 602 includes a 24-bit serial-load, serial/-parallel-unload register which receives the transmitted data from modem 550 through line 603. The first 24 bits of each frame (the sync code) are decoded through the parallel lines 605 and 607, and the next 7 bits of each frame (the status code) are unloaded through the parallel lines 607. The remainders of the transmitted frames of data are serially unloaded through line 609.

Polynomial check register 604 includes a a 12-bit feedback shift register and associated circuitry for performing a polynomial check operation on the transmitted data and then comparing the results with the transmitted polycheck code. If the data received by AECU 600 corresponds to the data transmitted, the remainder computed will be zero and zero decoder 608 will develop an output on line 611 indicating that the received data is acceptable.

Sync decoder 606 receives the 24-bit sync code via lines 605 when a signal is asserted on line 620, and in response thereto develops a sync signal on line 621 indicating that AECU 600 is either in-sync or out-of-sync with AECU 400. This signal is used to establish sync status.

Status register 610 includes a 7-bit parallel-load, parallel-unload shift register which receives the seven AECU status bits developed on lines 607 and in response to a signal asserted on line 622, gates the status code into logic 616 through lines 617.

The bits-per-frame counter 612 counts the number of data bits which are shifted into register 602 and produces a responsive count on lines 613. Gating logic 616 includes logic which responds to signals developed on lines 617 (status data), 621 (sync data), 630 (start of frame data), 617 (end of frame data) to develop block reset signals on line 640, counter incrementing signals on line 642 and block strobing signals on line 644. Logic 610 also communicates with SCU 950 through line 952, and with modem 550 through line 619.

Count decoder 614 includes various logic which responds to the count developed on lines 613, and the clock pulses developed by modem 550 on line 552, to generate signals on lines 620, 622, 624, 626, 628 and 630 for controlling the functions of the various components mentioned above. More specifically, following the loading of the twenty-fourth bit of data from each transmitted frame into register 602, decoder 614 asserts a signal on line 620 for causing the sync code to be decoded by sync decoder 606.

When the next seven bits of data have been shifted into register 602, decoder 614 asserts a "load status code" signal on line 622 causing status register 610 to load the status information into gating logic 616 through the lines 617. In response to this signal, gating logic 616 develops a "block reset" signal on line 640 and causes frame counter 618 to output signals for selecting registers in the header units of buffer 700 and decoder 800 to receive the first block of header data and to select a RAM block in buffer 700 to receive the first block of encoded data. A "strobe block" signal is then asserted on line 644. The function of the "block reset" and "strobe block" signals developed on lines 640 and 644 will be discussed below as they apply to the operation of buffer 700.

As the 31st through the 60th bit of frame data are shifted through shift register 602 decoder 614 develops a signal on line 624 which enables AND gate 625 causing "shift header" pulses to be developed on line 623. The signal developed on line 624 also enables AND gate 649 so that the header data on line 609 is coupled into decoder 800 through output line 650. The shift header pulses asserted on line 623 enable the header units of buffer 700 and decoder 800 to receive the header data output on line 650.

Following output of the header data, decoder 614 develops a signal on line 626 which enables AND gate 651 so that the next 512 data bits (the encoded data) may be transferred to buffer 700 via line 652. This signal also causes flip-flop 627 to develop a "data ready" signal on line 631 which enables buffer 700 to accept two bits of encoded data at a time from AECU 600. Following each "data ready" signal, buffer 700 develops a "data response" signal on line 633 which resets flip-flop 627. Once the block of encoded data has been output to buffer 700, decoder 614 causes zero decoder 608 to develop an output on line 611 which is fed into gating logic 616 through AND gate 614 and flip-flop 615 to indicate whether the data received was acceptable.

If the data was correct, counter 618 is incremented and develops output signals on line 646 for causing selection of the next set of buffer units to receive the encoded data and header data contained within the second transmission frame. Should the transmission be unacceptable, as determined by zero decoder 608, gating logic 616 will either develop a retransmit request signal on line 619 for reverse channel transmission back to the transmitting subsystem, or simply reject the data, fail to increment counter 618, and shift the next frame data into the same storage units of buffer 700 and decoder 800 on top of the last frame data.

As in the transmitting subsystem, a signal routed to SCU 950 via line 952 indentifies the start period. When the set-up flag is received, the set-up data is transmitted from AECU 600 to SCU 950 by sending the same series of reset and shift pulses as is the case in the transmitter.

Reception of a message by AECU 600 is begun when the "modem normal" indicator signal from modem 550 is asserted. AECU 600 receives the set-up frames that follow and transfers them to SCU 950 via line 951 (FIG. 15) until a frame is received without a polynomial check error. When the run flag is set, AECU 600 causes the receiving subsystem to be enabled and data transfer to buffer 700 begins. Before the receiver enable is asserted, the condition of printer 900 is determined by testing the ready/continuation line 952 from SCU 950. Should the ready line not be asserted, the enable is not asserted but the end flag is set in the reply frame. The stop line is asserted by SCU 950 in order to set the end flag.

The first few frames received are used to synchronize AECU 600. Three steps are used in the synchronization procedure. In the first step, the bit stream is scanned until the sync code is recognized. Next, the sync code is checked by counting the number of bits from one sync period to the next sync period. Should the sync code occur out of place, the first step of the procedure is repeated. If the sync code occurs in the bit stream as expected, the check stop of the procedure is entered. In the final step, the sync code out of place causes the procedure to restart, while a properly placed sync code places AECU 600 in a lock mode. In this mode three sync codes in succession must be displaced before AECU 600 returns to the scan step of the procedure.

Header data starting with the bit count is then shifted to buffer 700 and decoder 800. This data is transferred over the respective data lines 817 and 772, and the shift header pulses are used to time the transfer of each bit across the AECU interface. After the header data is transferred, the encoded data is transferred to buffer 700. As in the case of the transmit mode, the data request, data ready signal exchange is used in this transfer. This information is also returned to AECU 400 via the reverse channel.

Primary channel errors may occur in the data or there may be a loss of sync. After each frame has been received, AECU 600 checks for errors. If the paper jams in the printer, or if the disconnect push button is pressed on the SCU console the end flag is set. The COFB flag is a constant throughout any transmission as it indicates whether the system is operating with or without cooperative error-feedback control. Should AECU 600 lose sync, the out-of-sync flag is set until sync is regained. While out-of-sync buffer 700 and decocoder 800 are not enabled and no data is transferred thereto.

If a bit error or errors are detected, the retransmit request flag is set. Bit errors in a frame are cause for the frame to be discarded. When this happens, the frame counter is not stepped and the next frame received is loaded into the same buffer block as was the preceding frame. Normal processing of frames is then resumed.

At the end of the message, the run flag is reset in the block header to indicate that printing is to stop. When the run flag is reset, AECU 600 switches the enable to false. Printer 900, however, remains ON until the carrier detector signal goes false, signaling the end of transmission.

--Buffer 700--

As illustrated in FIG. 16 of the drawing, buffer 700 includes a serial-to-parallel converter 702, an input address register 704, a Random Access Memory (RAM) 706, an output register 708, an output address register 710, and a write control unit 712. In addition, buffer 700 further includes an input block address register 714, a data bits counter 716, a header register unit 718, an output block address register 720, a block status logic unit 722 and a block terminate logic unit 724.

Converter 702 includes a series-to-parallel register which receives two serial bits of encoded data on line 652 and outputs the two bits simultaneously on the parallel lines 703 and 705. Converter 702 also develops a "data present" signal on line 701 for input to write control unit 712.

Input address register 704 is a conventional counter register which responds to a write signal asserted on line 713 and develops address signals on the line 707 which are used to address a selected pair of memory cells in a selected block of RAM 706. Register 704 is reset by a signal developed on line 644.

RAM 706 is comprised of two 1024 bit memory units which are each divided into four sections A, B, C and D, each including 256 memory cells. As used in the present embodiment, the corresponding sections of each of the two memory units are combined in a manner similar to that previously pointed out with regard to RAM 308 of Buffer 300 to form four memory blocks of 512 memory cells each, with each block corresponding to one of the block registers of header register unit 718. Selection of which RAM block is to be loaded is made internally by signals developed on lines 709 by input block address register 714 and selection of which RAM block is to be unloaded is made internally in response to signals developed on lines 721 by output block address register 720.

Selection of the particular memory cells to be loaded with the input data available on lines 703 and 705 is made by address register 704 through lines 707 and selection of the particular memory cells to be read out is made by output address register 710 through lines 719. The data read out of RAM 706 is transferred to output register 708 through lines 715 and 717.

Output register 708 is conventional two-bit parallel-load, parallel-unload register which receives the two bits of data simultaneously read out of RAM 706, and in response to a "read" signal asserted on line 760, shifts the two bits of encoded data to decoder 800 in lines 772. Write control unit 712 contains write control logic which responds to the "data ready" signal developed by AECU 600 on line 631, and in turn develops a shift pulse on line 701 and a "write" signal on line 713 for input to input address register 704 and RAM 706. Following each "shift" signal, unit 712 develops a "data response" signal on line 633 for return to AECU 600.

Input block address register 714 includes a 0–3 counter which responds to signals developed on lines 646 and a "strobe block" signal developed on line 644, and asserts signals on lines 709 for selecting a particular register of header unit 718, a corresponding register of header unit 818, and a corresponding RAM block of RAM 706.

Output block address register 720 also includes a 0–3 counter which responds to a signal developed on line 778, and develops block address signals on lines 721 for selecting a register of header unit 718, a corresponding register of header unit 818 and a block of RAM 706 for output to decoder 800. Block status logic unit 722 responds to the outputs of registers 714 and 720 developed on lines 723 and 725 respectively, and keeps track of the status of the respective registers in units 718 and 818, and the blocks of RAM 706. Unit 722 also develops a "buffer empty" signal on line 727 and an output block status signal on line 731. The block reset signal causes block status unit 722 to set a status flip-flop corresponding to the block number on lines 723 to "full." The "end of block" signal (line 778) causes a status flip-flop corresponding to the output block address on lines 725 to be reset to "empty."

Data bits counter 716 is a counter which counts down from a number input thereto on lines 758 each time a "read" signal is asserted on line 760. Counter 716 also develops a "zero" signal on line 730, and a signal on line 732 which indicates whether the number of data bits contained in the block of encoded data is even or odd. Data appearing on lines 758 is loaded into counter 716 in response to a "start block" signal asserted on line 776 by logic unit 724.

Block terminate logic unit 724 includes logic which responds to the inputs supplied on lines 730, 731 and 732 and develops an "end of block" signal on line 778, a "start block" signal on line 776, and an "even/odd" signal on line 779.

As shown in further detail in FIG. 17 of the drawing, header register unit 718 is generally similar to the previously described header register units of buffer 300 in that it includes four ten-bit block registers 750–753, a block load selector 754 and a block unload selector 756. The registers 750–753 are serial-load, parallel-unload devices in which data is input serially through line 813 and is unloaded in parallel via the ten output lines 758. A block selection signal developed on lines 709 causes block load selector 754 to select one of the four registers 750–753 for receiving the first ten bits of header data after they have been passed through the corresponding register of header unit 818 (decoder 800). Signals developed on lines 721 cause block unload selector 756 to select one of the registers 750–753 for output to counter 716 via lines 758.

In operation, when AECU 600 is ready to transfer header data and encoded data to buffer 700, it asserts an address signal on lines 646 for input to input block address register 714. A "strobe block" signal is then asserted on line 644 causing register 714 to develop a block selection signal on lines 709 for selecting one of the blocks of RAM 706 to receive the encoded data and one of the registers of each of header register units 71 and 816 (FIG. 18) to receive the header data.

AECU 600 then develops "shift header" pulses on line 623 for shifting the header data into header units 718 and 818. As each header pulse is generated, it causes the header data to be shifted into the selected register of header unit 818 with the first ten bits of header data being shifted completely through header unit 818 and into a selected register of header unit 718. The remaining twenty bits of header data remain in unit 818. When the 30 bits of header data have been so input to the selected pair of registers, AECU 600 makes ready, the first bit of encoded data for input to converter 702. It also develops a "data ready" signal on line 631 for input to write control unit 712. Write control unit 712 generates a shift pulse on line 701 for input to converter 702 and a data response signal on line 633 for return to AECU 600.

When the second bit of encoded data has been received by converter 702, and the two bits of encoded data have been arranged in parallel for output on lines 703 and 705, unit 712 develops a "write" signal on line 713 for input to register 704 and RAM 706. Register 704 then selects the first two storage cells of the first block of RAM 706 and the data on lines 703 and 705 is input thereto.

Following the write signal, a "data response" signal is developed on line 633 for return to AECU 600. The data response signal causes AECU to forward the next bit of encoded data, when it is available, to converter 702 and the sequence is repeated until all of the 512 storage cells of the selected block of RAM 706 have been addressed and loaded. Note however, that the number of bits of encoded data may not coincide with the storage capacity of the selected RAM block and thus meaningless data will fill the cells remaining after the block of encoded data has been stored. The meaningless bits of data following the block of encoded data are, however, accounted for during the subsequent read operation.

Following transfer of the first block of encoded data, AECU 600 develops a block reset signal on line 640 which sets the status flip-flop for the block, part of logic unit 722, to show that the block is full. AECU 600 then develops a new block address signal on lines 646 for input to register 714 and thereafter asserts a "strobe" signal on line 644. The strobe signal causes register 714 to develop signals on lines 709 for selecting the next RAM block to receive encoded data and the next header registers to receive header data. This storage operation is then repeated with the various RAM blocks and header register units being selected in sequence.

As soon as the first block of encoded data has been stored in RAM 706, output address register 720 develops a register selection signal on lines 721 for input to header register units 718 and 816 and RAM block 706 to select the header registers and RAM block containing the first frame data. A "start block" signal asserted on line 776 causes the binary number contained in the selected register to be loaded into counter 716 via lines 758. This number, of course, indicates the number of bits of encoded data contained in the first block of RAM 706. Block status logic signals "buffer not empty" on line 727 which causes decoder 800 to develop a "read" signal on line 760 for input to address register 710 and RAM 706 and in response thereto, register 710 addresses the first two storage cells in the selected RAM block and causes the data contained therein to be read out to output register 708 through lines 715 and 717 and then to encoder on lines 772. The read signal is also input to data bits counter 716 causing it to decrement its count by two. The second read signal causes register 710 to select the next two bits of data to be read out of RAM 706. The reading operation will continue until data bits counter 716 counts down to zero at which time it develops a signal on line 730 which causes block terminate logic 724 to develop an "end of block" signal on line 778.

Counter 716 also develops a signal on line 732 for indicating to logic 724 whether the number of encoded data bits contained in the block was odd or even. In response to this signal, logic 724 develops an "even" or "odd" signal on line 779. The end of block signal developed by logic 724 is returned to output block address register 720 to increment its count to cause it to develop signals on lines 721 for selecting the next registers and RAM block containing the next quantities of header data and encoded data respectively, and to logic unit 722 to reset the status flip-flop for the block to show that the block is empty.

The start block signal developed on line 776 is conditional. If following the end of block signal (line 778), the output block status signal (line 731) is asserted to show that the "block is full," then the start block signal on line 776 is asserted. Otherwise, a buffer empty signal (line 727) is asserted to cause encoder to stop processing. Later, when the block has been filled, as indicated by the signal on line 731, the start block signal on line 776 is asserted and the buffer empty signal on line 727 is changed to show "not empty." The "start block" signal on line 776 causes counter 716 to accept the output of the next selected register of header unit 718 and reset register 710. This operation will continue simultaneously with the loading operation so long as buffer 700 contains data and decoder 800 asserts read signals on line 760. As indicated previously, block status logic 722 monitors the outputs of registers 714 and 720 and develops a buffer status signal on line 727 to indicate to decoder 800 whether data is available in buffer 700.

Decoder 800

Decoder 800 is schematically represented by the block diagram shown in FIG. 18 of the drawing and includes a data assembly unit 802, a run length counter 804, a decoder control unit 806, a shift register 808, an OR gate 810, an element counter unit 812, a black code size counter 814, a white code size counter 816, and a header register unit 818.

As further illustrated in FIG. 19, data assembly unit 802 includes a data register 820, black/white code size register 822, a start clock control logic unit 824, a read control logic unit 826, an end block control logic unit 828, and an end of block register 830.

Register 820 includes two four-bit serial-to-parallel registers, each having four parallel outputs which are alternately coupled to one of the eight parallel output lines 821. In other words, four pairs of encoded data shifted into register 820 are required to provide eight bits of data on the output lines 821. As illustrated, the lines 821 are branched and lead to read control logic 826, run length counter 804, and decoder control unit 806.

Black/white code size register 822 receives the output from black code counter 814 and white code counter 816 through lines 817 and 819, respectively, and in response to a "mode signal" developed on lines 855 by decoder control unit 806, selects one or the other sets of lines for input to read control logic 826 through the lines 825. The switching operation is effected by a signal developed by decoder control unit 806 on line 860. Register 822 is reset by a "start block" signal developed by unit 824 on line 829.

Unit 824 responds to a signal developed on line 827 by end block control logic unit 828 to develop a signal on line 829 which is used to start a transfer of the next block of data. Logic unit 824 will be inhibited from developing the start block signal if the signal input thereto on line 823 indicates that buffer 700 is empty.

End of block register 830 includes a serial-load, parallel-unload register having eight output lines 831 which are coupled into read control logic unit 826 and end block control logic unit 828. When an end of block signal is input thereto on line 778 it is shifted through register 30 by shift pulses developed by logic unit 826 on line 833 and is effectively stepped from one of the lines 831 to the other.

Read control logic unit 826 contains logic capable of responding to the various input signals applied thereto and developing "read" signals on line 760 for reading out the data stored in buffer 700. It also develops shift pulses on line 833 for shifting the data contained in register 820 and register 830 and an "end of read signal" 2100 used for timing in 828.

End block control logic unit 828 contains logic which responds to the end of block signal input thereto on one of lines 831, the "end of code portion" binary encoded on the three lines 2000 and at an appropriate time indicated by "end of read" 2100, develops an "end of block" signal on line 835 for, inter alia, inhibiting operation of read control logic unit 826 until the next frame of data is ready to be read out of buffer 700.

The principle operative components of decoder control unit 806 are also depicted in FIG. 19 and include an end of code detector 850, a present EAP register 852, a present mode detector 854, and a control logic unit 856. The end of code detector 850 responds to the various signals input thereto on lines 821, 825 and 855 and to develop an "end of code" signal on line 851 and a black/white "continue" signal on line 853, both of which are input to control logic unit 856. The end of word signal is also input to read control unit 826. 850 also generates "end of code position" which is a binary number on output lines 2000 that specifies which one of the eight outputs 821 has the last bit of the code word. Signals on lines 2000 are used by end block control 828 to examine the corresponding line in the group 831 to determine if the end of block bit 778 has shifted to this position. An end of block at the same relative position in 831 as the end of code position in 821 indicates an end of block.

Present EAP register 852 receives the decoded data developed on lines 849 and outputs the decoded "upper line" data on line 860 and the decoded "lower line" data on line 862.

Present mode detector 854 responds to the present EAP data contained in register 852 and develops mode indicating signals on lines 855.

Control logic unit 856 contains logic for responding to the various input signals in developing the indicated output signals.

Run length counter 804 includes a conventional seven bit binary count-down device and means responsive to signals developed on lines 855 and 864 for selecting one of the sets of lines 870 and 872, determining the binary number (code word size) appearing thereon and selecting a number of the lines 821 corresponding to the code word size for input to counter the counting device. Once the binary number selected from lines 821 is loaded into counter 804, "count" signals asserted on line 866 cuase counter 804 to count down from the selected number. When the count down reaches zero, a "last bit" signal is asserted on line 868 for input to control unit 806. Register 808 is a conventional 1726 bit recirculating serial-load, serial-unload shift register which receives the 1726 bits of lower line data developed by control unit 806 on line 862, in response to the "load/recirculate" signal 886. "Element clock" 913 determines the shifting rate. Data is retained until it is shifted out to line 809 in response to the "unload" signal developed by control unit 806 on line 2001.

Element counter unit 812 is further shown in FIG. 20 to include a synchronization logic unit 890, an element position counter 892, a comparator 894, and a process element counter 896. Logic unit 890 receives line sync pulses and element clock pulses from printer 900 on lines 911 and 913 respectively, and synchronizes them with the system clock pulses input on line 891. The synchronized signals are then output on lines 893 for stepping counter 892 and 896. Counter 892 is incremented by each synchronized element clock and develops a binary count on lines 895 for input to comparator 894. The count developed by counter 892 directly corresponds to the position of the elemental area being marked by printer 900. Counter 892 is reset to "zero" count by synchronized line sync.

Process element counter 896 receives the starting-"element position" number from header unit 818 via lines 815 when a "load" signal is asserted by decoder control unit on line 829 and develops a corresponding output count on lines 897. Although counter 892 counts continuously in response to the clock signal asserted on line 893, process element counter 896 only counts when permitted to do so by an "enable" signal developed on line 881 by control unit 806. Counter 896 is reset by coincidence of 881 and synchronized line sync 893.

Comparator 894 compares the counts developed on lines 895 and 897, and when the two counts are identical develops a "compare" signal on line 882 for input to decoder control unit 806. The "enable" signal is asserted in response to a "compare" signal developed by comparator 894 on line 882, provided a pair of elements are to be output on lines 861 and 862 of 806.

Black code size counter 814 and white code size counter 816 include three-bit binary counters which receive on lines 817 and 819, respectively, three bits of binary data indicating the size of the first black code word and the size of the first white code word in the current frame. At the beginning of the decode operation for each frame, a signal developed on line 829 causes this data, which is obtained from header unit 818, to be loaded into counter 814 and 816. The data contained in counter 814 and 816 is output on lines 870 and 872 for input to run length counter 804, and is also output on lines 863 and 865 for input to data assembly unit 802. After the decoding operation begins the count contained in counters 814 and 816 may be incremented or decremented by signals developed by control unit 806 on lines 874 and 876, respectively. The "present mode" signal on line 855 provides information as to which counter, 814 or 816, is to be incremented or decremented depending on whether the mode is black or white.

In FIG. 21 the principal components of header unit 818 are illustrated and include four block registers 801-807, a block load selector 809, and a block unload selector 811. Registers 801–807 are twenty bit serial-load, serial/parallel unload shift registers adapted to unload in parallel fashion, twelve data bits on lines 815, three data bits on lines 817, three data bits on lines 819, and two data bits on lines 857.

When AECU 600 is ready to transfer a block of header data to buffer 700 and decoder 800, it causes buffer 700 to select one of the registers in header unit 718 and a corresponding register in header unit 818. The data is then shifted one bit at a time into the selected register of unit 818 via line 650. As pointed out above, the first ten bits of header data are shifted completely through the register and into the selected register of header unit 718 through line 813. The last twenty bits are shifted into and remain in the register header unit 818. A "start block" signal asserted on line 776 causes selector 809 to select the next register for receiving the following block of header data.

The particular register to be unloaded through the parallel lines 815, 817, 819 and 857 is selected by selector 811 in response to an address signal developed by buffer 700 on lines 721.

In operation, the starting condition is the assertion of the start block signal on line 829 which resets end block control unit 828, end block register 830, end of code detector 850 and control logic unit 856. As explained, the signal on line 829 also causes header data from header register unit 818 to be transferred to element counter 812, black and white code size counters 814 and 816, the present EAP register 852. Black/white code size register 822 delays a short time after the assertion of the signal on line 829 to allow present mode detector outputs 855, black code size counter outputs 863 and white code size counter outputs 865 to become established to the new conditions caused by the aforementioned data transfers resulting from the signal on line 829. If the signals on lines 855 indicate black mode, the data on lines 863 is placed in register 822 and appears on output lines 825; or if the signals on lines 855 indicates white mode, the data on lines 865 is placed in register 822 and appears on output lines 825. Register 822 is not loaded if the signals on lines 855 indicate transition mode, since data relating to black or white codes will not be required in the immediately following operations.

The start block signal on line 829 also causes read control unit 826 to start a read operation by asserting a read signal on line 760. Eight bits of data are read from the buffer on lines 772, provided the data block contains eight bits, and the data is shifted through data register 820 by the shift signal developed on line 833. End of block register 830 is shifted simultaneously so that the binary state of the end of block signal on line 778 is entered into register 830 at each shift operation. When the signal on line 778 changes state to indicate an "end of block," this indication is then positioned in exactly the same stage of register 830 as the last data bit is positioned in data register 820. If the data block contains fewer than eight bits, line 778 will be asserted before the required number of shifts has been completed. Read control unit 826 will then remove the read signal from line 760 but will continue to generate shift signals on line 833. At the conclusion of the shifting, the first data bit of the code word is positioned in the right-most stage of register 820 and data outputs appear in order from right to left on lines 821. These outputs are used in read control unit 826, end code detector 850, and run length counter 804 as will be described below. Register 830 outputs signals on lines 831 which indicate the "end of block" status for corresponding positions of each data output on lines 821 and the signals are used by read control unit 826 and end block unit 828 as will also be described below. At the end of shifting operations, read control unit 826 asserts an "end of shift" signal on line 2102 which causes decoder control unit 806 to initiate data decoding.

The functions of decoder control unit 806 are best described individually for each of the four modes: black, white, transition 1 ($T_1$), and Transition 2 ($T_2$). As described above, when decoding of the first code word in a frame is commenced, present EAP register 852 contains information defining the starting mode and one of present mode detector output lines 855 is asserted to indicate the specific mode.

Assume first that the present mode is black. In this case present EAP register 852 contains binary 1's in its two storage elements and the signals on both output lines 861 and 862 are also binary 1's. In the black mode, end of code detector 850 functions in the following way. The code word length (size) is defined by the binary number on inputs 825 and may represent a code word length (size) of 2, 3, 4, 5, 6 or 7 bits. Assume the length is n, where $2 \leq n \leq 7$. Detector 850 then examines the first *n* bits of data lines 821 to determine if all these bits are binary 1's; if so, a "code continuation" is indicated, meaning that the mode associated with the next code word will also be black, and output line 853 is asserted. If these *n* bits are not all 1's, "end of code" output line 851 is asserted. One of the output lines 2000 is set to indicate the last data position associated with the code word. This position is *n* if the "code continuation" condition exists; otherwise the position is $n+1$ since a P-bit always follows a code word on which the present mode is not to continue. As previously described, output lines 2000 are used by end block control unit 828 to examine the end block register outputs on lines 831 to determine "end of block."

Concurrent with the aforementioned operations of unit 850, control logic unit 856 functions as follows. The unit waits for a "compare" signal on line 882 to be asserted coincident with an element clock signal on line 893. When this condition exists, a "data ready" output on line 903 is asserted and causes the bit of "upper line data" on line 861 to be tranasferred to the printer. A "load/recirculate" signal is also asserted on line 886 to cause "lower line data" on line 862 to be stored in shift register 808. An "enable" signal is then asserted on line 881 to cause counter 812 to increment one count. If, at this time, a "last bit" signal on line 868 from run length counter 804 is asserted, decoding of the present code word has been completed and certain additional terminating operations occur. If, however, a signal is not asserted on line 868, a "decrement" signal is asserted on line 866 to cause run length counter 804 to count down by one count. This procedure continues at each occurrence of an element clock (on line 893) until finally a "last bit" signal is asserted on line 868 or until all of the upper line data has been decoded. This latter case is determined when a "data ready" output is asserted on 903 concurrent with "synchronized line sync" on line 893. In this case, decoding of the present code word is interrupted while lower line data stored in shift register 808 is output to printer 900. This output is performed when control logic unit 856 asserts an "unload" signal on line 2001 together with the "data ready" signal on line 903. At the following occurrence of the line sync signal (line 893), unloading of lower line data from register 808 is completed, and control logic unit 856 disables output lines 903 and 2001 and resumes decoding.

At the time of the first output for any code word, i.e., the first occurrence of a data ready signal on line 903, unit 856 examines the "end of code" input on line 851 and the "continuation" input on line 853 to determine whether black code size counter 814 should be incremented or decremented. A decision to increment is made if line 853 is asserted and the code length indicated on input lines 825 is not already maximum, i.e., 7 bits. In this case, a "count-up" signal on line 874 is asserted.

A decision to decrement is made if (1) input 851 is asserted, (2) the binary coded number represented by the n bits of the code word on input lines 821 are less than a minimum value (described in the introductory section), (3) the mode associated with the previous code word was "black," and (4) the code word length encoded on input lines 825 is not minimum, i.e., 2 bits. The third condition is stored within control unit 856 from processing of the previous code word. If these four conditions exist, a "count down" signal is asserted on line 876.

As mentioned above, decoding of a code word terminates when a "last bit" signal is asserted on line 868 coincidently with the "data ready" output on line 903. At this time control logic unit 856 determines whether the mode for the following code word will be black or white, or whether it will be transition 1 or 2. It does this by examining the P-bit which is positioned at the n+1 position (where n is the code word length) in the data lines 821. The value of *n* is represented by the binary number appearing on input lines 825. If the P-bit is a binary 0, the following mode is "white" and binary 0+s are transferred to present EAP register 852 on lines 849. If the P-bit is a binary 1, the following mode will be a "transition," but the type, i.e., $T_1$ or $T_2$, is not known until the next code word has been positioned into data register 820. In this case, register 852 is not changed, but the "next mode" condition is placed in a storage element inside unit 856. The "start read" signal is then asserted on line 860 and causes register 822 to be loaded with data from either line 863 or line 865 depending on the present mode indicated by the signals on lines 855.

The signal on line 860 also causes read control unit 826 to initiate a buffer read and shift operation to move the next code word into proper position in data register 820.

Decoding of a code word in the white mode is identical to that of the black mode, so far as decoder control unit 806 functions are concerned, with two exceptions. First, the two data output developed on lines 861 and 862 are binary 0's; and second, a P-bit of a binary 0 following the code word in the data on lines 821 indicates a change to "white" mode so that lines 849 are set-up to change register 852 to a "black" mode at the termination of the decoding of the "white" code word. It should also be observed that a "count-up" control signal on lines 874 and a count-down control signal on line 876 affect white code size counter 816 rather than counter 814 as determined by the present mode signals developed on lines 855. It should further be noted that the choice of a binary 1 to represent "black" and a binary 0 to represent "white" is an arbitrary decision, and the definition could be reversed.

Starting with assertion of an "end of shift" signal on line 2102 after the first eight-bits of data in the frame have been positioned in data register 820, operation of decoder control unit 806 occurs in the following way when the present mode is either $T_1$ or $T_2$, as indicated by the signals on lines 855. End of code detector 850 examines the first, or rightmost, data bit on data lines 821. If the second bit is the same as the first, the code word is considered to be 1 bit in length and output lines 2000 are set-up with a binary number indicating that the last data bit of the code word is at position 1. In this case the mode associated with the next code word will be unchanged. If, however, the second position in data lines 821 differs from the first position, a change in mode will occur with the next code word. Output lines 2000 are then set-up to indicate the possible last bit positions, which may be either the third or fourth positions depending on whether the mode will change to (1) the other transition mode, or to (2) a black or white mode, respectively. At this time, "end of code" signal will also be asserted.

Control logic unit 856 then generates a data ready signal on line 903, a load signal on line 886 and an enable signal on line 881 when tnere is coincidence of the compare signal on line 882 and the synchronized element clock on line 893. Upper and lower line data is obtained as before from present EAP register 852 on lines 861 and 862, respectively. The condition for interrupting upper line data output and initiating lower line output from register 808 is performed exactly as previously described for black mode processing. In the transition modes, a decode termination occurs after each output, i.e., after a signal assertion of a data ready signal on line 903. Two cases occur, depending on the state of the "end code" signal on line 851. If line 851 is not asserted, the present transition mode will continue, and control logic unit 856 generates a "start read" signal on line 860. If line 851 is asserted, control logic unit 856 transfers mode information for the next code word to register 852 on signal lines 849. Unit 856 generates output signals on lines 849 by connecting the third and fourth bits of on data lines 821 to lines 819. Following this operation, a "start read" signal is asserted on line 860 which causes read control unit 820 to shift the next code word into position in data register 820. If the newly established states of "present mode" lines 855 indicate either black or white mode, 860 also causes register 822 to be loaded with the proper code size information applying to the next code word. The above described operations differ between the two transition modes only in that the encoded data in one mode is the complement of that in the second mode.

The foregoing descriptions have applied only to decoding of the first word in a frame. With one exception, the case where a black or white mode changes to one of the two transition modes when the next code word is decoded, conditions were established, specifically by setting up registers 852 and 822, so that when the "end of shift" signal on line 2102 is next asserted, the operation of decoder control unit 806 is identical to that of the first word in the frame. When the mode changes from either black or white to one of the two transition modes, the next code word must be positioned in data register 820 before present EAP register 852 can be loaded. In this case, the assertion of the "end of shift" signal on line 2102 causes control logic unit 856 to examine the "next mode" bit stored internally and transfer mode data on lines 849 to present EAP register 852. The data transferred represents the code for either $T_1$ or $T_2$ mode depending on whether the first position of data lines 821 is a binary 1 or a binary 0. Remaining functions are then identical to those previously described.

The procedure described above continues until the last code word of the frame has been decoded. At this time the "end of block" signal is asserted on line 835 and inhibits further processing until a following "start block" signal is developed on line 829.

Printer 900

As schematically illustrated in FIG. 22 of the drawing, printer 900 includes a stepper motor 902 and paper advancing mechanism 904, an electrostatic plotter 906 or its equivalent, a binary decoder 908, an element counter 910 and a clock 912.

Motor 902 responds to stepper pulses developed on line 884 by decoder 800 to increment drive mechanism 904 for advancing a strip 914 of paper upon which the facsimile reproduction is to be made. In the preferred embodiment, plotter 906 includes 1726 electrostatic styli which are selectively charged by potentials developed on lines 907. A toning medium (not shown) is provided for supplying toner to strip 914 after selected elemental areas have been electrostatically charged by the styli. The elemental areas lie along "data lines" defined and located by the plotter styli.

Decoder 908 contains binary decoding logic, typically in the form of plurality of AND gates having enabling inputs coupled to lines 903 and selected ones of lines 909 and a data input coupled to line 901. The output terminal of each AND gate is coupled to one of the lines 907. More specifically, where lines 907 include 1726 individual conductors, binary decoder includes at least one AND gate for each of the lines 907 with each gate having one of its input leads coupled to line 901, one input lead coupled to line 903, and other input lines coupled to various ones of the lines 909 determined by the binary number which identifies the position along the data line held decoded data the stylus associated with the particular line 907. In other words, when a "data ready" signal is asserted on line 903 and a particular binary number is asserted on lines 909, only one of the AND gates in decoder 908 will be capable of gating a bit of decoded data to plotter 906. If the bit of decoder data is of one data state, a black dot will be developed on strip 914 in a particular elemental area. If the bit of decoded data is of a second data state, the elemental area will be left blank.

Element counter 910 includes a 12-bit binary counting device which responds to the "data ready" signal and begins counting from zero through 1726 at a rate determined by the element clock signal developed on line 913 by clock 912. For each clock pulse, the count of counter 910 will be incremented by one unit to cause decoder 908 to select the next styli in the data line. Following the 1726th count, counter 910 develops a "line sync" pulse on line 911 for input to decoder 800.

Clock 912 includes an oscillator and associated circuitry for developing a train of clock pulses on line 913.

In operation, when decoder 800 is ready to output decoded data, stepper pulses are developed on line 884 for causing stepper motor 902 to advance the strip of paper 914 into position over the styli of plotter 906 so that the styli are aligned with the portion of strip 914 which is to contain the first data line. Decoder 800 then asserts the "data ready" signal on line 903 causing element counter 910 to begin counting the element clock pulses input thereto on lines 913. On the occurrence of the first clock pulse, the count developed on lines 909 causes binary decoder 908 to select the first line of lines 907 and the associated stylus is either charged or not charged depending on the state of the first data bit. If the data bit corresponds to a "black" elemental area, that portion of strip 914 which corresponds to the first elemental area of the first data line be charged.

On the occurrence of the next clock pulse, element counter 910 is incremented to cause decoder 908 to select the second line of lines 907 thereby causing plotter 906 to either charge or not charge the second elemental area of the first elemental area as determined by the second bit of decoded data. This process will continue until all 1726 elemental areas have been addressed and electrostatically charged left uncharged in accordance with the first line of decoded data. At the end of the first data line counter 910 develops a "line sync" signal on line 911 for return to decoder 800.

Decoder 800 then responds by developing a stepper pulse on line 884 which causes motor 902 to advance strip 914 to position the second data line over the styli of plotter 906, and the above described process is repeated as the second line of decoded data is asserted. The strip 914 will be sequentially advanced and each line of decoded data will be reproduced until the complete fascimile of the origional document 104 is developed. At the end of the transmission or at some point identified as the bottom of the document, strips may be cut either manually or automatically (by means not shown) and removed, leaving printer 900 ready to print the next facsimile document.

Although the present invention has been described in terms of the above simplified examples and embodiments, it will be appreciated that the invention may likewise be practiced using other embodiments. Accordingly, it is to be understood that the foregoing description is offered by way of example only and is not intended to be limiting, and the appended claims are to be interpreted as covering all alterations or modifications of the method or apparatus which fall within the true spirit and scope of the invention.

What is claimed is:

1. A method of encoding the contents of a document for transmission in a compressed form to a remote location and for use in reproducing a facsimile of the document, comprising the steps of:

scanning the document along successive lines each defining a like fixed number of contiguous like elemental areas to develop successive scan signals, said scan signals having encoded thereon the conditions of the scanned elemental areas each of which is either of a first or a second state; and encoding a selected number of said scan signals together to form an encoded signal, compressed without approximation, for transmission to the remote location, said encoded signal being developed utilizing solely the conditions of the elemental areas forming elemental area sets and the change of condition between successive sets, each set being composed of one elemental area from each line with all elemental areas in a set being contiguous.

2. A method of encoding the contents of a document for transmission in a compressed form to a remote location and for use in reproducing a facsimile of the document, comprising the steps of:

scanning the document along a first line defining a fixed number of contiguous like elemental areas to develop a first scan signal, and along a second line defining the same fixed number of contiguous like elemental areas to develop a second scan signal, said first and second scan signals having encoded thereon the conditions of the scanned elemental areas each of which is either of a first or a second state; and adaptively encoding said first and second scan signals together to form an encoded signal, compressed without approximation, for transmission to the remote location, said encoded signal being developed utilizing solely the conditions of the elemental areas forming elemental area pairs and the change of condition between successive pairs, each pair being composed of one elemental area from said first line and the elemental area from said second line which is contiguous therewith.

3. A method as recited in claim 2 wherein said encoded signal is formed to include, a first code term representing an elemental area pair having elemental areas of unlike states, and a second code term representing the runlength of elemental area pairs having elemental areas of like states.

4. A method as recited in claim 3 wherein the encoded signal is formed to further include a transition term for separating successive unlike code terms and for defining the relationship between the unlike code terms.

5. A method as recited in claim 4 wherein said first code term is formed of a single binary digit having a state corresponding to the state of the elemental area of the elemental area pair of a selected line.

6. A method of encoding the contents of a document for transmission to a remote location and for use in reproducing a facsimile of the document, comprising the steps of:

scanning the document along successive lines each defining a like number of contiguous like elemental areas to develop successive scan signals, said scan signals having encoded thereon the conditions of the scanned elemental areas each of which is either of a first or a second state;

combining a selected number of scan signals to define a combined signal representing the encoded condition of elemental area sets, each set being composed of one elemental area from each line with all elemental areas being contiguous; and encoding said combined signal to form a compressed encoded signal for trnasmission to the remote location, said compressed encoded signal including enough information to allow reproduction of said scan signals at the remote location.

7. A method of encoding the contents of a document for transmission to a remote location and for use in reproducing a facsimile of the document, comprising the steps of:

scanning the document along a first line defining a fixed number of contiguous like elemental areas to develop a first scan signal, and along a second line defining the same fixed number of contiguous like elemental areas to develop a second scan signal, said first and second scan signals having encoded thereon the conditions of the scanned elemental areas each of which is either of a first or a second state;

combining said first and second scan signals to define a combined signal representing the encoded condition of elemental area pairs, each pair being composed of one elemental area from said first line and the elemental area from said second line which is contiguous therewith; and encoding said combined signal to form a compressed encoded signal for transmission to the remote location, said compressed encoded signal including enough information to allow reproduction of said scan signals at the remote location.

8. A method of encoding the contents of a document on an encoded signal for transmission to a remote location where the encoded signal is used to produce a facsimile copy of the document, comprising the steps of:

scanning the document along a first and at least one further line to develop a first and further scan signals, each line defined by a like plurality of contiguous like elemental areas, each of which contains one of a plurality of indicia that is either of a first data state or a second data state, said signals each being comprised of a series of data bits that individually correspond to various ones of said elemental areas and have a first signal state or a second signal state depending upon the data state of the corresponding elemental area;

assembling the data bits in said first and further signals into data sets, each set including one data bit from each signal; and developing a compressed encoded signal based solely on the data constitution of said data sets and changes in data constitution between successive data sets, said compressed encoded signal including enough information to allow reproduction of said data sets at the remote location.

9. A method of encoding the contents of a document on an encoded signal for transmission to a remote location where the encoded signal is used to produce a facsimile copy of the document, comprising the steps of:

scanning the document along a first line defined by a plurality of elemental areas, each of which contains one of a like plurality of indicia that is either of a first data state or a second data state, to develop a first scan signal, and along a second line defined by a like plurality of elemental areas, each of which also contains one of a like plurality of indicia that is also either of said first data state or said second data state, to develop a second scan signal, said first and second scan signals each being comprised of a series of data bits that individually correspond to various ones of said elemental areas and have a first signal state or a second signal state depending upon the data state of the corresponding elemental area;

assembling the data bits in said first and second scan signals into data pairs, each pair including a first data bit from said first scanning signal and a corresponding second data bit from said second scan signal; and developing a compressed encoded signal based solely on the data constitution of said data pairs and any change in data constitution between successive ones of said data pairs, said compressed encoded signal including enough information to allow reproduction of said data pairs at the remote location.

10. A method of encoding as recited in claim 9 wherein said encoded signal is formed to include a first block of binary characters and wherein the method of encoding further comprises the step of, developing a header signal including a second block of binary characters for indicating certain characteristics of said first block.

11. A method of encoding as recited in claim 9 wherein said encoded signal is formed to include, a first type of code term for data pairs having unlike data bits, a second type of code term for runlengths of like data pairs having like data bits, and a third type of code term for indicating the relationship between adjacent code terms of the first and second types.

12. A method of encoding as recited in claim 11 wherein said first type of code term is formed of a binary character corresponding to the data state of the second data bit of the data pair.

13. A method of encoding as recited in claim 11 wherein said third type of code term is formed of a string of binary characters whose number and data state are determined by the data states of the data pairs represented by the adjacent code terms.

14. A method of simultaneously encoding two sets of binary data, comprising the steps of:

assembling the data in said two sets into a series of data pairs, each comprising a first data bit from one set and a corresponding second data bit from the other set;

sequentially identifying each data pair as;

a black data pair when said first and second data bits are of one data state, a white data pair when said first and second data bits are of the opposite data state, a first transition data pair when said first data bit is of said one data state and said second data bit is of said opposite data state, or a second transition data pair when said first data bit is of said opposite data state and said second data bit is of said one data state; and generating a number of binary characters following each transition data pair and following the last data pair in each runlength of black or white data pairs, said number of characters having:

a first composition when a white data pair follows a black data pair, second composition when a first transition data pair follows a black data pair, third composition when a second transition data pair follows a black data pair, fourth composition when a black data pair follows a white data pair, a fifth composition when a first transition data pair follows a white data pair, a sixth composition when a second transition data pair follows a white data pair, a seventh composition when a second transition data pair follows a first transition data pair, an eighth composition when a black data pair follows a first transition data pair, a ninth composition when a white data pair follows a first transition data pair, a tenth composition when a first transition data pair follows a second transition data pair, an eleventh composition when a black data pair follows a second transition data pair, a twelfth composition when a white data pair follows a second transition data pair, a thirteenth composition when a first transition data pair follows a first transition data pair, and a fourteenth composition when a second transition data pair follows a second transition data pair.

15. A method of simultaneously encoding two sets of binary data as recited in claim 14 wherein said first through sixth compositions include, a code term consisting of a series of binary characters forming one or more code words, and a prefix character having one binary state when the present runlength is followed by a data pair of a transition type and having the opposite binary state when the present runlength is followed by a runlength of the opposite data state.

16. A method of simultaneously encoding two sets of binary data as recited in claim 15 wherein said seventh and tenth compositions include three binary characters corresponding in order to the data states of the second data bit of the present data pair, the first data bit of the present data pair, and the first data bit of the next data pair.

17. A method of simultaneously encoding two sets of binary data as recited in claim 16 wherein said eighth and ninth, and eleventh and twelfth compositions include four binary characters corresponding in order to the data states of the second data bit of the present data pair, the first data bit of the present data pair, the first data bit of the next data pair, and the second data bit of the next data pair.

18. A method of simultaneously encoding two sets of binary data as recited in claim 17 wherein said thirteenth and fourteenth compositions include a single character corresponding to the data state of the second data bit in the present data pair.

19. A method of simultaneously encoding two sets of binary data as recited in claim 15 wherein said code term is determined by counting the number of data pairs in the present runlength and converting the number counted into a first code word having a bit-length of n data bits and capable of representing up to x data pairs, and a series of further code words, each having a bit-length exceeding that of the preceding code word by one data bit, the number of said further code words required being determined by the extent to which the number of data pairs in the present runlength exceeds the capacity of said first code word.

20. A method of simultaneously encoding two sets of binary data as recited in claim 19 wherein the bit-length of the first code word in each successive code term is expanded as required to have the same bit-length as the last code word in the next preceding code term representing a runlength of the same data state.

21. A method of simultaneously encoding two sets of binary data as recited in claim 20 wherein the bit-length of a particular code word is decreased by one data bit if the preceding code term of the same data state was filled to less than a predetermined percentage of its capacity.

22. A document transmission system for encoding the contents of a document for transmission in a compressed form to a remote location and for use in reproducing a facsimile of the document, comprising:

means for scanning the document along successive lines each defining a like fixed number of contiguous like elemental areas to develop successive scan signals, said scan signals having encoded thereon the conditions of the scanned elemental areas each of which is either of a first or a second state; and means for encoding a selected number of said scan signals together to form an encoded signal, compressed without approximation, for transmission to a remote location, said encoded signal being developed utilizing solely the conditions of the elemental areas forming elemental area sets and the change of condition between successive sets, each set being composed of one elemental area from each line with all elemental areas in a set being contiguous.

23. A document transmission system for encoding the contents of a document for transmission in a compressed form to a remote location and for use in reproducing a facsimile of the document, comprising:

means for scanning the document along a first line defining a fixed number of contiguous like elemental areas to develop a first scan signal, and along a second line defining the same fixed number of contiguous like elemental areas to develop a second scan signal, said first and second scan signals having encoded thereon the conditions of the scanned elemental areas each of which is either of a first or a second state; and means for encoding said first and second scan signals together to form an encoded signal, compressed without approximation, for transmission to the remote location, said encoded signal being developed utilizing solely the conditions of the elemental areas forming elemental area pairs and the change of condition between successive pairs, each pair being composed of one elemental area from said first line and the elemental area from said second line which is contiguous therewith.

24. A document transmission system for encoding the contents of a document for transmission to a remote location and for use in reproducing a facsimile of the document, comprising:

means for scanning the document along successive lines each defining a like number of contiguous like elemental areas to develeop successive scan signals, said scan signals having encoded thereon the conditions of the scanned elemental areas each of which is either of a first or a second state;

means for combining a selected number of scan signals to define a combined signal representing the encoded condition of elemental area sets, each set being composed of one elemental area from each line with all elemental areas being contiguous; and means for encoding said combined signal to form a compressed encoded signal for transmission to the remote location, said compressed encoded signal including enough information to allow reproduction of said scan signals at the remote location.

25. A document transmission system for encoding the contents of a document for transmission to a remote location and for use in reproducing a facsimile of the document, comprising:

means for scanning the document along a first line defining a fixed number of contiguous like elemental areas to develop a first scan signal, and along a second line defining the same fixed number of contiguous like elemental areas to develop a second scan signal, said first and second scan signals having encoded thereon the conditions of the scanned elemental areas each of which is either of a first or a second state;

means for combining said first and second scan signals to define a combined signal representing the encoded condition of elemental area pairs, each pair being composed of one elemental area from said first line and the elemental area from said second line which is contiguous therewith; and means for encoding said combined signal to form a compressed encoded signal for transmission to the remote location, said compressed encoded signal including enough information to allow reproduction of said scan signals at the remote location.

26. A document transmission system for encoding the contents of a document on an encoded signal for transmission to a remote location where the encoded signal is used to produce a facsimile copy of the document, comprising:

means for scanning the document along a first and at least one further line to develop a first and further scan signals, each line defined by a like plurality of contiguous like elemental areas, each of which contains one of a like plurality of indicia that is either of a first data state or a second data state, said signals each being comprised of a series of data bits that individually correspond to various ones of said elemental areas and have a first signal state or a second signal state depending upon the data state of the corresponding elemental area;

means for assembling the data bits in said first and further signals into data sets, each set including one data bit from each signal; and means for developing a compressed encoded signal based solely on the data constitution of said data sets and changes in data constitution between successive data sets, said compressed encoded signal including enough information to allow reprodcution of said data sets at the remote location.

27. A data transmission system, comprising:

scanning means for scanning an indicia containing surface of an original document and developing a first scanning signal and a second scanning signal, said first scanning signal including data corresponding to the indicia contained along a first line of the document, and said second scanning signal including data corresponding to the indicia contained along a second line of the document;

encoded means for combining the data contained in said first and second scanning signals into a series of data pairs each including a data bit from said first scanning signal and a corresponding data bit from said second scanning signal, and for further developing a compressed encoded signal based solely upon the data constitution of said data pairs and any change in the data constitution between successive ones of said data pairs, said compressed encoded signal including sufficient information to allow reproduction of said first and second scan signals;

transmitting means for transmitting said compressed encoded signal;

receiving means for receiving the transmitted compressed encoded signal;

decoding means responsive to said transmitted compressed encoded signal and operative to develop a decoded signal; and printing means responsive to said decoded signal and operative to develop a facsimile copy of the original document.

28. A data transmission system as recited in claim 27 wherein said encoding means includes means responsive to said first and second scanning signals and operative to develop header signals for indicating certain characteristics of said encoded signal.

29. A data transmission system as recited in claim 28 wherein said transmitting means includes storage means for temporarily storing said encoded signal and said header signal.

30. A data transmission system as recited in claim 29 wherein said transmitting means further includes data assembly means for retrieving the stored encoded signal and stored header signal from said storage means and for assembling said stored signal in accordance with a predetermined transmission frame format.

31. A data transmission system as recited in claim 30 wherein said data assembly means includes means for developing additional synchronization an error checking signals for assembly with said encoded signal and header signal.

32. A data compressor-transmitter system comprising:

a scanner for scanning the indicia containing face of a document and developing a first set of scan data corresponding to the indicia appearing along a first line of said document and a second set of scan data corresponding to indicia appearing along a second line of said document;

an encoder for combining the data in said first and second sets into a series of data pairs each including a first data bit from one set and a corresponding second data bit from the other set, and for developing a block of encoded data self-adaptively compressed to be commensurate with the characteristics and relative characteristics of successive ones of said data pairs, and for developing a block of header data commensurate with certain characteristics of said block of encoded and compressed data, said block of encoded and compressed data including sufficient information to permit reproduction of said sets of scan data;

a buffer for receiving and temporarily storing said block of encoded and compressed data and said block of header data; and means for retrieving said blocks of encoded and compressed data and header data from said buffer, for developing a block of other data, and for assembling said blocks of other data, header data and encoded data in accordance with a predetermined transmission frame format.

33. A receiver-reconstructor system for receiving and decoding a frame of transmitted data including blocks of synchronizing data, status data, header data, compressed encoded data and check data, and for developing a facsimile of an original document containing indicia represented by the block of compressed encoded data, comprising:

means for receiving the frame of transmitted data and including, means responsive to said block of synchronizing data and operative to synchronize the system with the transmitted data, means responsive to said block of check data and operative to indicate whether the transmitted data is accurate to within predetermined threshold limits, and means for identifying and separating said blocks of header data and compressed encoded data;

decoding means responsive to said blocks of header data and compressed encoded data and operative to develop decoded data representative of the indicia of the original document, said decoding means including means for decoding runlength code terms of self-adaptively varying capacity contained in said block of compressed encoded data; and means responsive to said decoded data and operative to develop the facsimile copy.

34. An encoder for simultaneously encoding and compressing two sets of related binary data, comprising:

means for combining the two sets of data to form a series of data pairs, each including a first data bit from one set and a corresponding second data bit from the other set, said data pairs having an even mode when said first and second data bits are alike and an odd mode when said first and second data bits are unlike;

encoder control means for sequentially receiving said data pairs and including means for simultaneously determining the data constitution of a present data pair and the data constitution of the next data pair, and for developing a count signal each time the data bits of the next data pair are alike and of the same data state as the data bits of the present data pair, and for developing a transition code term each time the data constituion of the next data pair differs from the data constitution of the present data pair;

a runlength counter responsive to the count signals and operative to develop at least one code word forming a runlength code term of adaptively varying capacity, said code term being representative of the number of data pairs in a runlength of sucessive like data pairs; and data assembly means for assembling the transition code terms and the runlength code terms to develop a block of encoded and compressed data.

35. An encoder as recited in claim 34 wherein said control means is operative to monitor the count of said runlength counter and to develop an increment signal when said runlength counter has counted to the capacity of a present code word;

said encoder further comprising additional counting means responsive to the increment signals and operative to develop a black code word signal and a white code word signal corresponding respectively to the bit length of the last black and last white code words developed by said runlength counter.

36. An encoder as recited in claim 35 and further comprising means for counting the number of data pairs input to said control means, and for developing a position signal commensurate therewith.

37. An encoder as recited in claim 36 wherein said control means further includes means for developing a starting mode signal corresponding to the data contained within the first data pair in said block of encoded and compressed data, and said encoder further comprises header register means for receiving and assembling in a block of header data said position signal, the black code word signal and the white code word signal indicating respectively, the bit-lengths of the first black code word and first white code word in said block of encoded data, and the starting mode signal.

38. A method of encoding the contents of a document for transmission to a remote location and for use in reproducing a facsimile of the document, comprising the steps of:

scanning a document along a first line defining a fixed number of contiguous like elemental areas to develop a first scan signal, and along a second line defining the same fixed number of contiguous like elemental areas to develop a second scan signal, said first and second scan signals having encoded thereon the conditions of the scanned elemental areas each of which is either of a first or a second state; and encoding said first and second scan signals together to form an encoded signal for transmission to the remote location, said encoded signal being developed utilizing solely the conditions of the elemental areas forming elemental area pairs and the change of condition between successive pairs, each pair being composed of one elemental area from said first line and the elemental area from said second line which is contiguous therewith;

said encoded signal being formed to include a first code term representing an elemental area pair having elemental areas of unlike states, a second code term representing the runlength of elemental area pairs having elemental areas of like states, and a transition term for separating successive unlike code terms and for defining the relationship between the unlike code terms, said second code term being formed of a first code work having a capacity of representing up to a first number of data pairs, and if said first code word is filled to its capacity, further code words each having a larger capacity than said first code word.

39. A method of encoding the contents of a document on an encoded signal for transmission to a remote location where the encoded signal is used to produce a facsimile copy of the document, comprising the steps of:

scanning the document along a first line defined by a plurality of elemental areas each of which contains one of a like plurality of indicia that is either of a first data state or a second data state, to develop a first scan signal, and along a second line defined by a like plurality of elemental areas, each of which also contains one of a like plurality of indicia that is also either of said first data state or said data state, to develop a second scan signal, said first and second scan signals being comprised of a series of data bits that individually correspond to various ones of said elemental areas and have a first signal state or a second signal state depending upon the data state of the corresponding elemental area;

assembling the data bits in said first and second scan signals into data pairs, each pair including a first data bit from said first scanning signal and a corresponding second data bit from said second scan signal; and developing an encoded signal based solely on the data constitution of said data pairs and any change in data constitution between successive ones of said data pairs, said encoded signal being formed to include a first type of code term for data pairs having unlike data bits, a second type of code term for runlengths of like data pairs having like data bits, and a third type of code term for indicating the relationship between adjacent code terms of the first and second types, said second type of code term being formed of a first code word comprised of n binary characters capable of indicating up to x data pairs, and further code words which are progressively incremented by one binary character as required to indicate the additional data pairs in the runlength.

40. A method of encoding as recited in claim 39, wherein the bit-length of the first code word in each successive code term is expanded to have the same bit-length as the last code word in the next preceding code term representing a runlength of data bits of the same signal state as those of the present runlength.

41. A method of encoding the contents of the document on an encoded signal for transmission to a remote location where the encoded signal is used to produce a facsimile copy of the document, comprising the steps of:

scanning the document along a first line defined by a plurality of elemental areas each of which contains one of a like plurality of indicia that is either of a first data state or a second data state, to develop a first scan signal, and along a second line defined by a like plurality of elemental areas, each of which also contains one of a like plurality of indicia that is also either of said first data state or said data state, to develop a second scan signal, said first and second scan signals being comprised of a series of data bits that individually correspond to various ones of said elemental areas and have a first signal state or a second signal state depending upon the data state of the corresponding elemental area;

assembling the data bits in said first and second scan signals into data pairs, each pair including a first data bit from said first scanning signal and a corresponding second data bit from said second scan signal; and developing an encoded signal based solely on the data constitution of said data pairs and any change in data constitution between successive ones of said data pairs, said encoded signal being formed to include a first type of code term for data pairs having unlike data bits, a second type of code term for runlengths of like data pairs having like data bits, and a third type of code term for indicating the relationship between adjacent code terms of the first and second types, said second type of code term being formed of one or more code words each comprised of a number of binary characters, the number of binary characters in the first code word in each code term being determined by the number of binary characters of the last code word of the next preceding code term representing a runlength of data bits of the same signal state as the present run length.

42. A method of encoding the contents of the document on an encoded signal for transmission to a remote location where the encoded signal is used to produce a facsimile copy of the document, comprising the steps of:

scanning the document along a first line defined by a plurality of elemental areas each of which contains one of a like plurality of indicia that is either of a first data state or a second data state, to develop a first scan signal, and along a second line defined by a like plurality of elemental areas, each of which also contains one of a like plurality of indicia that is also either of said first data state or said data state, to develop a second scan signal, said first and second scan signals being comprised of a series of data bits that individually correspond to various ones of said elemental areas and have a first signal state or a second signal state depending upon the data state of the corresponding elemental area;

assembling the data bits in said first and second scan signals into data pairs, each pair including a first data bit from said first scanning signal and a corresponding second data bit from said second scan signal; and developing an encoded signal based solely on the data constitution of said data pairs and any change in data constitution between successive ones of said data pairs, said encoded signal being formed to include a first type of code term for data pairs having unlike data bits, a second type of code term for runlengths of like data pairs having like data bits, and a third type of code term for indicating the relationship between adjacent code terms of the first and second types, said second type of code term being formed to include one or more code words of progressively increasing bit-lengths and wherein the bit-length of the first code word in the present code term is reduced to one less than the bit-length of the last code word of the next preceding code term of the same data state as those of the present runlength if the number of data bits in the preceding runlength was less than a predetermined precentage of the capacity of said next preceding code term.

43. A method of encoding the contents of the document on an encoded signal for transmission to a remote location where the encoded signal is used to produce a facsimile copy of the document, comprising the steps of:

scanning the document along a first line defined by a plurality of elemental areas each of which contains one of a like plurality of indicia that is either of a first data state or a second data state, to develop a first scan signal, and along a second line defined by a like plurality of elemental areas, each of which also contains one of a like plurality of indicia that is also either of said first data state or said data state, to develop a second scan signal, said first and second scan signals being comprised of a series of data bits that individually correspond to various ones of said elemental areas and have a first signal state or a second signal state depending upon the data state of the corresponding elemental area;

assembling the data bits in said first and second scan signals into data pairs, each pair including a first data bit from said first scanning signal and a corresponding second data bit from said second scan signal; and developing an encoded signal based solely on the data constitution of said data pairs and any change in data constitution between successive ones of said data pairs, said encoded signal being formed to include a first type of code term for data pairs having unlike data bits, a second type of code term for runlengths of like data pairs having like data bits, and a third type of code term for indicating the relationship between adjacent code terms of the first and second types, said second type of code term being formed to include a first code word $n$ bits in length and having the capacity to represent up to $x$ data pairs, and a second code word $n+1$ bits in length and having the capacity to represent up to y additional data pairs if the run length exceeds $x-1$ data pairs, and a third code word $n+2$ bits in length and having the capacity to represent up to $z$ additional data pairs if the run length exceeds $x+(y-1)$ data pairs.

44. A data transmission system, comprising:

scanning means for scanning an indicia containing surface of an original document and developing a first scanning signal and a second scanning signal, said first scanning signal including data corresponding to the indicia contained along a first line of the document, and said second scanning signal including data corresponding to the indicia contained along a second line of the document;

encoding means for combining the data contained in said first and second scanning signals into a series of data pairs each including a data bit from said first scanning signal and a corresponding data bit from said second scanning signal, said encoding means further developing an encoded signal based solely upon the data constitution of said data pairs and any change in the data constitution between successive ones of said data pairs, said encoding means including:

means for sequentially receiving the data pairs and simultaneously determining the data constitution of a present data pair and the data constitution of the next following data pair, and for developing a count signal if the data bits of the next data pair are alike and of the same data state as the data bits of the present data pair, and for developing a composite signal comprised of a number of data bits having predetermined composition if the data constitution of the next data pair differs from the data constitution of the present data pair;

a runlength counter responsive to said count signal and operative to develop one or more binary code words forming a binary code term representative of the number of data pairs in a runlength of successive like data pairs; and data assembly means for assembling the transition code terms and the runlength code terms to develop a block of encoded data; transmitting means for transmitting said encoded signal;

receiving means for receiving the transmitted encoded signal;

decoding means responsive to said transmitted encoded signal and operative to develop a decoded signal; and printing means responsive to said decoded signal and operative to develop a facsimile copy of the original document.

45. A data transmission system as recited in claim 44 wherein said encoding means further includes means for monitoring the count of said runlength counter to develop an increment signal when said runlength counter has counted to the capacity of a present code word, and further including additional counting means responsive to the increment signals and operative to develop a black code word signal and a white code word signal corresponding respectively to the bit-lengths of the last black and last white code words developed by said runlength counter.

46. A data transmission system as recited in claim 45 wherein said encoding means further includes means for counting the number of data pairs input thereto and for developing a position signal commensurate therewith.

47. A data transmission system as recited in claim 46 wherein said encoding means further includes means for developing a starting mode signal corresponding to the data constitution of the first data pair in said block of encoded data, and header register means for receiving said position signal, the black code word signal and the white code word signal indicating respectively, the bit-lengths of the first black code word and first white code word in said block of encoded data, and the starting mode signal, said signals being assembled in said header register means to form a block of header data.

48. A data transmission system as recited in claim 47 wherein said transmitting means includes:

means for developing a block of synchronizing data;
means for developing a block of status data;
means for developing a block of check data; and
means for assembling said blocks of synchronizing data, status data, header data, encoded data and check data in accordance with a predetermined transmission frame format.

49. A data compressor-transmitter system comprising:

a scanner for scanning the indicia containing face of a document and developing a first set of scanned data corresponding to the indicia appearing along a first line of said document and a second set of scan data corresponding to indicia appearing along a second line of said document;

an encoder for combining the data in said first and second sets into a series of data pairs each including a first data bit from one set and a corresponding second data bit from the other set, and for developing a block of encoded data commensurate with the characteristics and relative characteristics of successive ones of said data pairs, and for developing a block of header data commensurate with certain characteristics of said block of encoded data said encoder comprising:

means for sequentially receiving said data pairs and for simultaneously determining the data constitution of a present data pair and the data constitution of the next following pair, and for developing a count signal each time the data bits of the next data pair are alike and of the same data state as the data bits of the present data pair, and for developing a transition code term each time the data constitution of the next data pair differs from the data constitution of the present data pair;

a runlength counter responsive to the count signals and operative to develop one or more code words forming a runlength code term representative of the number of data pairs in a runlength of successive like data airs; and data assembly means for assembling the transition code terms and the runlength code terms to develop a block of encoded data;

a buffer for receiving and temporarily storing said block of encoded data and said block of header data; and means for retrieving said blocks of encoded data and header data from said buffer, for developing a block of other data, and for assembling said blocks of other data, header data and encoded data in accordance with a predetermined transmission frame format.

50. A data compressor-transmitter system as recited in claim 49 wherein said encoder is further operative to monitor the count of said runlength counter and to develop an increment signal when said runlength counter has counted to the capacity of the present code word;

said encoder further including counting means responsive to said increment signal and operative to develop a bit-length signal corresponding to the bit-length signal corresponding to the bit-length of the code word presently being developed by said runlength counter.

51. A data compressor-transmitter system as recited in claim 50 wherein said encoder further includes means for counting the number of data pairs input thereto and for developing a position signal commensurate therewith.

52. A data compressor-transmitter system as recited in claim 51 wherein said encoder further includes means for developing a starting mode signal corresponding to the data contained within the first data pair in said block of encoded data, and header register means for receiving said position signal, the bit-length signal indicating the bit-length of the first code word in said block of encoded data, and said starting mode signal, said signals being assembled in said register means to form said block of header data.

53. A method of compressing binary data signals representative of elemental areas of a document for transmission to a remote location, comprising the steps of:

scanning the document along successive lines containing like pluralities of the elemental areas of the document, to develop corresponding successive binary signal streams each representative of a line of the document;

simultaneously processing a plurality of said binary signal streams in order to consider successive sets of binary signals representative of elemental area sets consisting of contiguous elemental areas taken from a plurality of consecutive rows, said step of simultaneously processing including the step of developing an encoded binary signal stream from said successive sets of binary signals, wherein said encoded binary signal stream generally contains fewer binary digits than are contained in the corresponding successive binary signal streams developed in said scanning step.

54. A method as recited in claim 53, wherein:

said step of developing said encoded binary signal stream includes developing a runlength code term representative of a number of consecutive elemental area sets containing elemental areas with like states; and said runlength code term is developed to include a first code word having a capacity of representing up to a first number of elemental area sets, and if said first code word is filled to its capacity, further code words having successively larger capacities.

55. A method as set forth in claim 54, wherein said step of developing a runlength code term further includes the step of varying the capacity of said first code word to adapt to trends encountered in scanning the document, by employing for the capacity of said first code word the capacity of the last code word from the preceeding runlength code term representative of a runlength of the same state, and by reducing the capacity of said first code word if the first code word in said preceeding runlength code term was not filled to a preselected percentage of its capacity.

56. Apparatus for the compression of binary data signals representative of elemental areas of a document for transmission to a remote location, comprising:

means for scanning the document along successive lines containing like pluralities of the elemental areas of the document, to develop corresponding successive binary signal streams each representative of a line of the document;

means for simultaneously processing a plurality of said binary signal streams in order to consider successive sets of binary signals representative of elemental area sets consisting of contiguous elemental areas taken from a plurality of consecutive rows, said processing means including means for developing an encoded binary signal stream from said successive sets of binary signals, wherein said encoded binary signal stream generally contains fewer binary digits than are contained in the corresponding successive binary signal streams developed by said scanning means.

57. Apparatus as recited in claim 56, wherein:

said means for developing said encoded binary signal stream includes means for developing a runlength code term representative of a number of consecutive elemental area sets containing elemental areas with like states; and said runlength code term is developed to include a first code word having a capacity of representing up to a first number of elemental area sets, and if said first code word is filled to its capacity, further code words having successively larger capacities.

58. A method as set forth in claim 57, wherein said means for developing a runlength code term further includes means for varying the capacity of said first code word to adapt to trends encountered in scanning the document, by employing for the capacity of said first code word the capacity of the last code word from the preceeding runlength code term representative of a runlength of the same state, and by reducing the capacity of said first code word if the first code word in said preceeding runlength code term was not filled to a preselected percentage of its capacity.

* * * * *

UNITED STATES PATENT AND TRADEMARK OFFICE

CERTIFICATE OF CORRECTION

PATENT NO. : 3,916,095

DATED : October 28, 1975

INVENTOR(S) : Donald R. Weber, et al

It is certified that error appears in the above-identified patent and that said Letters Patent are hereby corrected as shown below:

Column 1, line 12, "Comressing" should be -- Compressing --.

Column 4, line 46, "line" should be -- time --.

Column 6, line 2, ":" should be -- ; --.

Column 7, lines 9-10, "preceeding" should be -- preceding --.

Column 7, line 55, "have" should be -- has --.

Column 8, line 27, "preceeding" should be -- preceding --.

Column 9, lines 63-64, "second" should be -- scanned --.

Column 10, line 3, "of" should be -- for --.
Column 10, line 53, "sybsystem" should be -- subsystem --.
Column 10, line 64, "signal" should be -- signals --.

Column 11, line 2, "recepticle" should be -- receptacle --.
Column 11, line 33, "Therefor" should be -- Therefore --.

Column 13, line 11, after "counter" insert -- unit --.
Column 13, line 42, "decoder" should be -- encoder --.

Column 14, line 16, "ao" should be -- so --.

Column 17, line 51, "position" should be -- operation --.

Column 18, line 16, delete "of" (second occurrence) and insert therefor -- the --.

UNITED STATES PATENT OFFICE

CERTIFICATE OF CORRECTION

PATENT NO. : 3,916,095

DATED : October 28, 1975

INVENTOR(S) : Donald R. Weber, et al.

It is certified that error appears in the above-identified patent and that said Letters Patent are hereby corrected as shown below:

Column 18, line 28, "transistion" should be -- transition --.

Column 20, line 15, "and" should be -- an --.

Column 27, line 42, "AECJ" should be -- AECU --.

Column 30, line 34, delete one "a".

Column 30, line 62, "610" should be -- 616 --.

Column 31, line 59, "indentifies" should be -- identifies --.

Column 32, line 17, "stop" should be -- step --.

Column 33, line 35, after "is" insert -- a --.
Column 33, line 39, "in" should be -- on --.

Column 34, line 42 "71" should be -- 718 --.
Column 34, line 42, "816" should be -- 818 --.

Column 37, line 47, "cuase" should be -- cause --.

Column 40, line 24, "tranasferred" should be -- transferred --.

Column 41, line 13, "0+s" should be -- O's --.
Column 41, line 32, after "output" insert -- signals --.
Column 41, line 35, ""white"" should be -- "black" --.

Column 42, line 1, "tnere" should be -- there --.
Column 42, line 19, after "of" insert -- data --.
Column 42, line 21, "820" should be -- 826 --.

UNITED STATES PATENT OFFICE

CERTIFICATE OF CORRECTION

PATENT NO. : 3,916,095

DATED : October 28, 1975

INVENTOR(S) : Donald R. Weber, et al.

It is certified that error appears in the above-identified patent and that said Letters Patent are hereby corrected as shown below:

Column 43, line 18, delete "decoded data", insert therefor -- by --.
Column 43, line 54, after "line", insert -- will --.

Column 45, line 28, "trnasmissions" should be -- transmission --.

Column 50, lines 8-9, (Claim 26), "reprodcution" should be -- reproduction --.

Column 52, line 68, (Claim 38), "work" should be -- word --.

Column 53, line 17, (Claim 39), after "or said" insert -- second --.
Column 53, line 64, (Claim 41), after "or said" insert -- second --.

Column 54, line 39, (Claim 42), after "or said" insert -- second --.

Column 55, line 15, (Claim 43), after "or said" insert -- second --.

Column 57, line 27, (Claim 49), "airs;" should be -- pairs;--.

Signed and Sealed this

Fourteenth Day of September 1976

[SEAL]

*Attest:*

RUTH C. MASON
*Attesting Officer*

C. MARSHALL DANN
*Commissioner of Patents and Trademarks*